US007657345B2

(12) United States Patent
Endo et al.

(10) Patent No.: US 7,657,345 B2
(45) Date of Patent: Feb. 2, 2010

(54) ROBOT AND ATTITUDE CONTROL METHOD OF ROBOT

(75) Inventors: Gen Endo, Nara (JP); Mitsuo Kawato, Kyoto (JP); Gordon Cheng, Kyoto (JP); Jun Nakanishi, Kyoto (JP); Jun Morimoto, Kyoto (JP)

(73) Assignees: Sony Corporation, Tokyo (JP); Advanced Telecommunications Research Institute International, Soraku-gun (JP)

( * ) Notice: Subject to any disclaimer, the term of this patent is extended or adjusted under 35 U.S.C. 154(b) by 876 days.

(21) Appl. No.: 10/922,907

(22) Filed: Aug. 23, 2004

(65) Prior Publication Data

US 2005/0113973 A1   May 26, 2005

(30) Foreign Application Priority Data

Aug. 25, 2003   (JP)   ............................ P2003-300521
Aug. 11, 2004   (JP)   ............................ P2004-234022

(51) Int. Cl.
*B25J 9/10* (2006.01)
*G06F 15/00* (2006.01)
*G05B 19/18* (2006.01)
*G05B 19/04* (2006.01)

(52) U.S. Cl. ........................ 700/249; 700/245; 700/247; 318/568.17; 318/568.2; 706/10

(58) Field of Classification Search ................. 700/245, 700/247, 249, 250, 19, 52; 318/568.2, 567, 318/568.1, 568.18, 568.17, 568.23; 901/8, 901/20, 50, 46, 48; 706/2, 10, 904, 912; 601/5

See application file for complete search history.

(56) References Cited

U.S. PATENT DOCUMENTS 4,338,672 A   7/1982   Perzley et al.

(Continued)

FOREIGN PATENT DOCUMENTS

EP   0 572 285 A1   12/1993

(Continued)

OTHER PUBLICATIONS

Yamasaki, et al. "Phase reset and dynamic stability during human gait" Mar. 2003, Science Direct, BioSystems 71, pp. 221-232.*

*Primary Examiner*—Thomas G Black
*Assistant Examiner*—Christine M Behncke
(74) *Attorney, Agent, or Firm*—Oblon, Spivak, McClelland, Maier & Neustadt, L.L.P.

(57) ABSTRACT

The motion of the movable sections of the robot is taken for a periodic motion so that the attitude of the robot can be stably controlled in a broad sense of the word by regulating the transfer of the movable sections. More specifically, one or more than one phase generators are used for the robot system and one of the plurality of controllers is selected depending on the generated phase. Then, the controller controls the drive of the movable sections according to continuous phase information. Additionally, the actual phase is estimated from the physical system and the frequency and the phase of the phase generator are regulated by using the estimated value, while the physical phase and the phase generator of the robot system are subjected to mutual entrainment so that consequently, it is possible to control the motion of the robot by effectively using the dynamics of the robot.

20 Claims, 71 Drawing Sheets

U.S. PATENT DOCUMENTS

| | | |
|---|---|---|
| 5,355,064 A | 10/1994 | Yoshino et al. |
| 5,426,586 A | 6/1995 | Ozawa |
| 6,633,783 B1 * | 10/2003 | Dariush et al. ............. 700/50 |
| 6,961,640 B2 * | 11/2005 | Kuroki et al. ............. 700/245 |
| 2003/0120388 A1 | 6/2003 | Kuroki et al. |
| 2004/0148268 A1 * | 7/2004 | Reil ............................ 706/904 |
| 2004/0176860 A1 * | 9/2004 | Hovakimyan et al. ......... 700/29 |
| 2006/0211956 A1 * | 9/2006 | Sankai ........................... 601/5 |

FOREIGN PATENT DOCUMENTS

| | | |
|---|---|---|
| EP | 1 120 203 A1 | 8/2001 |
| EP | 1 264 667 A2 | 12/2002 |
| WO | WO 02/081157 A1 | 10/2002 |

* cited by examiner

Stance 1: SUPPORT LEG PERIOD (PRECEDING HALF)

Stance 2: SUPPORT LEG PERIOD (SUCCEEDING HALF)

Swing: SWING LEG PERIOD $\phi_1$
oscillator 1

$\phi_2$
oscillator 2

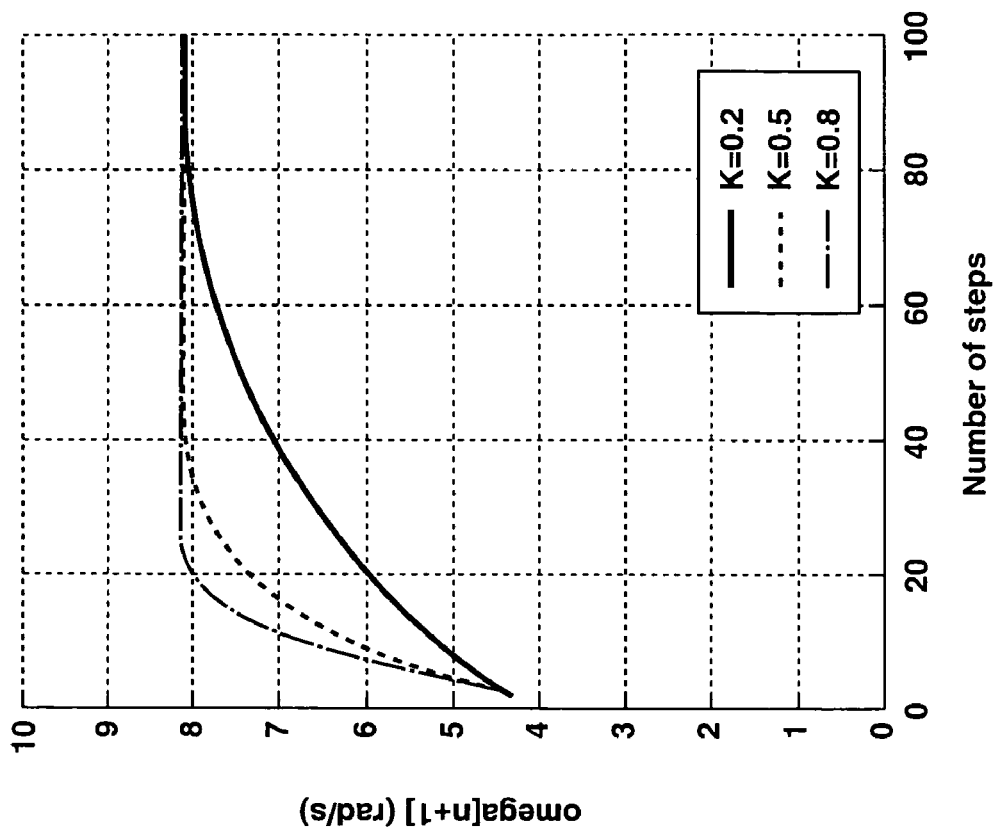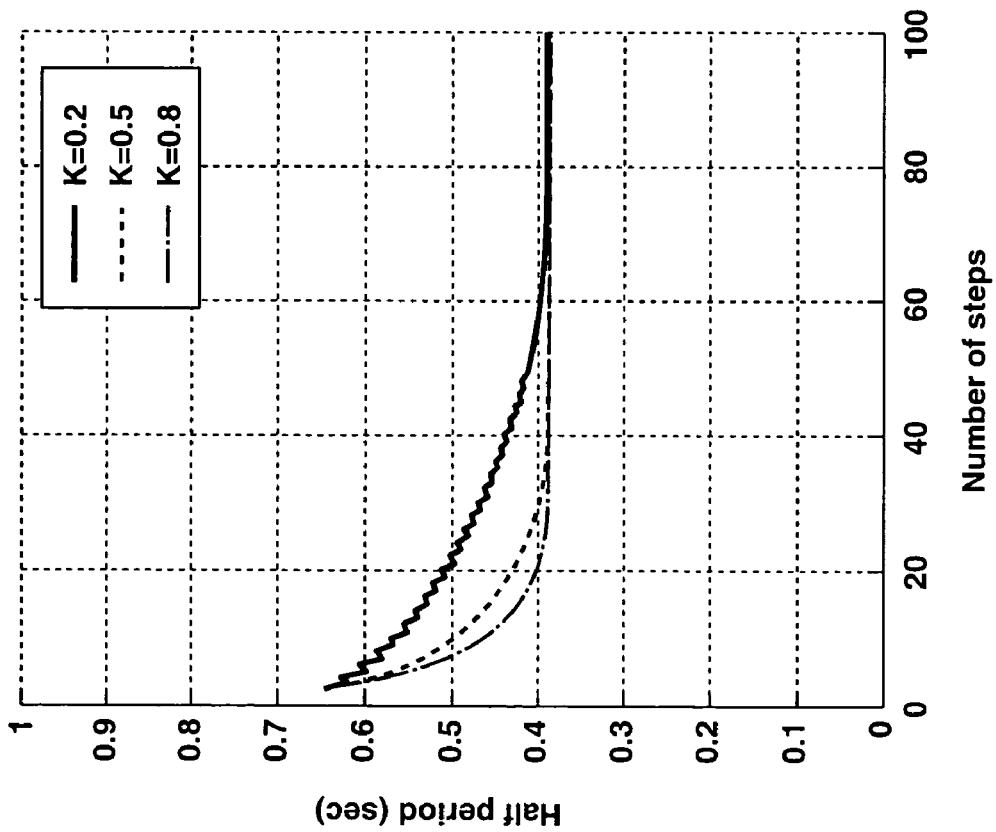
FIG. 41

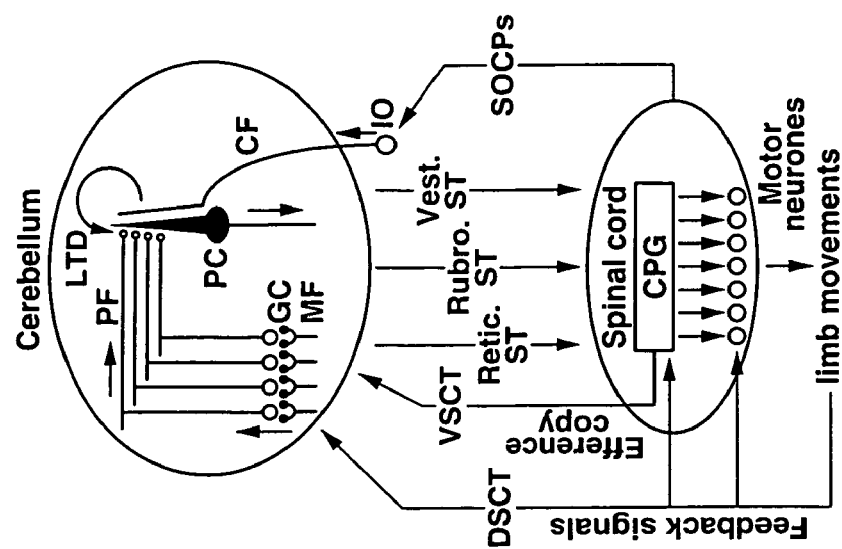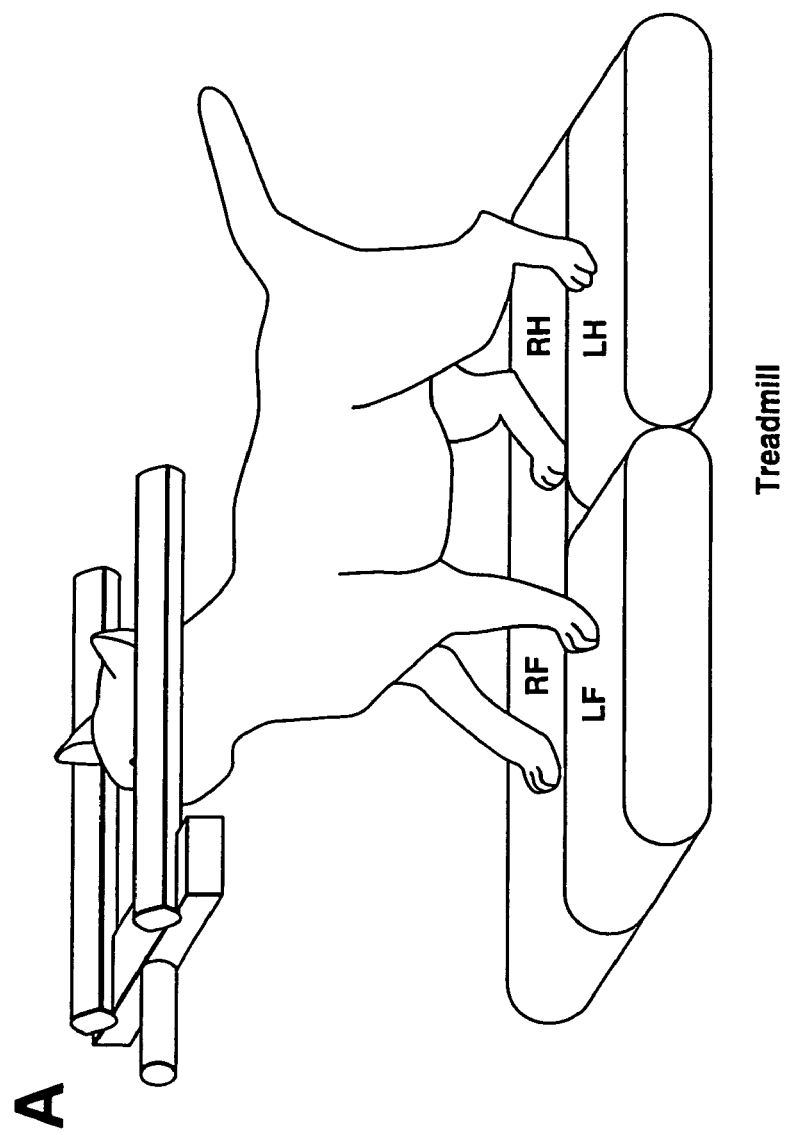
FIG.56

ROBOT AND ATTITUDE CONTROL METHOD OF ROBOT

BACKGROUND OF THE INVENTION

1. Field of the Invention

This invention relates to a robot having a plurality of movable sections such as legs and a method of controlling the attitude of such a robot. More particularly, the present invention relates to a robot that autonomously maintains the stability of its attitude according to a predetermined stability criteria and a method of controlling the attitude of such a robot.

To be more specific, this invention relates to a robot that controls the stability of the attitude of its body without using a ZMP (zero moment point) as stability criteria and a method of controlling the attitude of such a robot. More particularly, it relates to a robot that controls the stability of the attitude of its body by paying attention to periodic motions of the moving parts thereof and a method of controlling the attitude of such a robot.

This application claims priority of Japanese Patent Application No. 2003-300521, filed on Aug. 25, 2003, and Japanese Patent Application No. 2004-234022, filed on Aug. 11, 2004, the entireties of which are incorporated by reference herein.

2. Description of the Related Art

A machine device adapted to move in a manner resembling to motions of human being by means of electric and/or magnetic operations is referred to as "robot". It is said that the word "robot" derives from a Slavic word "ROBOTA (slave machine)".

In Japan, robots started to become popular in the late 1960s, although many of them were industrial robots such as manipulators and transfer robots installed for the purpose of automating productive operations of factories and saving man power. Research and development efforts have been paid in recent years on mobile robots that are equipped with movable legs and adapted to work on legs. Expectations are high for such mobile robots in practical applications. Two-legged mobile robots modeled after human motions are referred to humanoid robots.

While two-legged robots that are based on human's biped locomotion are accompanied by problems of instability and difficulty of attitude control and walk control if compared with crawler type robots and four-legged or six-legged robots, they provide advantages including that they can adapt themselves to unleveled ground, walking surfaces with obstacles and undulations on the way and discontinued walling surfaces such as staircases and ladder to be stepped up and down so that they can move in a flexible manner.

Numerous techniques have already been proposed with regard to attitude control and stable walking of two-legged mobile robots. Stable "walking" as used herein is defined as "moving by using legs without stumbling and falling". When the body of a robot stumbles and falls, it means that the ongoing operation of the robot is suspended and that considerable power and time need to be spent for the robot to stand up from the failing state and resume its operation. Additionally, when the robot stumbles and falls, there arises a risk that the robot itself and/or the object that the falling robot collides with can be fatally damaged. Thus, the attitude/stability control of robots for avoiding stumbling and falling is one of the priority issues when developing two-legged mobile robots.

The standing posture of a robot that is based on human's biped locomotion is unstable as basic attitude. A ZMP (zero moment point) is often used as a criteria for the stability of walking of a two-legged mobile robot. The evaluation of the stability of walking using a ZMP is based on d'Alembert's principle that the gravity and the inertial force exerted by a walking system on the floor surface and their moments are balanced respectively by the reaction force of the floor exerted by the floor surface to the walking system and its moment. As a consequence of reasoning in the framework of dynamics, there exists a point where both the pitch axis moment and the roll axis moment are equal to zero, or a ZMP, on one of the sides of the supporting polygon (or the ZMP-stable region) formed by the contact points of the soles relative to the floor and the floor surface or in the inside thereof (see, inter alia, Non-Patent Reference Document 1).

Generation of a bipedal walk pattern on the basis of the ZMP criteria provides advantages including that it is possible to define a sole landing point in advance and that it is easy to consider kinetic constraints for the tips of the feet corresponding to the profile of the floor surface. Additionally, using a ZMP for the evaluation of stability means that it is not force but a trajectory of motion that is handled as target for controlling the motion and hence it is technically more feasible.

Target ZMP control has been successful on real robots when motions are planned so as to achieve dynamic balance at each and every moment. The motion generation technique using a ZMP as stability criteria can realize stable bipedal walking and hence is a proven technique. On the other hand, in an aspect, stability control on the basis of a ZMP is constantly being restricted by a single equation and hence it is necessary to accurately model the robot itself and the environment in order to plan a trajectory of motion according to the ZMP criteria and constantly make the plan match the environment model to realize a robot motion by means of a high precision trajectory tracking control system. In other words, stability control on that basis of a ZMP is accompanied by a problem of adaptability to unknown environment. The operation of solving the ZMP equation entails a relatively heavy calculation cost and hence difficulties in real time control situations.

Satisfying the ZMP equation is a sufficient condition and not a necessary condition for attitude stability control of robot. It will be appreciated that human walk is not necessarily always maximizing the ZMP stability margin.

On the other hand, man walks humanly with the biological mechanism he has, appropriately utilizing the passive dynamics of the limbs without relying on a ZMP. If a robot can smartly utilize the passive dynamics, it may be possible to realize a walking motion with a high energy conversion efficiency, requiring neither an exquisitely designed model (and hence a heavy calculation cost of computing operations) nor a large drive torque of actuators.

For example, it is possible to take a walking motion for a periodic motion and at least part of each movable section of a robot for a physical oscillator. Then, it will be possible to control the walking motion of robot by determining or controlling the phase and the frequency of oscillation of the oscillator. When such a periodic motion continues, it may be taken for "a stable walk". If there is a moment in a period when the dynamic balance and hence the stability are lost (according to the ZMP theory), it is possible to continue the walking motion so long as the stable limit cycle is restored by repeating the period. Furthermore, if the stable limit cycle is not restored in a period, the motion can be continued so long as the motion is converged to a constant periodic motion within a realistic period of time.

If stability is defined as such by paying attention to the walking motion of robot, it will be possible to realize "comprehensive stability" because a steady state is restored within several periods if the robot is exposed to an unknown external disturbance. Then, as a result, neither a precise model nor a precise trajectory tracking control is required. Additionally, the gain of the actuator can be reduced to make it possible to reduce the cost and improve the stability with a small gain. (Differently stated, if a precise model and a precise trajectory tracking control are required, the cost will rise due to the large gain and the precision). Furthermore, from the viewpoint of comprehensive, the robot is allowed to go out of a stable region. Then, walk and other leg motions (attitudes) can be realized in a variety of modes to raise the expression potential of the robot and improve the adaptability to the environment.

Walking techniques of legged mobile robot that pay attention to the periodicity of walking motion include biologically inspired adaptive dynamic walking of a quadruped robot on irregular terrain (see, inter alia, Non-Patent Reference Document 2) and the relationship between rhythm resetting against an external disturbance and dynamic stability of walk in a bipedal walking motion of man (see, inter alia, Non-Patent Reference Document 3).

According to the former document, an adaptive motion is creatively generated through interaction of a dynamic system formed by coupling a machine system and a nervous system on the basis of unique non-linear dynamics and the environment. However, the former document says that phase and frequency are entrained by a nonlinear differential equation (Matsuoka Oscillator) to reveal that it is not possible to obtain an analytic solution for the phase of the physical oscillator and hence mathematically design the system. In short, it is not possible to get to any specific design theory.

According to the latter document, it is possible to mathematically analyze the relationship between the trajectory of motion that involves phase resetting and dynamic stability by using a dynamics type model for a bipedal walking motion. However, it only describes regulation of the phase of the physical oscillator by way of an open loop immediately after a known external disturbance and lacks any feedback from the physical system and hence adaptability to unknown states and external disturbances.

[Non-Patent Reference Document 1] Miomir Vukobratovic, "LEGGED LOCOMOTION ROBOTS", (Ichiro Kato et al., "A Walking Robot and Artificial Feet", (Nikkan Kogyo Shinbun, Ltd.).

[Non-Patent Reference Document 2] Fukuoka et al., "Biologically Inspired Adaptive Dynamic Walking of a Quadruped on Irregular Terrain—Proposal of the Design of Coupled Neuro-Mechanical System and Evaluation of the Mutual Entrainment among Pitch Motion, CPG and Rolling Motion", (Journal of Robotics Society in Japan, Vol. 21, No. 5, July 2003).

[Non-Patent Reference Document 3] Yamazaki et al., "The Relationship between Rhythm Resetting against an External Disturbance and Dynamic Stability of a Bipedal Walking Motion of Man", (Technical Report of IEICE, The Institute of Electronics, Information and Communication Engineers).

SUMMARY OF THE INVENTION

In view of the above-identified circumstances, it is therefore an object of the present invention to provide a superior robot that can autonomously maintain the stability of its attitude according to a given stability criteria and a method of controlling the attitude of such a robot.

Another object of the present invention is to provide a superior robot that can control the stability of the attitude of its body without using a ZMP (zero moment point) as stability criteria and a method of controlling the attitude of such a robot.

Still another object of the invention is to provide a superior robot that controls the stability of the attitude of its body by paying attention to periodic motions of the moving parts thereof and a method of controlling the attitude of such a robot.

A further object of the invention is to provide a superior robot adapted to control its movable sections by taking at least part of each movable section for a physical oscillator and generating a mathematically tractable phase and adaptively deal with any unknown disturbance and a method of controlling the attitude of such a robot.

The present invention is made to achieve the above objects. In an aspect of the invention, there is provided a robot having a plurality of movable sections, the robot comprising: a phase signal generating means for generating a phase signal relating to a periodic motion of at least part of the movable sections; a control means for generating a control signal for the movable sections according to the phase signal; a drive means for driving the movable sections according to the control signal; a state quantity detecting means for detecting the state quantities of the movable sections driven by the drive means; and an estimation means for estimating the phase or the angular frequency of the periodic motion of the movable sections according to the state quantities; the phase signal generating means being adapted to update the phase signal according to the phase or the angular frequency estimated by the estimation means.

The control means includes a plurality of controllers having different control rules and selects an appropriate controller according to the phase signal and the selected controller generates a control signal for the movable sections according to the phase signal.

Thus, with a robot according to the invention, the motion of the movable sections is taken for a periodic motion so that the attitude of the robot can be stably controlled in a broad sense of the word by regulating the transfer of the movable sections. More specifically, one or more than one phase generators are used for the robot system and one of the plurality of controllers is selected depending on the generated phase. Then, the controller controls the drive of the movable sections according to continuous phase information. Additionally, the actual phase is estimated from the physical system and the frequency and the phase of the phase generator are regulated by using the estimated value, while the physical phase and the phase generator of the robot system are subjected to mutual entrainment so that consequently it is possible to control the motion of the robot by effectively using the dynamics of the robot.

FIG. 1 schematically and conceptually illustrates the configuration of the attitude stability control mechanism of a robot according to the invention. With the robot the motion of the movable sections is taken for a periodic motion and walk and other motions of the movable sections are described in terms of phase.

One or more than one phase generators are defined for each physical system of the robot system. A plurality of controllers with different control rules are provided so that an appropriate controller is selected depending on the phase output of the robot system.

Then, the selected controller controls the drive of the movable sections of the robot according to the continuous phase information Φ supplied from the phase generator.

Sensors are provided on the robot system to detect the state quantities of the movable sections when the movable sections are driven. The phase estimator estimates the angular frequency ω and the phase Φ that are realized according to the information from the sensors.

Then, the phase generator regulates the phase and the frequency of the periodic motion of the movable sections according to the phase and the angular frequency of the motion that are estimated by the phase estimator.

Conventionally, when a walking motion is taken for a periodic motion, a periodic signal is generated by a neural oscillator or the like and the actuators are controlled by using the periodic signal. Then, entrainment is made to take place by causing the periodic signal on the walking motion being observed and the neural oscillator to interfere with each other to realize a stable walking motion (see, inter alia, Non-Patent Reference Document 2).

To the contrary, according to the present invention, while a waling motion is also taken for a periodic motion, an amplitude signal is not generated by using a neural oscillator or the like but as a control output that is obtained from a phase signal generated by a phase generator. With this arrangement, it is possible to facilitate the design operation particularly in terms of entrainment control and obtaining a broad stability region.

The phase signal is typically adjusted by the following updating rule.

$$\omega = \omega_0 + \Delta\omega$$

$$\phi = \phi_0 + \Delta\phi \quad \text{[formula 1]}$$

In the above formula, $\Delta\omega$ and $\Delta\Phi$ are estimated values of phase errors of the phase estimator and the phase generator on a motion obtained by observing the motion. The phase of the motion can be estimated from the robot sensors. More specifically, in the case of a walking motion, the phase can be estimated from the touch down time of the sole switch (or the touch down confirming sensor) and the period of the motion. In the case of a motion of arms from which a coordinated periodic motion of the entire body can be predicted on the basis of the time when the contact switch of a finger tip touches an object and the time elapsed since the start of the motion, the phase can be estimated from the time when a similar joint motion starts and the period of the motion.

Then, an input signal (control output) U for the movable sections of the robot is obtained by using an appropriate transformation of the phase signal Φ generated by the phase signal generating means.

$$U = f(\phi) \quad \text{[formula 2]}$$

If the phase and the angular frequency that are estimated from the vector V of the observation signal are respectively $\Phi_0$ and $\omega_0$, an estimated value of phase error can be obtained from the formula below (an estimation method of comparing the control output U and the observation vector V or an estimation method of estimating directly from Φ and V or $\Phi_0$ and U or U, V and Φ may be conceivable as modification to the above method).

$$\Delta\phi = \phi_0 \cdot \phi$$

$$\Delta\omega = \omega_0 \cdot \omega \quad \text{[formula 3]}$$

A technique of gradually changing the phase or manipulating the phase by means of dynamics may be conceivable in order to guarantee a smooth motion. For example, a technique of using the formulas below may be conceivable.

$$\alpha \frac{dx}{dt} = -x + \Delta\phi \quad \text{[formula 4]}$$

$$\beta \frac{dy}{dt} = -y + \Delta\omega$$

-continued $$\phi = \phi_0 + x \quad \text{[formula 5]}$$

$$\omega = \omega_0 + y$$

When a sharp phase change is predictable (e.g., as a result of stumbling during the walk), a technique of manipulating the input signal (control output) U to the movable sections of the robot by using a dynamical system may be conceivable. For example, a smooth motion can be realized by using the formula below. (A technique of smoothly changing the phase is suited for a walk that ends with several steps such as a walk on a slope. On the other hand, the phase has to be changed sharply and the control basis itself has to be switched for a motion such as a stumbling motion that needs to be responded quickly. The controller guarantees a smooth motion in such a case.)

$$\gamma \frac{dz}{dt} = -z + f(\phi) \quad \text{[formula 6]}$$

$$U = z$$

Many of the conventional control methods in which the motion of the movable sections of the robot is taken for a periodic motion describe the target trajectory of motion by using time as parameter. To the contrary, the target trajectory is described by using phase Φ.

Additionally, according to the invention, one or more than one phase generators are defined for a single robot system. While the configuration of the phase generators is not subjected to any specific limitations, it is desirable from the design point of view that an analytic solution is obtained for behavior by phase resetting. The phase generator is the machine body itself of the robot. However, the phase generator allows arbitrariness. For instance, the machine body of the robot may be regarded as a phase generator. Or, it may be so regarded that a phase generator is provided for each degree of freedom of each joint (as will be described hereinafter).

Still additionally, according to the invention, an appropriate controller is selected depending on the phase output Φ from the robot system. For example, as shown in the table blow, the phase of the robot system is determined according to the state of the legs and a controller is provided for each possible state. If two or more than two controllers are based on the same PD control method, they are made to use different control parameters (e.g., different gain values).

TABLE 1

| Phase Φ | State of legs | Controller |
|---|---|---|
| $0 < \Phi < \pi$ | Supporting leg | Position control |
| $\pi < \Phi < 2\pi$ | Swing leg | Impedance control |

The selected controller controls the movable sections according to continuous phase information Φ. When a motion is described in terms of a dynamical system, the controller can guarantee a smooth motion if a sharp phase change takes place.

FIG. 2 schematically illustrates a mechanism for appropriately selecting a controller according to phase information Φ when a two-legged mobile robot makes a walking motion, using the left and right legs as supporting leg and swing leg alternately in a switched manner.

In the illustrated instance, there are provided a controller for controlling a swing leg lifting motion according to phase information Φ (swing controller), a controller for controlling a ground touching motion of the swing leg according to phase information Φ (touch down controller), a controller for controlling a motion of supporting the robot on the two legs according to phase information Φ (double support controller) and a controller for controlling a motion of supporting the robot on a single leg according to phase information Φ (single support controller).

The phase generator generates phase Φ at the current time in a walking motion. Then, a controller is selected according to the phase Φ and phase information Φ is supplied to the selected controller.

The controller generates a control output U for the movable sections of the robot according to the supplied phase information Φ. The movable sections of the robot are driven for a walking motion according to the controller quantity U.

During the walking motion, the output values of the sensors for the angles, the angular velocities, the angular accelerations and so on of the joints in the movable sections are acquired and input to the phase estimator. The phase estimator estimates the phase and the angular frequency in the periodic motion according to the sensor output values, or the state quantities of the movable sections and supplies them to the phase generator.

The phase generator updates the phase signal Φ and regulates the phase of the periodic motion of the robot system according to the phase and the angular frequency that are estimated by the phase estimator.

The degree of freedom of joint of each of the movable sections of the robot is not smaller than 1. Then, the state quantity detecting means detects the joint angle and the joint angular velocity as state quantities. Then, the estimation means can estimate the phase or the frequency of the periodic motion of each of the joint according to the joint angle and the joint angular velocity.

As a most simple example, assume that the phase is output as joint angle. Then, a sinusoidal wave chart is obtained in a graph where the horizontal axis indicates time T and the vertical axis indicates the joint angle θ (see FIG. 3). A phase diagram of a unit circuit is obtained in a graph where the horizontal axis indicates the joint angle and the vertical axis indicates the joint angular velocity. Then, the rotary angle (the angle formed by the straight line connecting a point on the unit circuit and the origin and the horizontal axis) Φ at a given time is the phase of the periodic motion (see FIG. 4).

A plurality of movable legs may be provided as movable sections. If such is the case, the state quantity detecting means detects the reaction force that each of the soles of the movable legs receives from the floor as state quantity. Then, the estimation means can estimate the phase or the angular frequency according the reaction force of the floor for the sole of each of the movable legs. For example, it can determine the single leg supporting period of either the left leg or the right leg and the double leg supporting period on the basis of the reaction force of the floor. Then, it can estimate the outcome of the determination on the supporting leg(s) as phase Φ in the walking motion.

As pointed out above, the robot may be provided with a plurality of movable legs as movable sections. If such is the case, the state quantity detecting means may detect the reaction force that each of the soles of the movable legs receives from the floor as state quantity. Then, the estimation means may estimate the phase or the angular frequency of the periodic motion of the movable sections according the reaction force of the floor for the sole of each of the movable legs.

Alternatively, the state quantity detecting means may detect the friction force that each of the soles of the movable legs receives from the floor in the moving direction or in a direction perpendicular to the moving direction as state quantity. Then, the estimation means may estimate the phase or the angular frequency of the periodic motion of each of the movable sections according the friction force that the sole of the movable leg receives from the floor.

The robot may be provided with a trunk section and the state quantity detecting means may detect the gradient of the trunk section as state quantity. Then, the estimation means may estimate the phase or the angular frequency of the periodic motion of each of the movable sections according to the gradient of the trunk section.

The state quantity detecting means may detect the acceleration of the robot or each of the movable sections as state quantity and the estimation means may estimate the phase or the angular frequency of the periodic motion of each of the movable sections according to the acceleration.

The estimation means may reset the phase relating to the periodic motion of the joint in response to an occurrence of a predetermined event.

The estimation means may learn the training signal relating to the state quantity detected by the state quantity detecting means and the period of the movable sections and estimate the phase or the angular frequency according to the training signal it has learnt.

The estimation means may be formed by a neural network that outputs the phase or the angular frequency relating to the periodic motion of the movable sections depending on the state quantity as detected by the state quantity detecting means.

The estimation means may continuously estimate the phase or the angular frequency by means of a feed forward neural network according to the information from a plurality of continuously arranged internal sensors.

When the phase is estimated as discretely, for example, the touch down of one of the legs and that of the other leg may be defined respectively as phase $0$ and phase $\pi$ for observation on the basis of the output of the touch down confirming sensor of each of the soles. In this case, the frequency can be computed from the time interval of the touch downs of the left and right legs.

In a robot according to the invention, one or more than one phase generators are defined for each physical system. The machine body may be taken for a physical oscillator that does a periodic motion and a single phase generator may be defined for the entire machine body as shown in FIG. 5.

Alternatively, the motion of each of the legs may be taken for an independent periodic motion when walk or some other leg motion is concerned. Then, a phase generator may be defined for each leg as shown in FIG. 6.

When walk or some other leg motion is concerned, the left and right legs operate in a coordinated manner to alternately repeat a single leg support and a double leg support. Therefore, the lower limbs may be regarded as doing a single periodic motion, while the upper limbs, the trunk and other members may be regarded as doing another periodic motion. Then, phase generators may be defined for the lower limbs and for the upper limbs, the trunk and the other members respectively as shown in FIG. 7. However, in this case, the motion of each of the legs may be taken for an independent periodic motion. Then, a phase generator may be defined for each leg as shown in FIG. 8.

Still alternatively, when walk or some other machine body motion is concerted, the motion of each of the legs, the arms, the trunk and the head may be taken for an independent period motion. Then, a phase generator may be defined for each of these members as shown in FIG. 9.

However, each of the movable sections does not need to be regarded as doing a periodic motion that is produced as a result of combining the motions of the related adjacent joints. In other words, the motion of each of the joints may be taken for an independent periodic motion. Then, a phase generator may be defined for each joint as shown in FIG. 10.

When a plurality of phase generator are defined on a single robot as shown in FIGS. 6 through 10, controllers are provided for each movable section for which a phase generator is defined and which is regarded as doing a periodic motion and the controllers are made to have corresponding different control rules. In such a case, the robot may additionally be provided with a coordinating means for coordinating the control quantities from the controllers of the movable sections in order for the entire robot to do a coordinated motion.

The motions of all the movable sections of the robot may not be taken for periodic motions. In other words, there may be movable sections whose motions may be taken for periodic motions and movable sections whose motions may not be taken for periodic motions.

If such is the case, the movable sections may be provided with second control means adapted to control the respective movable sections according to control rules that have nothing to do with periodic motions so that the movable sections doing a motion that is not taken for a periodic motion may be controlled appropriately. The second control means generate a control signal typically according to the ZMP stability criteria.

If such is the case, the robot may further comprise a coordinating means for coordinating the control quantities for the movable sections doing periodic motions that are output from the control means according to the phases of the periodic motions and the control quantities for the movable sections not doing periodic motions that are output from the second control means in order for the entire robot to do a coordinated motion (see FIG. 11).

Thus, according to the present invention, there are provided a superior robot that can control the stability of the attitude of its body without using a ZMP (zero moment point) as stability criteria and a method of controlling the attitude of such a robot.

According to the invention, there are provided a superior robot that controls the stability of the attitude of its body by paying attention to periodic motions of the moving parts thereof and a method of controlling the attitude of such a robot.

According to the invention, there are provided a superior robot adapted to control its movable sections by taking at least part of each movable section for a physical oscillator and generating a mathematically tractable phase and adaptively deal with any unknown disturbance and a method of controlling the attitude of such a robot.

Other objects, characteristic features and advantages of the present invention will become apparent from the description of preferred embodiments given below by referring to the accompanying drawings.

BRIEF DESCRIPTION OF THE DRAWINGS

FIG. 14 is a schematic illustration of the degree of freedom of each of the joints that a legged mobile robot 100 is provided with;

FIG. 41 shows graphs illustrating some of the results of a walk simulation;

FIG. 56 shows schematic illustrations of an animal experiment using a cat;

DETAILED DESCRIPTION OF THE PREFERRED EMBODIMENTS

Now, the present invention will be described in greater detail by referring to the accompanying drawings.

A. Configuration of Robot

Figure 12:
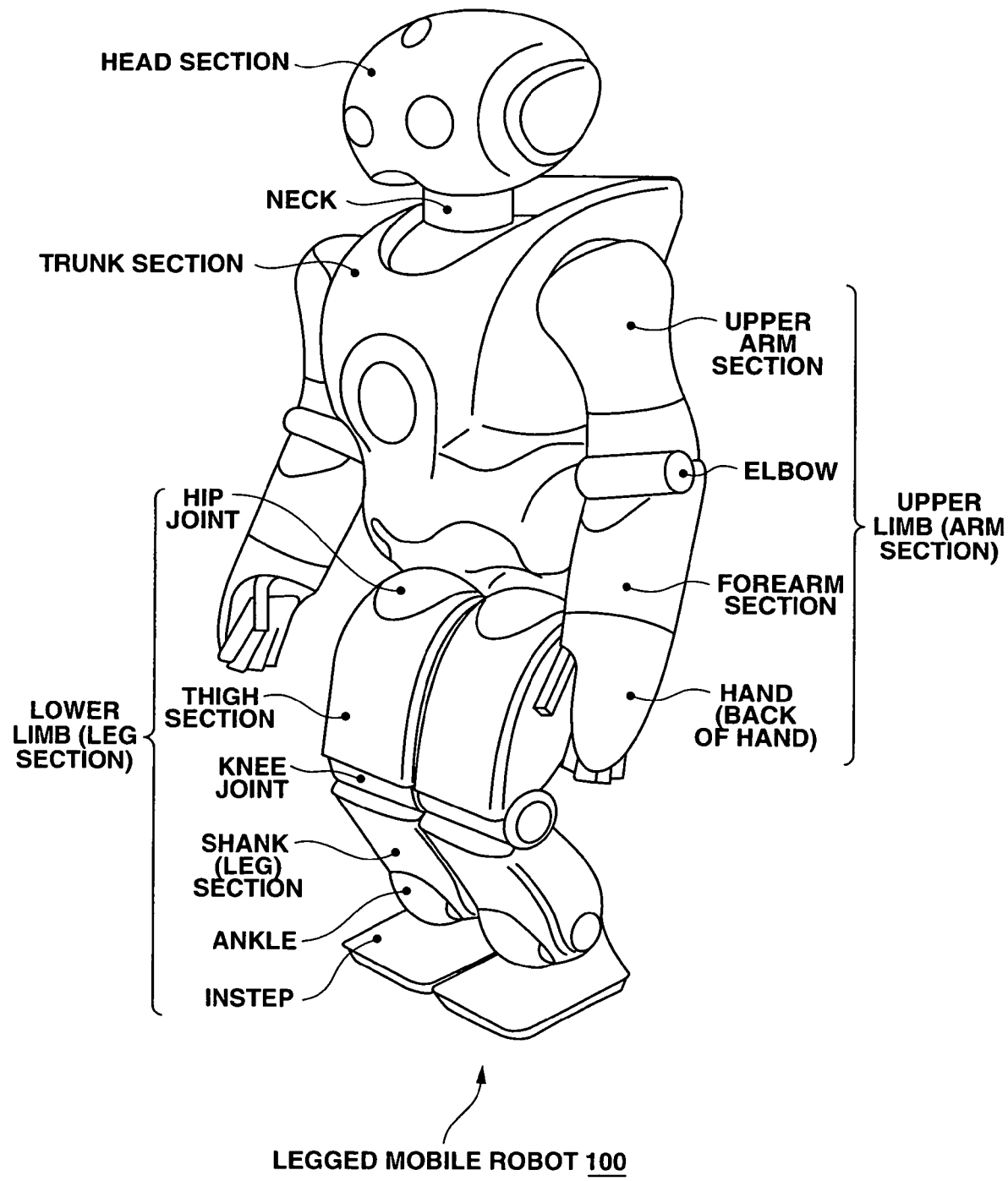
FIG. 12 is a schematic perspective front view of a legged and standing mobile humanoid robot 100 that is an embodiment of the present invention.
Figure 13:
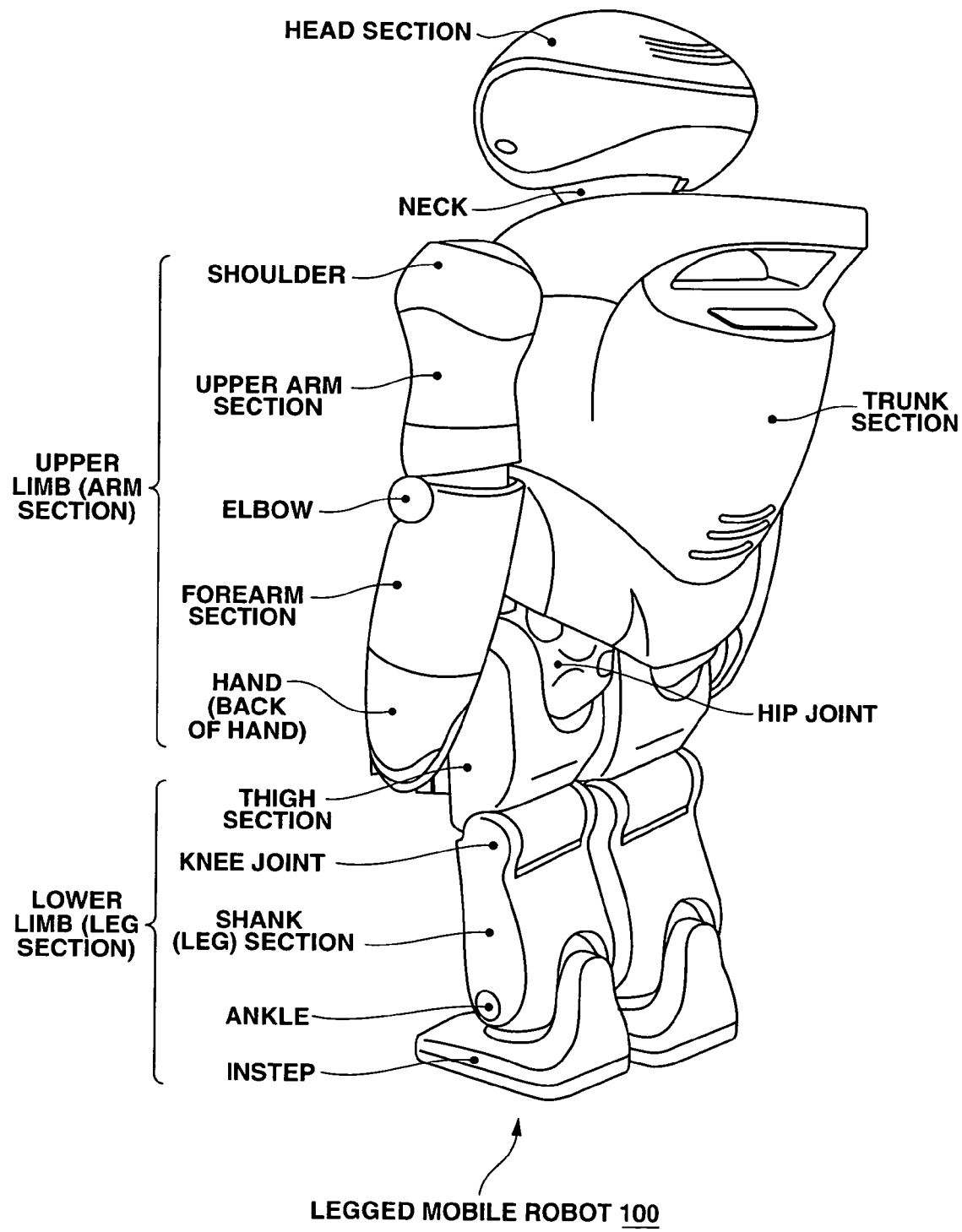
FIG. 13 is a schematic perspective rear view of a legged and standing mobile humanoid robot 100 that is an embodiment of the present invention.

FIGS. 12 and 13 are schematic perspective front and rear views of a legged and standing mobile humanoid robot 100 that is an embodiment of the present invention. As illustrated, the legged mobile robot 100 has a trunk section, a head section, left and right upper limbs and left and right lower limbs that are driven to operate for moving. The operation of the machine body is controlled by a control section (not shown) that is typically contained in the trunk.

Each of the lower limbs has a thigh section, a knee joint, a shank section, an ankle and an instep and is linked substantially to the lower end of the trunk section by a hip joint. Each of the upper limbs has an upper arm, an elbow joint and a forearm and is linked to the corresponding upper lateral edge of the trunk section by a shoulder joint. The head section is linked substantially to the center top of the trunk section by a neck joint.

The control section is a cabinet containing a controller (main control section) for processing external inputs from the drive controls and the sensors (which will be described in greater detail hereinafter) of each of the joint actuators of the legged mobile robot 100, power supply circuits and other peripheral devices. The control section may additionally contain one or more than one communication interfaces and communication devices for remote control purposes.

The legged mobile robot 100 having the above described configuration can walk on two legs under coordinated action control of the control section for the entire body. Such a walk on two legs is realized by repeating a walk period that is generally divided into motion periods listed below.

(1) single leg support period of the left leg with the right leg being lifted
(2) double leg support period with the right leg on the floor
(3) single leg support period of the right leg with the left leg being lifted
(4) double leg support period with the left leg on the floor.

The walk of the legged mobile robot 100 is controlled typically by planning a target trajectory of each of the lower limbs in advance, using a ZMP as stability criteria, and modifying the planned trajectory in each of the above listed periods. In the double leg support periods, the operation of modifying the trajectory of each of the lower limbs is suspended and the height of the hip is modified to a constant value by using the total modification quantity for the planned trajectory. In the single leg support periods, a modified trajectory is generated so as to restore the modified relative positional relationship of the ankle of each of the legs and the hip and make it match the planned trajectory.

Alternatively, it is possible to take at least part of the movable sections of the entire body of the legged mobile robot 100 such as the left and right legs for a physical oscillator and generate a phase of the physical oscillator by a mathematical operation depending on to the internal state and the external environment obtained on the basis of the sensor outputs in order to realize stability of the machine body in a broad sense of the word and make it adaptively respond to any unknown external disturbance.

Figure 14:
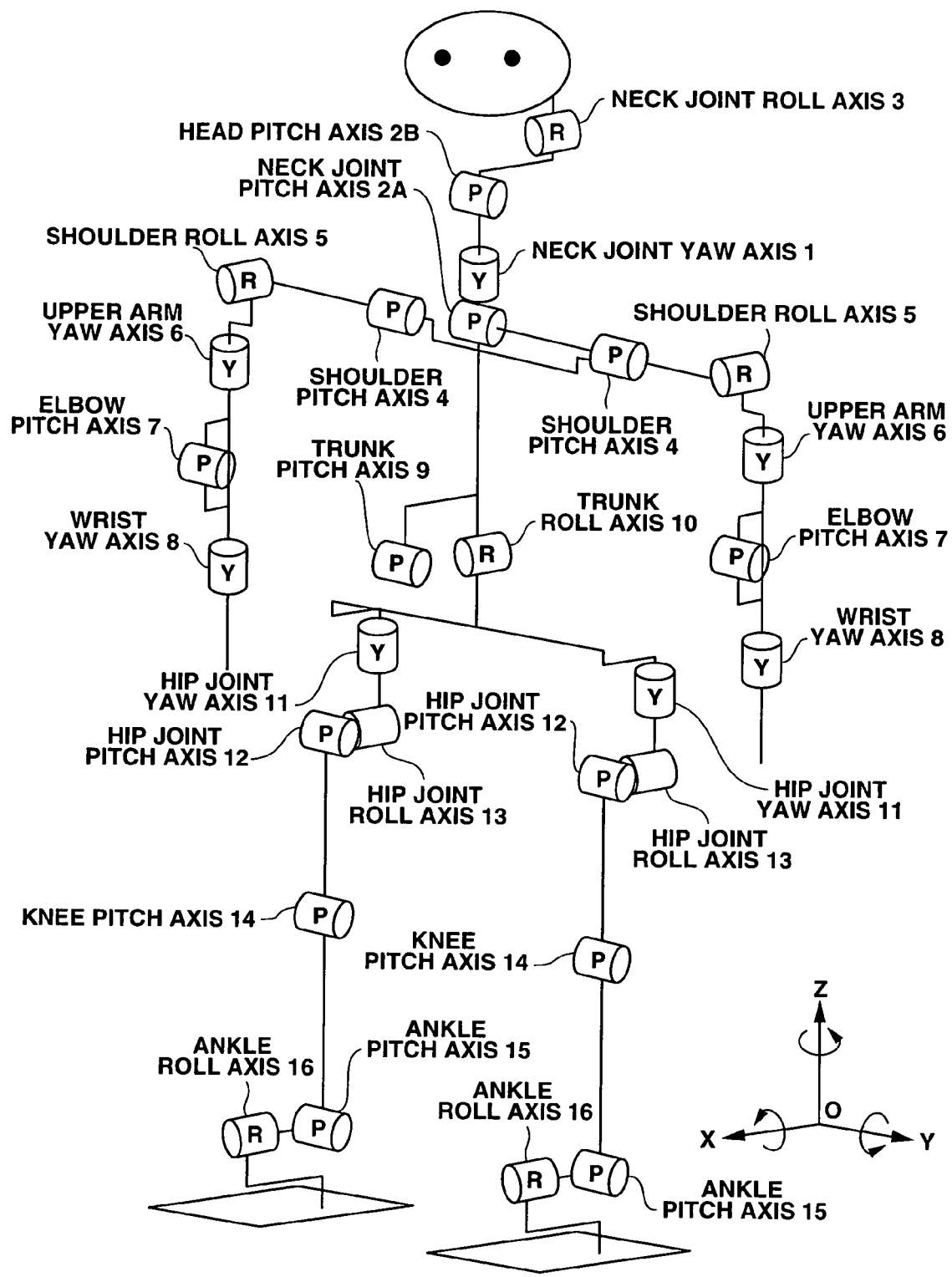

FIG. 14 is a schematic illustration of the degree of freedom of each of the joints that the legged mobile robot 100 is provided with. As shown in FIG. 14, the legged mobile robot 100 is a structure having upper limbs including two arms and a head section 1, lower limbs including two legs for realizing moving actions and a trunk section linking the upper limbs and the lower limbs. In short, the legged mobile robot 100 has a plurality of limbs.

The neck joint supporting the head section has three degrees of freedom provided by a neck joint yaw axis 1, first and second neck joint pitch axes 2*a*, 2*b* and a neck joint roll axis 3.

Each of the arms has a shoulder joint pitch axis 4, a shoulder joint roll axis 5, an upper arm yaw axis 6, an elbow joint pitch axis 7, a wrist joint yaw axis 8 and a hand section to provide its degrees of freedom. The hand section is in reality a multi-joint structure including a plurality of digits and provided with a degree of freedom.

The trunk section has two degrees of freedom provided by a trunk pitch axis 9 and a trunk roll axis 10.

Each of the legs of the lower limbs has a hip joint yaw axis 11, a hip joint pitch axis 12, a hip joint roll axis 13, a knee joint pitch axis 14, an ankle joint pitch axis 15, an ankle joint roll axis 16 and a foot.

However, if the legged mobile robot 100 is designed for entertainment, it is not necessary that the robot is provided with all the above listed degrees of freedom. Nor, the robot is limited to the listed degrees of freedom. It may be needless to say that the degree of freedom, or the number of joints, may be increased or decreased depending on the restrictive conditions and the specification requirements posed in the design and manufacturing stages.

The center of gravity of the legged mobile robot 100 of this embodiment is arranged at the hip. Thus, the hip is an important object of control in terms of attitude stability control and operates as a "basic body member" of the robot.

Figure 15:
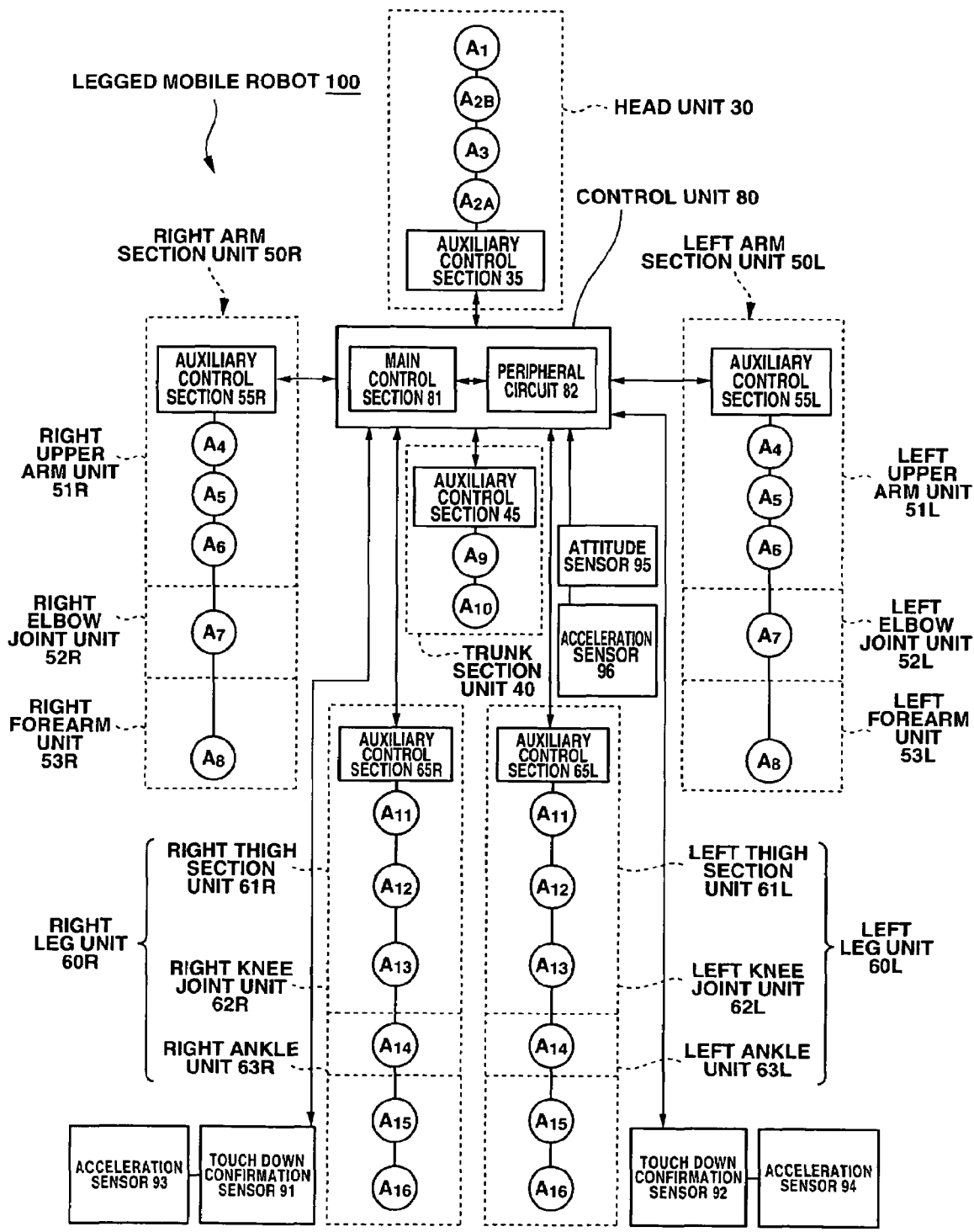
FIG. 15 is a schematic illustration of the configuration of the control system of a legged mobile robot 100.

FIG. 15 is a schematic illustration of the configuration of the control system of the legged mobile robot 100. As shown in FIG. 15, the legged mobile robot 100 comprises mechanism units 30, 40, 50R/L, 60R/L that correspond to the four limbs of man and a control unit 80 that adaptively controls the mechanism units in order to realize a coordinated motion of the robot (R and L are suffixes respectively denoting right and left).

The motion of the entire legged mobile robot 100 is comprehensively controlled by the control unit 80. The control unit 80 comprises a main control section 81 including a CPU (central processing unit) and other main circuit components such as memories (not shown) and peripheral circuits 82 including power supply circuits and interfaces (not shown), by way of which the control unit 80 exchanges data and commands with different components.

The peripheral circuits 82 include peripheral devices mounted in the machine body, external peripheral devices connected to the machine body by way of cables and radio waves and interface connectors for connecting an electrically charging station (not shown) and other peripheral devices.

When realizing the present invention, the place of installation of the control unit 80 is not subjected to any particular limitations. While it is mounted in the trunk unit 40 in FIG. 15, it may alternatively be mounted in the head unit 30. Still alternatively, the control unit 80 may be arranged outside the legged mobile robot 100 so as to communicate with the machine body of the legged mobile robot 100 by way of a wire or wirelessly.

The degree of freedom of each of the joints of the legged mobile robot 100 illustrated in FIG. 14 is realize by so many actuators. More specifically, a neck joint yaw axis actuator A1, a neck joint pitch axis actuator A2 and a neck joint roll axis actuator A3 are provided in the head unit 30 respectively for the neck joint yaw axis 1, the neck joint pitch axis 2 and the neck joint roll axis 3.

The trunk unit 40 is provided with a trunk pitch axis actuator A9 and a trunk roll axis actuator A10 respectively for the trunk pitch axis 9 and the trunk roll axis 10.

While the arm units 50R/L respectively comprise upper arm units 51R/L, elbow joint units 52R/L and forearm units 53R/L, each of them is provided with a shoulder joint pitch axis actuator A4, a shoulder joint roll axis actuator A5, an upper arm yaw axis actuator A6, an elbow joint pitch axis actuator A7, a wrist joint yaw axis actuator A8 respectively for the shoulder joint pitch axis 4, the shoulder joint roll axis 5, the upper arm yaw axis 6, the elbow joint pitch axis 7 and the wrist joint yaw axis 8.

While the leg units 60R/L respectively comprises thigh units 61R/L, knee units 62R/L and shank units 63R/L, each of them is provided with a hip joint yaw axis actuator A11, a hip joint pitch axis actuator A12, a hip joint roll axis actuator A13, a knee joint pitch axis actuator A14, an ankle joint pitch axis actuator A15 and an ankle joint roll axis actuator A16 respectively for the hip joint yaw axis 11, the hip joint pitch axis 12, the hip joint roll axis 13, the knee joint pitch axis 14, the ankle joint pitch axis 15 and the ankle joint roll axis 16.

Each of the actuators A1, A2, A3, . . . arranged at the respective joint axes is preferably a compact actuator that is directly coupled to a gear and realized as one chip so as to be mounted in a motor unit.

The mechanical units including the head unit 30, the trunk unit 40, the arm units 50 and the leg units 60 are provided respectively with auxiliary control sections 35, 45, 55, 65 for controlling the operation of driving the actuators.

The trunk section 40 of the machine body is provided with acceleration sensors 95 and attitude sensors 96. The acceleration sensors 95 are arranged typically for the X, Y and Z axes. When the acceleration sensors 95 are arranged at the hip section of the machine body, it is possible to select the hip, which is a member that requires a large mass manipulation quantity, as object of control and directly observe the attitude and the acceleration of the member so as to control the attitude stability, using a ZMP.

Each of the legs 60R, 60L is provided with one or more than one touch down confirming sensors 91 or 92 and one or more than one acceleration sensors 93 or 94, whichever appropriate. The touch down confirming sensors 91 and 92 are pressure sensors fitted to the respective soles to detect if either or both of the soles of the legged mobile robot 100 contact the floor or not according to presence or absence of reaction force of the floor. Thus, it is possible to detect a double leg support period and a single leg support period and estimate the phase $\Phi$ and the angular frequency $\omega$ of each of the movable legs that operate as physical oscillators.

The acceleration sensors 93 and 94 are arranged in the X and Y axis. As the left and right feet are provided with the acceleration sensors 93, 94, it is possible to directly formulate a ZMP equation for the feet that are most close to a ZMP position.

The main control section 80 controls attitude stability depending on the internal state and the external environment of the robot 100 according to the outputs of the sensors 91 through 93. More specifically, it adaptively controls the auxiliary control sections 35, 45, 55, 65 so as to drive the upper limbs, the trunk and the lower limbs in a coordinated manner. A first technique of attitude stability control is to plan a motion so as to establish dynamic balance at each and every moment, using a ZMP as criteria, for target ZMP control. A second technique of attitude stability control is to extract a periodic motion at least at part of the machine body such as movable legs typically during a walking motion and generate a phase signal for it depending on the internal state and the external environment so as to drive and control the movable sections according to the phase signal.

B. Biped Locomotion according to the Biological Principle

The inventors of the present invention have been and are looking into human behaviors in order to realize a humanoid robot on the basis of information processing techniques similar to those of human. Techniques for driving a robot to walk in a smooth and natural manner like man are developed on the basis of the knowledge acquired as a result of the research activities of the inventors to grasp in depth the information processing system of human and discover the biological principle of biped locomotion of human. They will be described in detail below. In this patent document, the following three themes will be principally discussed.

(1) Characteristics of CPG (Central Pattern Generator) and Biped Locomotion

Researches on CPG using neural oscillators have been made in recent years to realize desirable periodic motions and several properties of periodic motions have been discovered by experiments. However, the principal properties of periodic motions necessary for realizing biped locomotion by using a CPG are still not clear. The characteristics of CPG that are indispensable for realizing biped locomotion by using a CPG will be described in this patent document. The inventors of the present invention have succeeded in realizing a desirable walking motion of a small biped robot by means of a CPG, using neural oscillators.

(2) Fundamental Principle of Biped Locomotion

The inventors of the present invention have been and are looking into the fundamental elements of walk from a physical and mathematical viewpoint in order to develop dynamic techniques for comprehending and controlling walk. In this patent document, a new CPG concept based on a nonlinear dynamic system, and its effectiveness will be described with regard to generation of periodic motion.

(3) Walk Learning Control Method

Leaning techniques that allows the use of a plurality of evaluation standards at a higher member to a walk controller will be described in detail below. The transition of a walking state and walk periods are learnt within the framework of the techniques. Additionally, learning techniques for generating a stable walking trajectory and at the same time realizing both robustness and efficiency will be described. A humanoid robot can realize an agile walking motion like that of man by a walk learning control method according to the present invention.

An embodiment of the invention will be described below in terms of the following items.

1. A Study on Fundamental Characteristics of CPG (central pattern generator): Biped Locomotion Using a Neural oscillator
2. Fundamental Principles of Walk: Learning of Human Walk Using a Motion Primitive and Adaptation
3. Walk Control by Learning: An Efficient Learning Algorithm of Biped Locomotion by Model-Based Reinforcement Learning.

B-1. Biped Locomotion Using a Neural Oscillator

The inventors of the present invention have an ultimate object of establishing a non-model-based biped locomotion control method that can replace the conventional target ZMP control method. The conventional method that is based on a ZMP criteria is a highly general purpose method that is developed by using control engineering techniques so as to enable simplification and subsequently analytically obtain a solution. On the other hand, it requires producing exquisitely designed models both for the robot and the environment. As a result, an enhanced level of precision is required for the hardware of robot. Additionally, a motion of robot that is mathematically led out apparently differs from the walking manner of man. Being aware of these problems, the inventors of the present invention developed a "walk control method for realizing walk that is very close to walk of man" on the basis of the knowledge they acquired in the field of exercise physiology, cranial nerve science and computer and will disclose it below. In this section, attention will be paid to the central pattern generator (CPG), which is a rhythm generator existing in the spinal cord of living thing, and models it by means of a neural oscillator to understand its characteristics and try to apply it to a real hardware.

B-1-1. Characteristics of Central Pattern Generator (CPG)

B-1-1-1. It is evidenced by experiments that living bodies have a rhythm generator referred to as CPG in the spinal cord [1]. Frequently cited examples include experiments on propelling motions of Lamprey, which is a sort of eel and one of the most primitive fish, and those on walking motions of decerebrated cats. The latter are experiments of driving cats, whose brain and spinal cord are cut apart, to walk on a treadmill, while changing the velocity of the treadmill. It is known that the decerebrated cat changes its walking pattern according to the velocity. These experiments indicate that it is not the brain of the cat that controls its walking motion but there is a sort of rhythm generator in the spinal cord of the cat whose operation is regulated by some sort of sensor feedback (e.g., touch down information).

When the spinal cord nerve is taken out alone, it shows oscillatory excitation without any sensor input that is observed in a walking motion. Therefore, it is firmly believed that there is a rhythm generator in the spinal cord nerve that oscillates inherently and independently from the brain and sensor information. This rhythm generator is called a CPG (while it is still a theme of discussion if man has a CPG or not, the existence of an inherent rhythm generator in the human body is anticipated from the reports that very young babies show a rhythmical stepping motion, using the left and right legs, when suspended by the sides and that handicapped grown up persons show an improved rehabilitation effect when a periodical electric stimulus is applied to their spinal cords).

Figure 16:
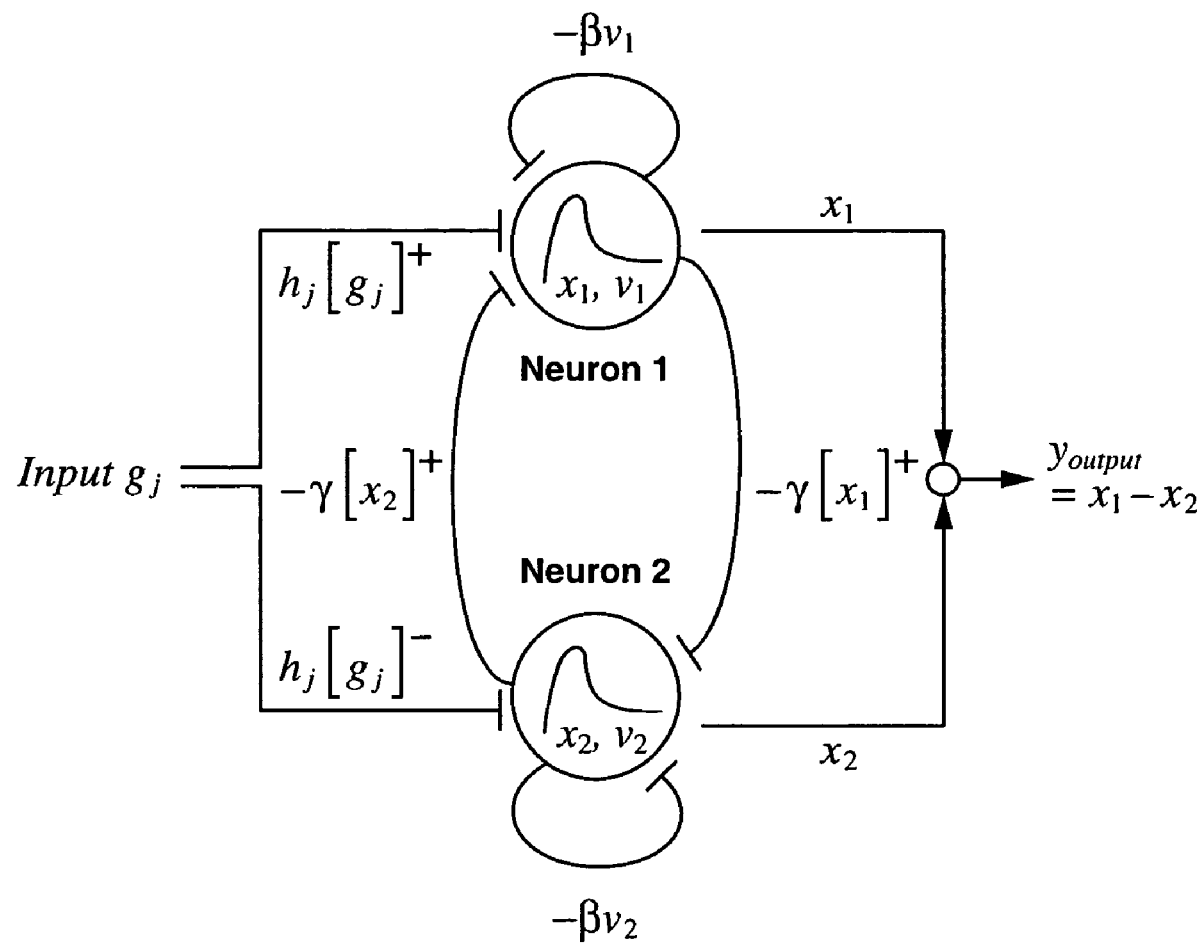
FIG. 16 is a schematic illustration of Matsuoka's neural oscillator model.

B-1-1-2. Matsuoka's neural oscillator model is generally used as neural oscillator CPG (see FIG. 16) [2]. In FIG. 16, $x1, x2, v1$ and $v2$ are variables and $c, \beta, \gamma, \tau1, \tau2$ are constants, while g is the input and y is the output. Then, the time constant of oscillation and the profile of the output waveform are determined by $\tau1$ and $\tau2$. Note that time is not positively expressed in the formula below.

$$\tau_1 \dot{x}_1 = c - x_1 - \beta v_1 - \gamma [x_2]^+ - \Sigma h_j [g_j]^+$$

$$\tau_2 \dot{v}_1 = [x_1]^+ - v_1$$

$$\tau_1 \dot{x}_2 = c - x_2 - \beta v_2 - \gamma [x_1]^+ - \Sigma h_j [g_j]^-$$

$$\tau_2 \dot{v}_2 = [x_2]^+ - v_2$$

$$y_{output} = [x_1]^+ - [x_2]^+ \quad \text{[formula 7]}$$

Referring to the above formula, the waveform and the frequency of the oscillator are determined by $\tau1$ and $\tau2$. The value of c is a parameter controlling the amplitude. c is referred to as steady input and determines the amplitude of the output. While it is difficult to analytically determine the output, a certain numerical value is indicated there [3].

The neural oscillator oscillates with a frequency $\omega n$ specific to it that is determined by $\tau1$ and $\tau2$ without input g. If there is the input g with sufficient amplitude the frequency is close to $\omega n$, the output is fixed relative to the input with a constant phase relationship. In other words, an "entrainment phenomenon" appears. This is the most characteristic feature of the neural oscillator.

B-1-1-3. Experiments Using DB

Figure 17:
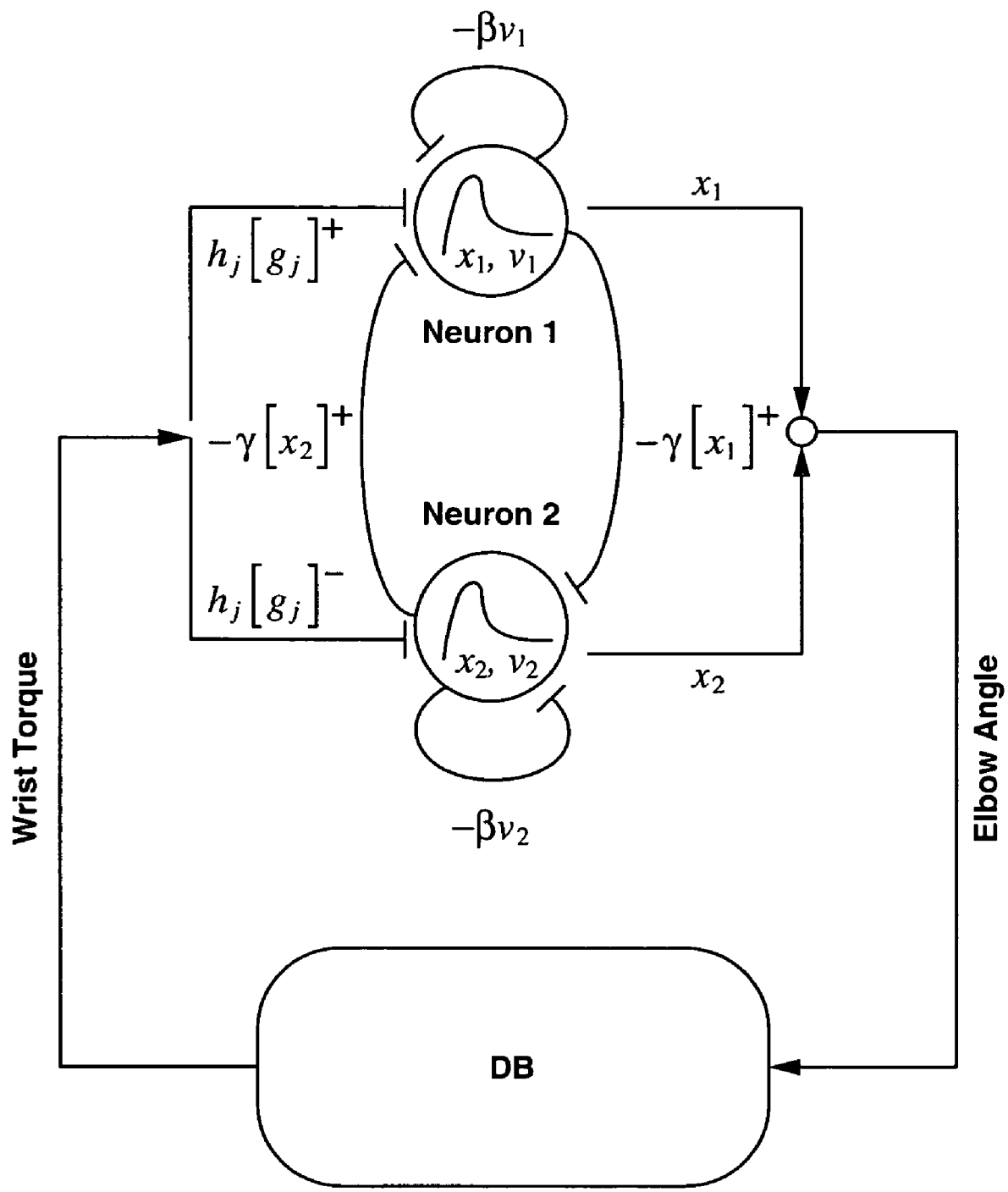
FIG. 17 is a schematic illustration of an experimental hardware for the entrainment phenomenon of CPG using a DB.

An experiment on (1) the yoyo motion and (2) the slinky motion (of a coil spring) was conducted by using a humanoid robot named dynamic brain (DB) in order to qualitatively understand the entrainment that is caused by a CPG. As a matter of course, firstly a CPG is mounted in position by using a DB simulator and the results were verified by the actual machine (see FIG. 17). To simulate the yoyo motion, a spring-mass system with 1 degree of freedom was made to oscillate by a vertically reciprocal motion of elbow. The torque of the wrist was used as the input of the CPG, while the elbow angle was used as output thereof (which involved nonlinearity because a bottle filled with water is used as weight and a rubber string is used as spring). A quick entrainment with a constant amplitude was observed if compared with a case where a sinusoidal wave was used for driving. It was confirmed that entrainment takes place when the mass and the spring constant were changed within a certain range. An experiment of continuing the oscillation of a slinky, which is a spring toy, was also conducted. It was observed how the slinky stopped oscillation when the amplitude of the torque of the wrist is reduced and how it adaptively regulated itself to changes in the period. However, care should be taken about the following items.

(1) The Basin of Attraction by the Neural Oscillator is not so Broad.

As shown in Reference Document [3], entrainment occurs only within a range that is close to the natural frequency of the neural oscillator. In the case of the yoyo motion, entrainment was observed when the mass was within a range between 200 [g] and 500 [g] (which corresponds to a difference of about ±20% of natural frequency) but steady oscillation can hardly be ensured beyond the range. In other words, modeling of a certain extent is required in advance. In reality, the time constant of the oscillator is determined in advance from the natural frequency of the spring-mass system and defined as reference value. Kotosaka et al. changed the time constant in order to broaden the range of entrainment, using a technique similar to the phase lock loop (PLL) technique [4].

(2) Amplitude of Feedback Signal

The input and the output of the oscillator are the torque and the joint angle respectively. Some sort of normalization is required because values of different dimensions are combined. The torque sensor of the DB shows an offset and a dead band and hence the values obtained by a simulator cannot be used. In other words, an experiment is indispensable to obtain corresponding values. While an experiment was conducted by using the torque of the elbow as feedback signal, it was not possible to keep on excitation for oscillation because the inertial torque of the forearm section that arises as a result of the vertically reciprocal motion of the elbow is overlapped on the fluctuations of force of the spring-mass system. While this problem may be dissolved by subtraction using inverse dynamics, a precise model is required for it. An experiment of oscillation was also conducted by feeding back the absolute velocity of the overlap on a simulator. While a highly stable entrainment was observed because the dynamics of the body is completely eliminated with this arrangement, no experiment was conducted on the actual machine because external sensors were required.

(3) Phase of Feedback Signal

While it is easy to confirm the entrainment of a neural oscillator, there arises a problem of how to form the target limit cycle. In successful instances, the target was excitation, which can be realized by "raising the elbow when a large torque is being applied". Conversely, if the target is to limit excitation for oscillation, it is only necessary to inverse the sign of the feedback signal. This can be confirmed on a simulator. However, phase 90 [deg] may need to be fixed depending on the task and then the use of a single neural oscillator is not feasible. Miyakoshi et al. propose a mechanism for automatic phase regulation using four neurons.

B-1-2 Application to Biped Locomotion

In this section, the prior art techniques will be summarized and the problems that arises when controlling a real robot will be described to discuss a bipedal motion using a neural oscillator.

Figure 18:
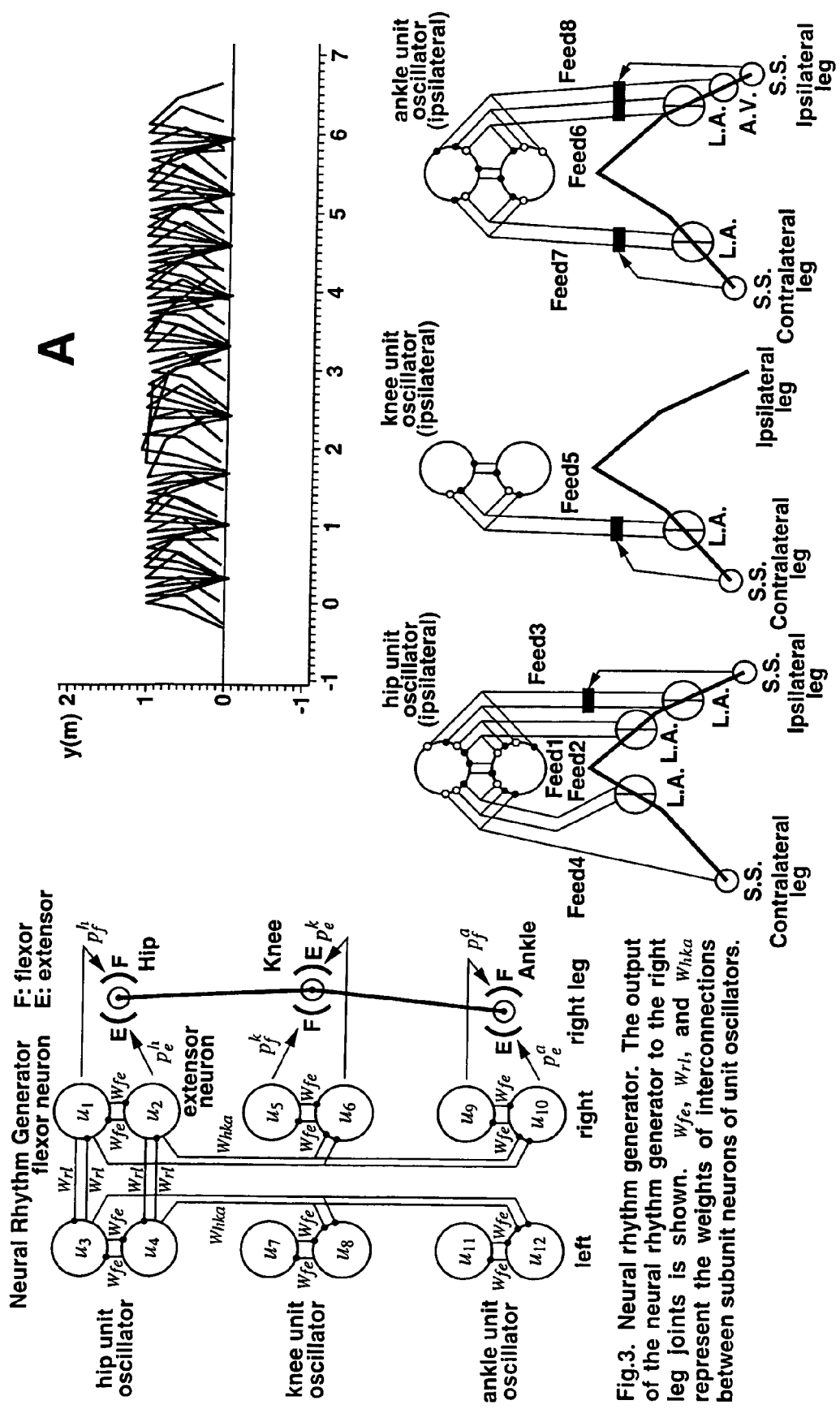
FIG. 18 is a schematic illustration showing how autonomous walk is generated by arranging a neural oscillator at each joint of a sagittal planar biped model under the effect of interaction with the environment.

Application of CPG to biped locomotion started with a precursory research of Taga [6, 7, 8]. Taga claimed a concept called global entrainment, which is an antithesis of conventional researches on walk that rely on control engineering. According to conventional engineering approaches, a robot is considered as object of control and modeled so that, after leading out a nominal target trajectory of motion, the robot is controlled so as to minimize the error between the actual motion of the robot and the nominal trajectory. Any changes in the environment and those of the parameters of the robot are regarded as so many errors from a nominal state or external disturbances. From the viewpoint of the controlling side, such changes are regarded as "undesirable because they make the robot to move out of the nominal state". By analogy with living things, it is considered that the relationships of nervous system=control system and muscular skeletal system=non-control system hold true. In other words, it is considered that the nervous system controls the muscular skeletal system and issues commands for minimizing errors from the nominal state. Transmitting ZMP control is based on the same idea. To the contrary, Taga came to think from his neurophysiologic findings that "the nervous system and the muscular skeletal system are described as dynamic systems that interact with each other on equal terms" and claims that "a limit cycle attractor is formed in a topological space where the nervous system and the muscular skeletal system are combined by way of entrainment of rhythm and corresponds to the generation of stable and flexible walk". He calls the phenomenon as global entrainment, with which changes in the environment, changes in the muscular skeletal system and all the elements of the physical system and the control system participate in the generation of walk. Therefore, unlike the conventional control engineering, there exists no explicit master-slave relationship between the nervous system and the muscular skeletal system. As shown in FIG. 18, a neural oscillator is arranged at each joint of a sagittal planar biped model and walk is autonomously generated under the effect of interaction with the environment. He also showed by simulation how strides are autonomously adjusted on a slope and that the walking pattern naturally changes from walk to run by changing the activity level (output torque amplitude and parameter steady input value c) of the nervous system.

Meanwhile, it is impossible to generate a walking motion by blindly defining a neural oscillator. On the basis of neurophysiologic, Taga defined the arrangements and the combinations of neural oscillators and the sensor feedback pathway. The problem here is that how those combinations are found and how they are weighted. As seen from the above described experiment on a DB, while it is easy to form a limit cycle of some sort or another, it is difficult to form a task specific limit cycle. Particularly, it is impossible to analytically solve the problem when the input to a neural oscillator contains all the interactions of the muscular skeletal system and the environment. Taga manually adjusted the weighting coefficients on a trial and error basis. He spent a vast amount of time for the parameter tuning.

Following the proposal made by Taga, Hase et al. optimized the manual adjustments by means of a genetic algorithm [9, 10]. As a result, it became possible to automatically acquire a somewhat simple neural structure by using the feedback pathway proposed by Taga. Since then, the technique developed by Hase et al. has become a standard technique for acquiring a walking pattern by using neural oscillators. Sato et al. acquired feedback weighting coefficients, using a model same as that of Taga [11], although the obtained values differ from those defined by Taga.

Summarily speaking, the past researches on biped locomotion using neural oscillators remain on the simulation level. As far as biped locomotion is concerned, the outcome of a simulator and that of a real hardware do not normally agree with each other because of imperfect modeling of floor reaction force and other reasons. Therefore, it is safe to assume that the above described achievements cannot be applied to real hardwares. This is a major reason why no successful experiment has been reported since the proposal made by Taga more than a decade ago.

A quadruped robot developed by Kimura et al. provides a successful example of walk control using neural oscillators as CPG for a real hardware [12, 13]. They proved that it is possible to make a robot travel on highly unleveled ground by ingeniously combining neural oscillators, a reflex system, a PD servo system and a state machine, while it is highly difficult to make a conventional robot do so. More specifically, a CPG does not drive joints but controls the phases of the legs and a servo gain selection and a state transition occur according to its output. The sensor information is input to the neural oscillators to regulate the phase relationship of the legs. While the output of a neural oscillator is conventionally used to command the corresponding joint torque, a high motional performance is realize by discretely controlling only the phase. While Kimura et al. did not provide analytical discussions and many parameters were experimentally selected in their studies, they proved the potential of controlling a robot by means of a CPG. Additionally, the robot appears like a living thing very much. The objective of the studies of Kimura et al. was to develop a CPG controller that can be applied to a real hardware. Thus, application of the experimentally successful approach of Kimura et al. to biped locomotion will be discussed in the next section. Because no successful experiment of driving a real biped robot by means of a CPG has been reported to date, it will be a matter of priority to realize a successful controller if intuitively.

B-1-3. Simulation of Biped Locomotion

In this section, various controllers mounted on a biped simulator using SD/Fast, which is developed by the inventors of the present invention, will be discussed as a matter of preliminary stage for using a real hardware. Firstly, the simulator will be described and the controllers mounted on the simulator will be discussed.

B-1-3-1. Biped Simulator

A biped simulator developed by the inventors of the present invention uses a general purpose dynamics simulator, or SD/Fast, for dynamics computations. Each leg is formed by using a trunk, a thigh and a shank and does not have any ankle joint for the purpose of simplification and on an assumption that the ankle joint does not participate in motions that are essential for walking that is led from the results of observation that the distribution of reaction force of the floor produced when walking on stilts resembles that of ordinary walking. It is assumed that the toe of each leg comes to contact the floor at a point when walking and the contact model that is used is a simple spring/damper model. The control period is 1 millisecond and commands are issued to each joint by way of torque. However, since many hardware robots are equipped with a PD servo system, a PD controller is arranged in the inside from the viewpoint of assembling and the leg trajectory of each leg is controlled by giving a positional target value. It is assumed that the touch down of the toe of each leg and all the variables of state are observable and no delay arises to the sensor information.

B-1-3-2. State Machine

Figure 19:
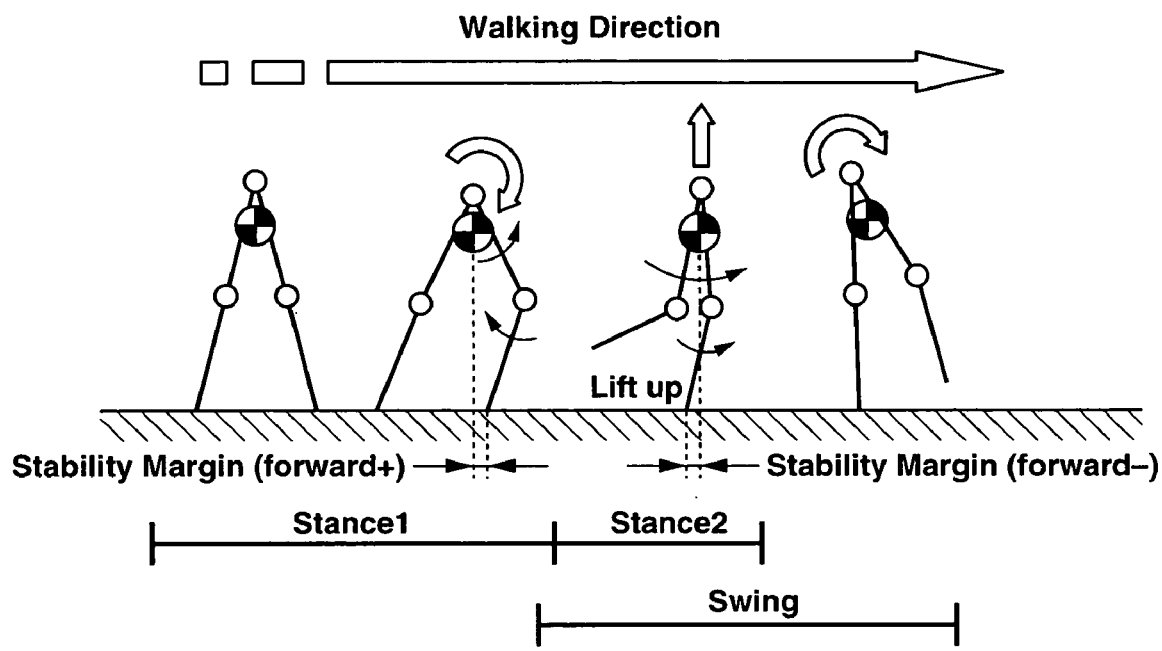
FIG. 19 is a schematic illustration of three states of a walking motion.

Firstly, a walk using a state machine will be discussed for the purpose of intuitively comprehending a walking motion. A walking motion is divided into three states as shown in FIG. 19. Note that the PD gain is fixed in all phases for the purpose of simplification.

Referring to FIG. 19, in Stance 1, the forwardly located leg as viewed in the moving direction (to be referred to as "forward leg" hereinafter) is bent in a double support state to move the center of gravity forwardly and downwardly. Forward stability margin (SM) is used as index to see the load on the forward leg. Since the center of gravity is located substantially near the joint of the hip (basic body member) and the mass of the legs, that of the shanks, is small, the relative distance between the point of projection of the hip joint on the floor and the touch down point of the forward leg is used for the purpose of simplicity. Qualitatively, an index obtained by incorporating the dynamic effect to SM is forward stability margin for the ZMP.

As the motion of Stance 1 is continued, the SM falls below a given value. Then, the bending of the forward leg is stopped and a stretching motion (Stance 2) is started. As the center of gravity rises by the stretching, positional energy is applied to consequently inject kinetic energy necessary for keeping on walking. Note that the function of stretching is expressed not as that of time but as that of SM. In other words, if the center of gravity moves fast forwardly and downwardly, the stretching motion proceeds fast. In Swing, as the backwardly located leg as viewed in the moving direction (to be referred to as "backward leg" hereinafter) leaves the floor as a result of continuation of Stance 1, Stance 1 is switched to Stance 2. On the swing leg trajectory, the hip is given as a function of SM, and the knee is given as a function of time. Since the mass of the thighs is relatively large, the center of gravity moves to the stable side to realize a double support situation when the swing leg is located in front of the supporting leg. Intuitively speaking, it is a walking pattern of quickly leaving the single support phase that can easily give rise to a falling situation and preventing falling by moving into a double support phase. It was confirmed that the walk continues by mounting the controller on the simulator.

This algorithm provides the following advantages.
(1) It can be intuitively comprehended with ease.
(2) It can adapt itself (to relatively small external disturbances) because it does not involve open loop trajectories based on time.
(3) It does not require any exquisitely designed model.

B-1-3-3. State Machine+CPG

Simply an SM and touch down information are used for switching the state in the immediately preceding section. While these pieces of information may not give rise to any problem on a simulator, a real hardware may not operate properly because of sensor noises and other problems. Therefore, the inventors of the present invention tried to use the CPG for switching the state. More specifically, the CPG is entrained by using the SM displacement as input and the phase is switched only by using the positive or negative sign of the output of the CPG.

While only discrete values of SM are used for switching the phase in the immediately preceding section, the phase estimation can become robust when continuous values of SM are used in this section. It was confirmed that a walking motion can be continued when tried on the simulator. The walking motion becomes smoother if compared with a walking motion based on a state machine. However, it is not possible to see satisfactory advantages including robustness relative to parameter fluctuations if compared with the algorithm described in the immediately preceding section. This may be because of the clean environment of the simulator.

The algorithm proposed by Kimura provides an advantage that the phase can be estimated and that touch down information can be effectively fed back to the CPG. For instance, a functional feature of maintaining the posture of the robot can be additionally provided to cope with a situation where one of the legs touches down at a position higher than the estimated level of the floor by stretching the other leg (roll/pitch tonic labyrinthine reflex). However, such a reflex system is a feedback system that is feasible only with quadruped and cannot be applied to biped without modification of some sort or another. A sensor feedback system that enables biped locomotion to continue will be described hereinafter.

B-1-3-4. Ballistic Walk+CPG

In many conventional CPG approaches, neural oscillators are arranged at each joint and the joint is driven by a torque output. This is a natural idea from the viewpoint of exercise physiology that makes the oscillator output correspond to an antagonist muscle. From the viewpoint of robot engineering, such an arrangement is an idea of direct kinematics and it is not intuitively understandable how the output of each neural oscillator is reflected onto the entire system (e.g., the height of the center of gravity). It is very difficult to evaluate the neural oscillators at a higher level of the entire system such as the level of criteria if the robot is falling or not falling and adjust a large number of parameters. From the viewpoint of robot engineering, it is a common approach to use inverse kinematics in such a situation. In other words, each oscillator is driven to oscillate in the X- and Z-directions in a Cartesian coordinate system. However, this is an approach of pure engineering and therefore there is no knowing if such an approach makes it possible to mimic the walking action of man. (There is also a problem of hardware restrictions. When tried on a simulator, it was found that the experimental hardware does not have a sufficient knee torque and stumbles down when the center of gravity is held to a constant height and driven to move back and forth in the moving direction.)

Figure 20:
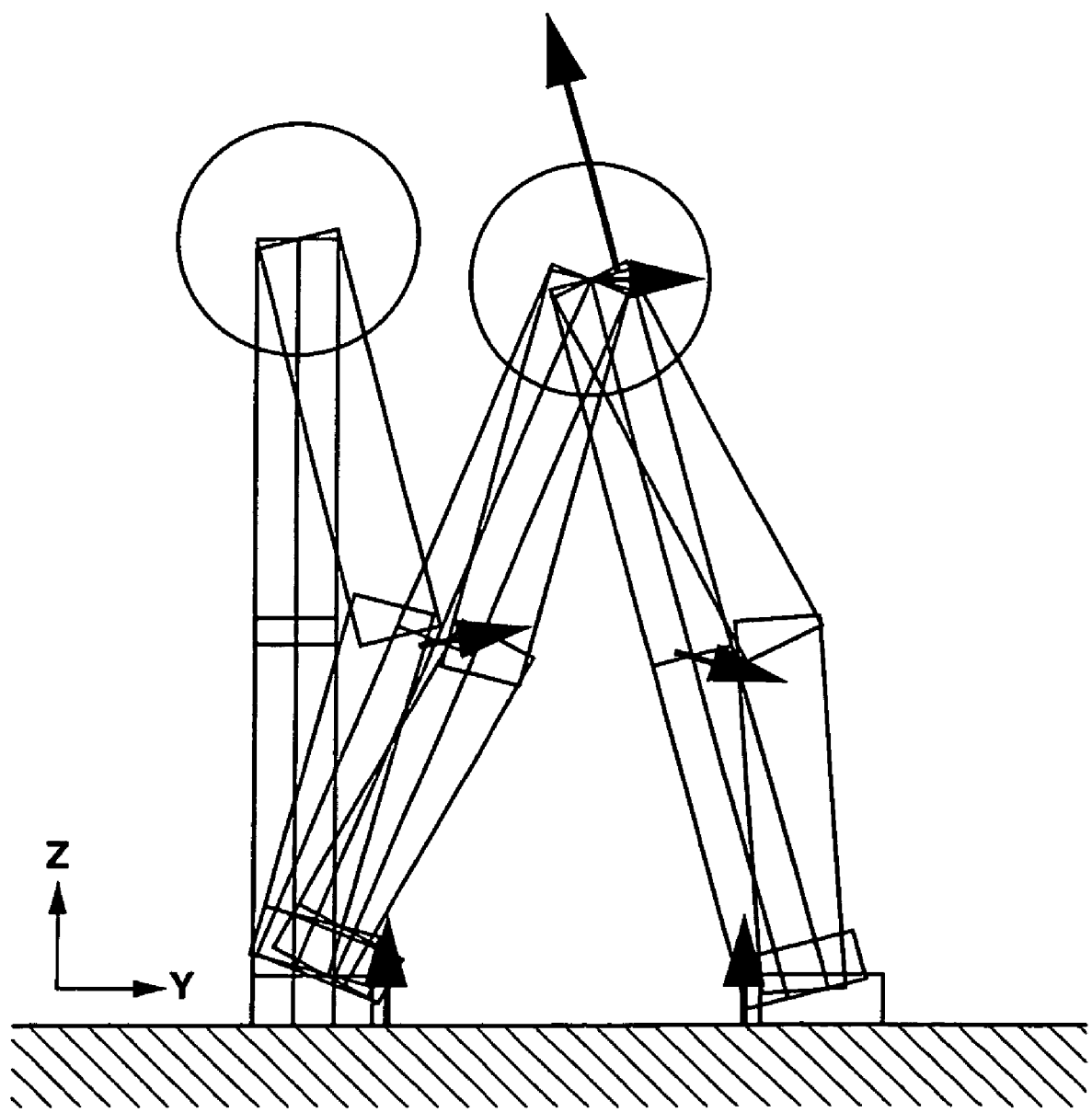
FIG. 20 is an illustration of a compass-like biped model.

Therefore, let us consider a compass-like biped that resembles man in terms of walk and is intuitively promising. The biped is adapted to decompose a leg motion into a linear motion (LM) from the hip joint to the touch down point of the related leg and a swing motion (SW) around the hip (see FIG. 20).

According to Miyakoshi, it is possible to make a compass-like biped whose hip joints move passively while its leg lengths move actively to draw an open loop when an appropriate initial speed is applied to the legs and the trunk. It is also known that the reaction force of the floor responding to such a walk is like the one that is obtained when man walks. Then, the frequency of the LM is three times greater than that of the SW [14]. Based on this finding, the inventors of the present invention allocated CPGs to the degree of freedom of linear motion and that of swing motion for walk.

Figure 21:
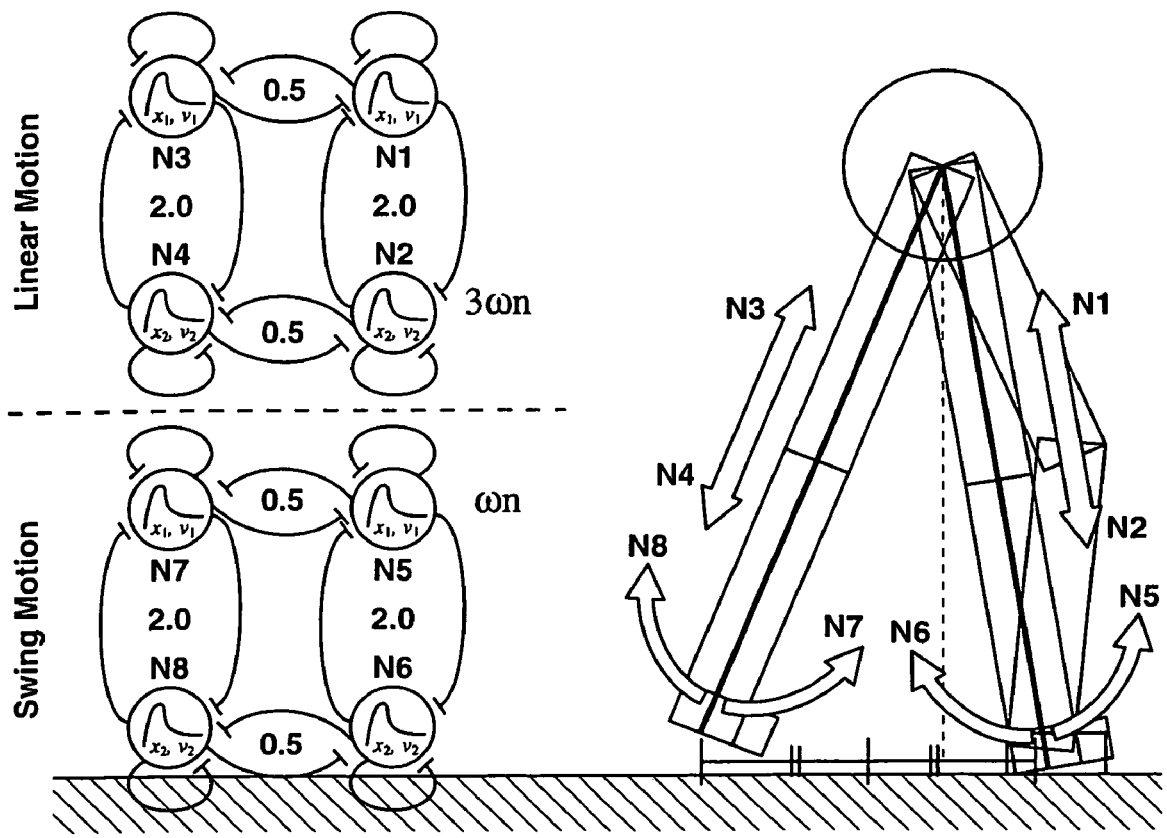
FIG. 21 is a schematic illustration of neural oscillators and the incidence numbers.

FIG. 21 is a schematic illustration of the positional arrangement of neural oscillators and the incidence numbers. The parameters were so defined that the natural frequency of each CPG was such that the frequency of the LM was three times greater than that of SW by referring to the walk frequency described in the section before the immediately preceding section. Then, the neural oscillators were made to show steady oscillaton and subsequently the frequencies were output to the simulator model to which an initial speed was applied. Initially, no feedback was given to the CPGs and the motion of the robot was observed. As a result, it was found that the robot fell after walking by seven steps or so, although the parameters had been regulated. Thereafter, a feedback corresponding to the SW in the double leg support period was given to the SW neural oscillators. Then, it was found that the robot could keep on walking as a result of that the SW neural oscillators had been entrained into an appropriate phase relationship, although there was no explicit feedback pathway in the linear motion system. However, the sensitivity to changes in the parameters is very high. For example, the robot falls when the swing angle changes only by 1 [deg]. Particularly, the state of the initial stages of walk was a problem because it was difficult to find an initial speed that can be applied on a steady basis to lead to a stable limit cycle.

B-1-4. Application to Hardware

In this section, the details of the biped simulation described in the immediately preceding section are applied to a real hardware. Walk can be realized by implementing a controller as described in B-1-3-4 and regulating the machine on an experiment basis according to the findings acquired by the simulation.

B-1-4-1. Experimental Hardware

Figure 22:
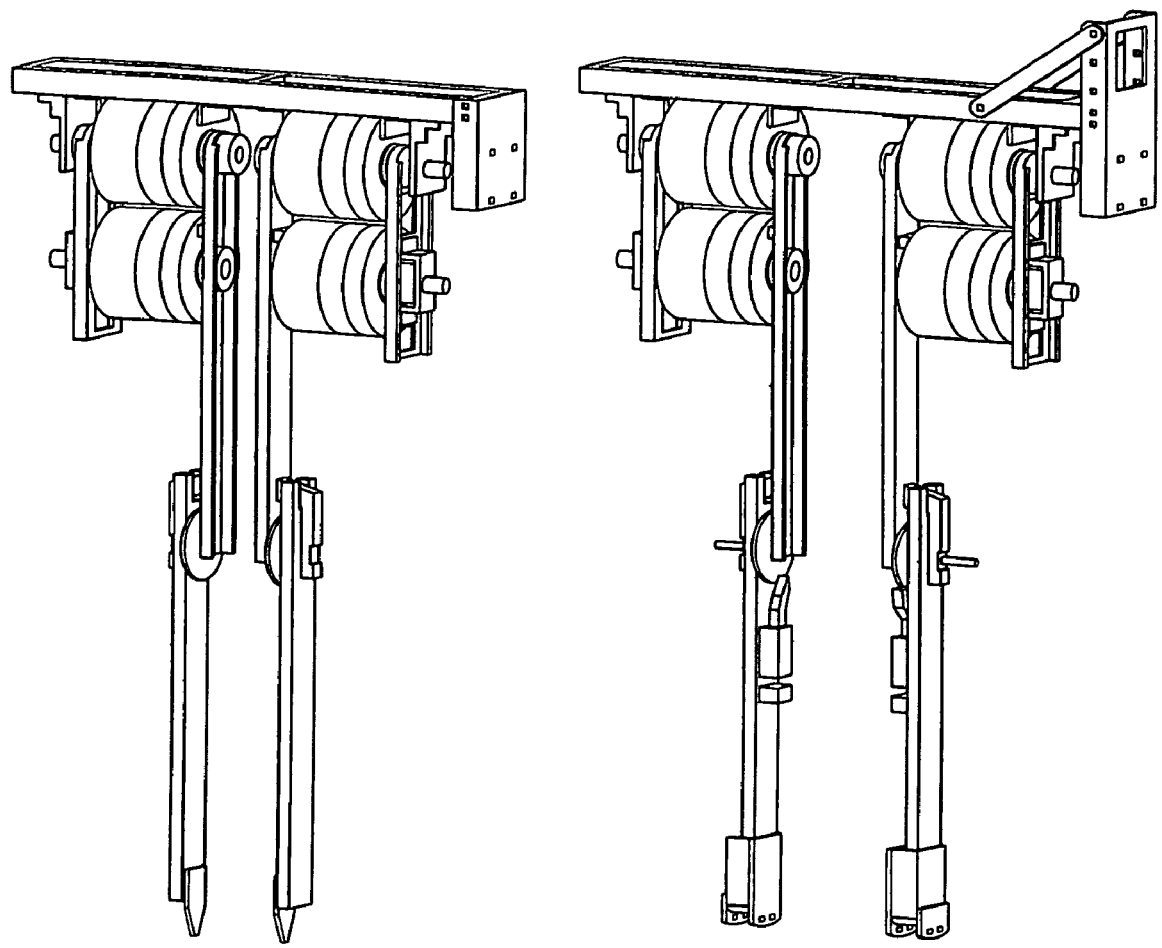
FIG. 22 is a schematic illustration of the link sections of the machine body of a robot used as experimental hardware.

FIG. 22 is a schematic illustration of the link sections of the machine body of a robot used as experimental hardware. Since the behavior of the robot changes significantly depending on the profile of the soles, the machine was improved so that parts having different profiles may be selectively fitted to the soles at positions other than the touch down points. Additionally, the robot was so designed that mechanical switches can be added to observe the touch down. DC brushless motors were used for the actuators and used in a quasi-direct drive mode in order to eliminate any friction and viscosity that can be produced by reduction gears.

B-1-4-2. Stepping Motion

To begin with, let us consider a motion of stepping on the spot. To realize a motion of stepping on the spot before starting walking is a conventional approach for looking into walk using neural oscillators [15, 16].

Figure 23:
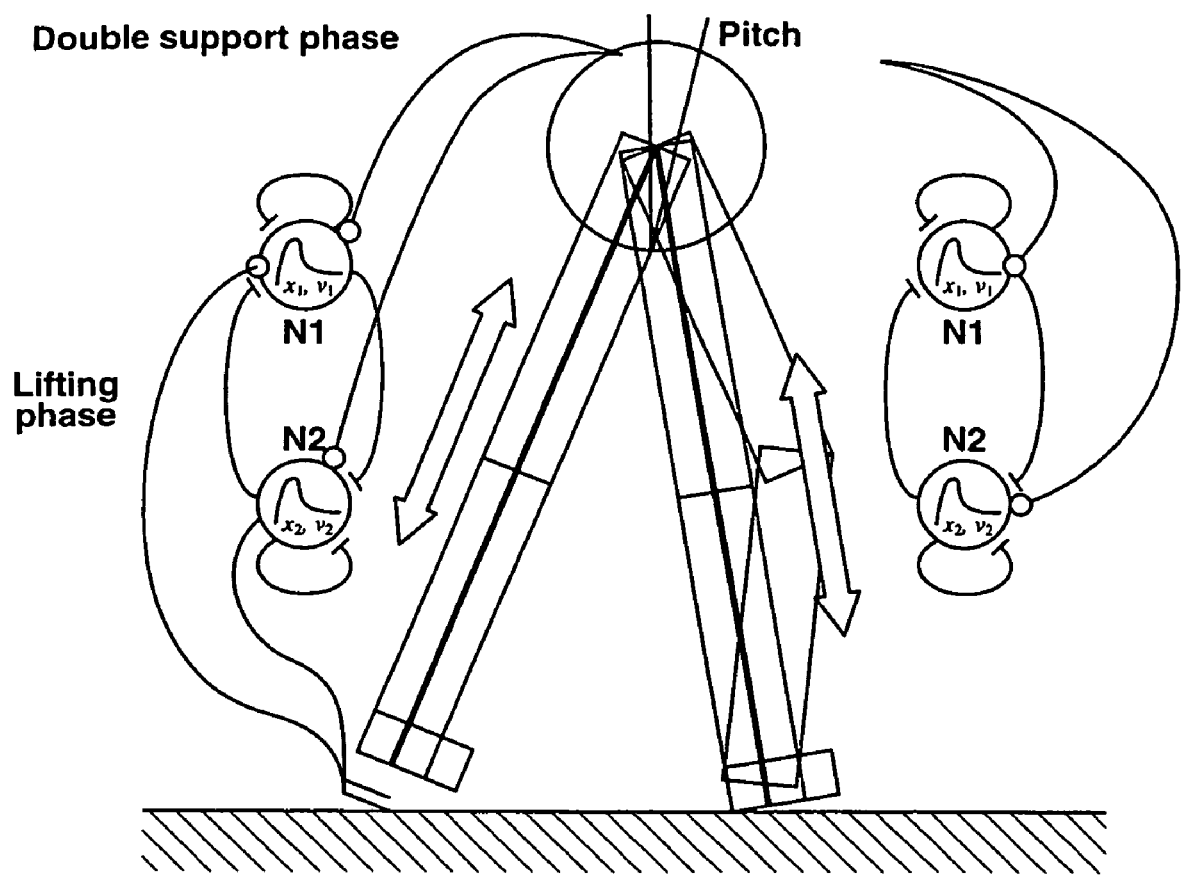
FIG. 23 is a schematic illustration of a feedback pathway.

In the case of the above described experimental hardware, the legs are made to open in the moving direction by a given angle in order to prevent falling because the machine does not have any ankle joints. A pitch oscillation is generated by producing a linear motion (LM). A feedback pathway is introduced as shown in FIG. 23 in order to continue the oscillation. For the stance leg, mutual inhibition is applied to the stretching/contracting sides thereof in order to continue the oscillation. During the double support phase, the feedback is regulated in the direction of stretching the legs according to the pitch of the trunk. More specifically, if the trunk is inclined forwardly, the support leg period of the forward leg is extended. Since the forward leg and the backward leg are coupled in a manner as shown in FIG. 21, a forwardly/backwardly stepping motion is generated by oscillation.

A stepping motion was confirmed as a result of regulating the parameters experimentally. When an external disturbance is applied, it was confirmed that the stepping motion is restored by extending the stepping period and the support leg period. When the robot is inclined remarkably forwardly and the backward leg is lifted, the magnitude of the restoration moment depends on the profile of the soles because the sensor feedback for keeping balance is effective only in the double leg support period.

B-1-4-3. CPG+State Machine

Figure 24:
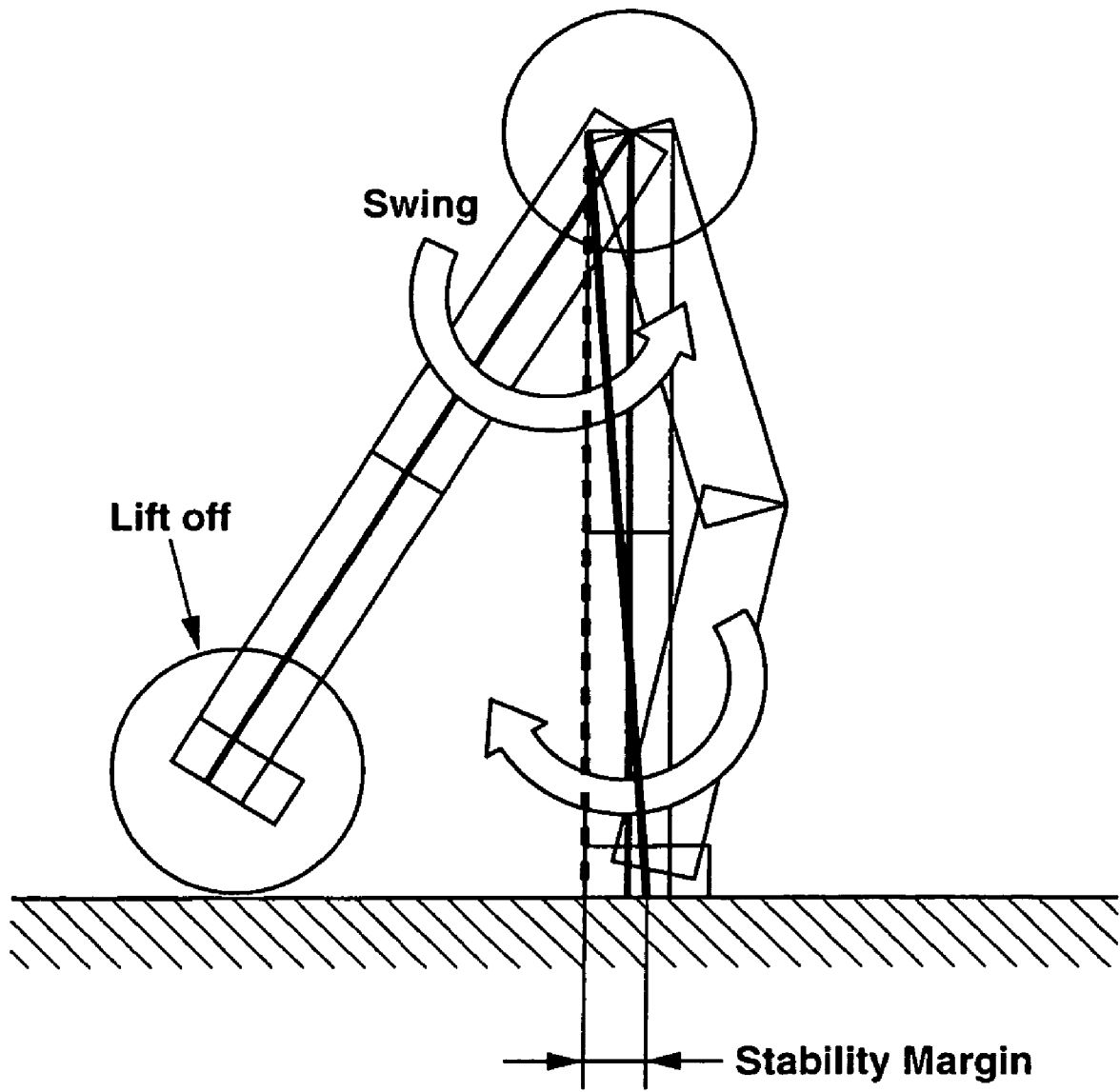
FIG. 24 is a schematic illustration of replacing the target angle value for the front and rear legs.

A walking motion is produced by combining the stepping motion realized in the immediately preceding section and a swing motion. A state machine is used to switch the legs and simply the angle target value of the forward leg and that of the backward leg are switched when the backward leg is a swing leg and the forward stability margin falls below a given level (see FIG. 24).

Intuitively speaking, the walking motion is realized by "step forward when the robot is about to fall". It was confirmed that the robot can walk when this is applied to the real hardware. At this time, the parameters of the neural oscillators, the PD gain, the amplitude of the LM, the amplitude of the SW and the threshold value of the stability margin were manually tuned. While the distance of continuous walk varies due to the hardware problems of the experimental hardware (changes in the characteristics of the machine caused by the heated motors and so on), the robot can always walk by 50 steps or so (360 continuous steps, a walk distance of 50 m, a walking velocity of 0.4 m/s at maximum). Additionally, the robot can adapt itself to a certain extent to changes in the material of the floor and the force resisting the moving robot.

When combined with the swing motion, the stepping motion is automatically regulated in terms of stride and period and the robot moves like a living thing. This may be a phenomenon that is observed when both the trajectory plan of the CPG and that of the state machine do not explicitly contain time.

B-1-4-4. CPG Only

Figure 25:
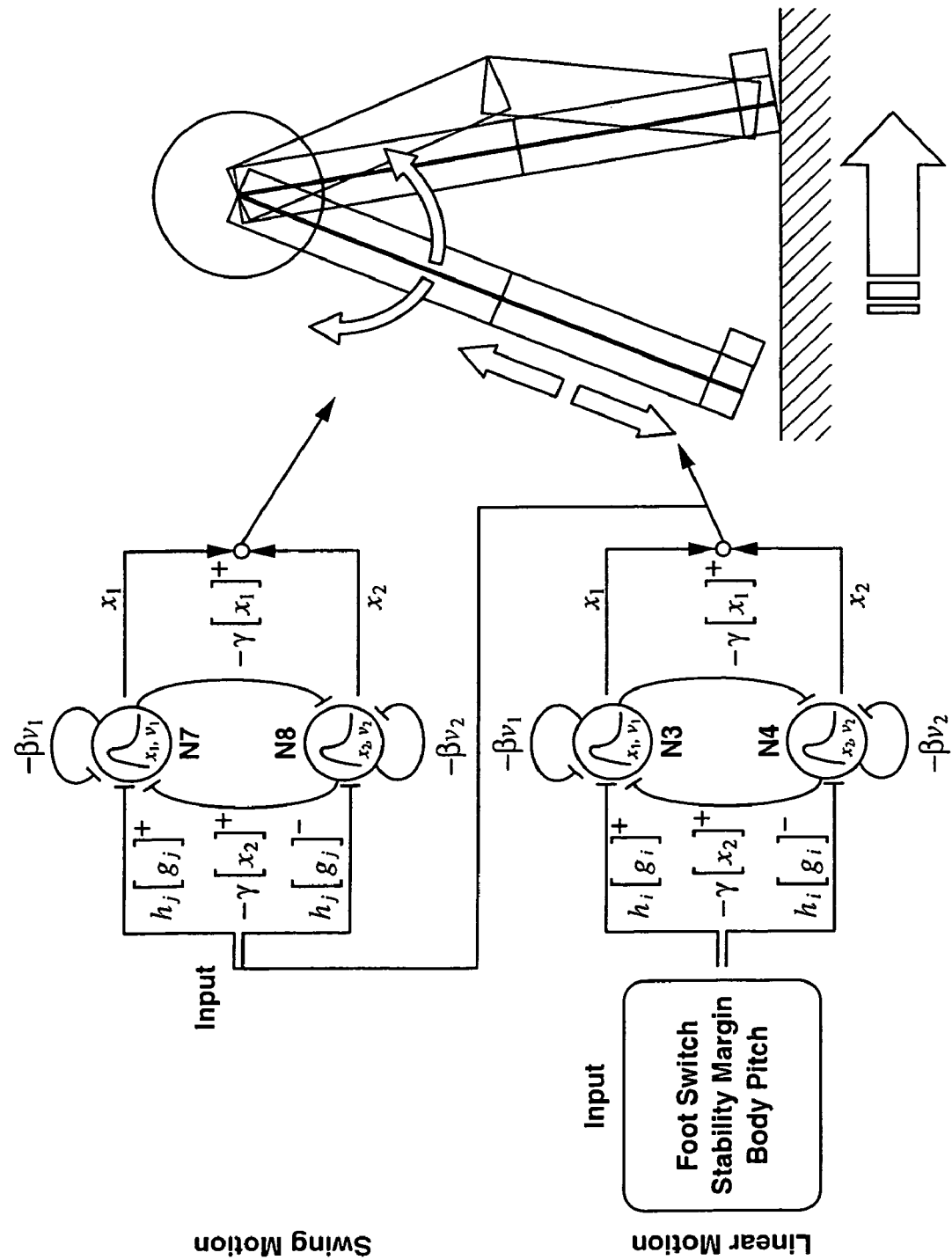
FIG. 25 is a schematic illustration of inverting the sign of the LM output and inputting it into a SW.

Now, let us consider about realizing a swing motion (SW) by driving the legs by means of neural oscillators. Since a swing motion needs to be coordinated with a linear motion (LM), the output of the LM is input to the SW by inverting the sign of the output (see FIG. 25).

In the case of this combination, the phase difference between the LM and the SW is 180 [deg]. The frequency of the SW is made equal to that of the LM. As a result of an experiment, it was found that the robot can walk as in the case of using a state machine.

Figure 26:
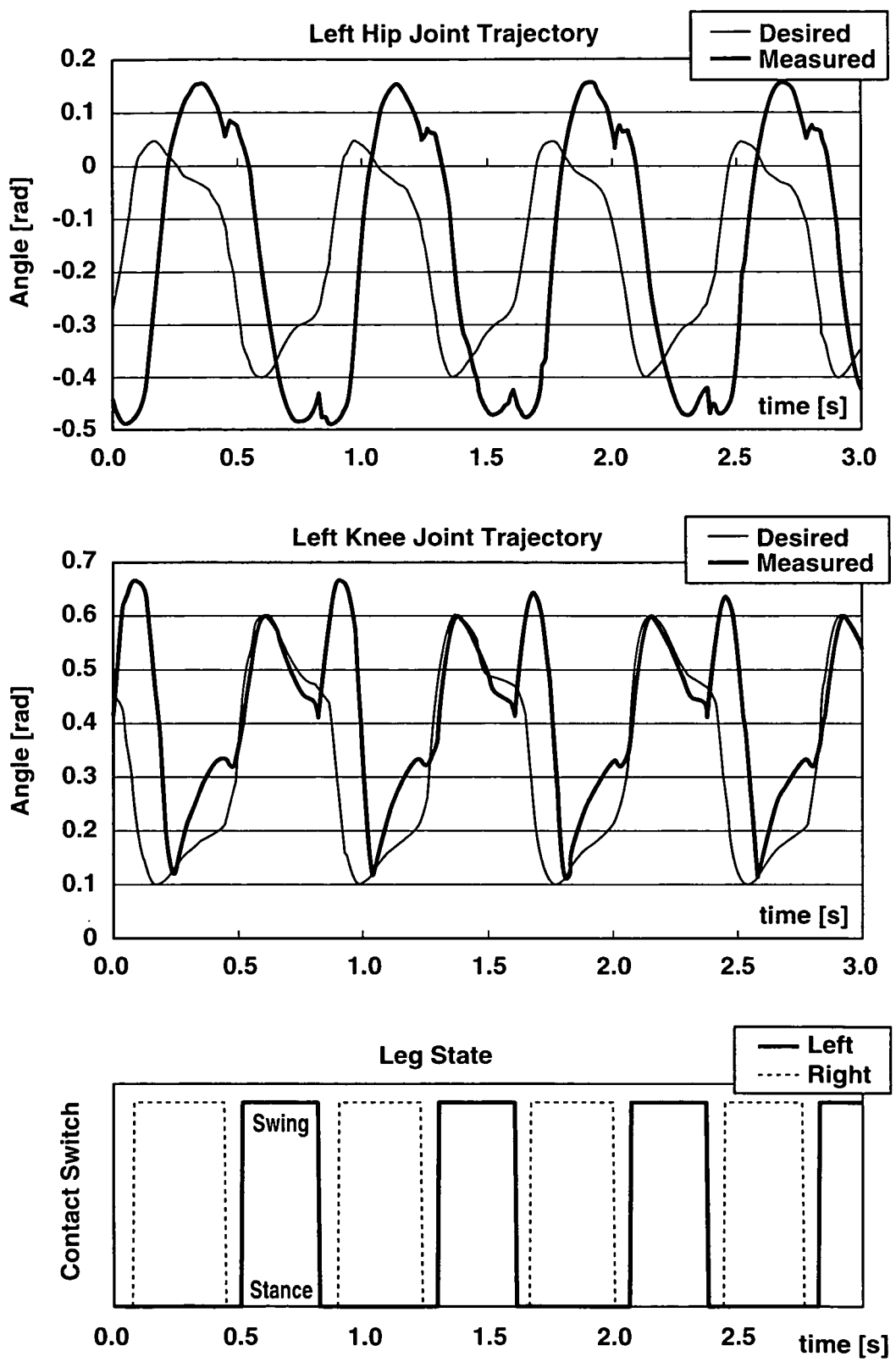
FIG. 26 shows graphs illustrating the results of measurement in a normal walking motion.
Figure 63:
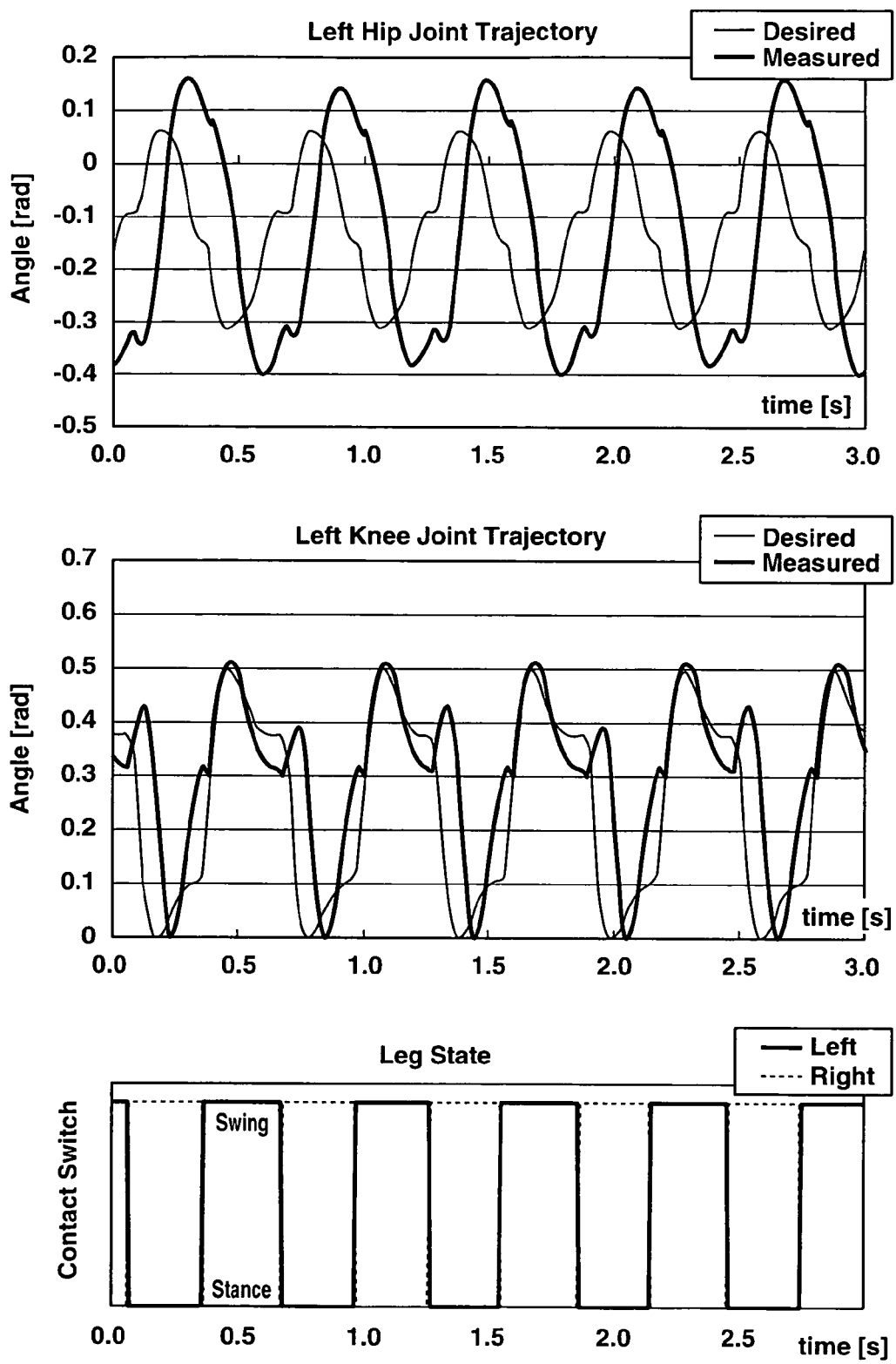
FIG. 63 shows graphs illustrating the results of measurement in a normal walking motion.

However, if compared with the use of a state machine, it is difficult to bring the robot into a steady state from the very start of a walk. This may be because it takes time for the SW to be entrained by the LM with an appropriate phase relationship. FIG. 63 shows the results of a simulation and FIG. 26 shows the comparable results of an experiment. While the optimum phase difference between the LM and the SW is limited to 180 [deg], it is clear from the actual data that the SW is entrained with a phase delay.

It is also clear that the knee joint of a touching down leg also shows a large deviation. This is attributable to a small gain. From the viewpoint of conventional trajectory tracking control, this may be regarded as poor control characteristics. However, it is also possible to say that the robot is walking, actively utilizing the virtual spring-damping characteristics of small gain actuators as in the case of the quadruped machine of Kimura et al. From this result, it is clear that the gain significantly influence the walk of the robot.

Figure 27:
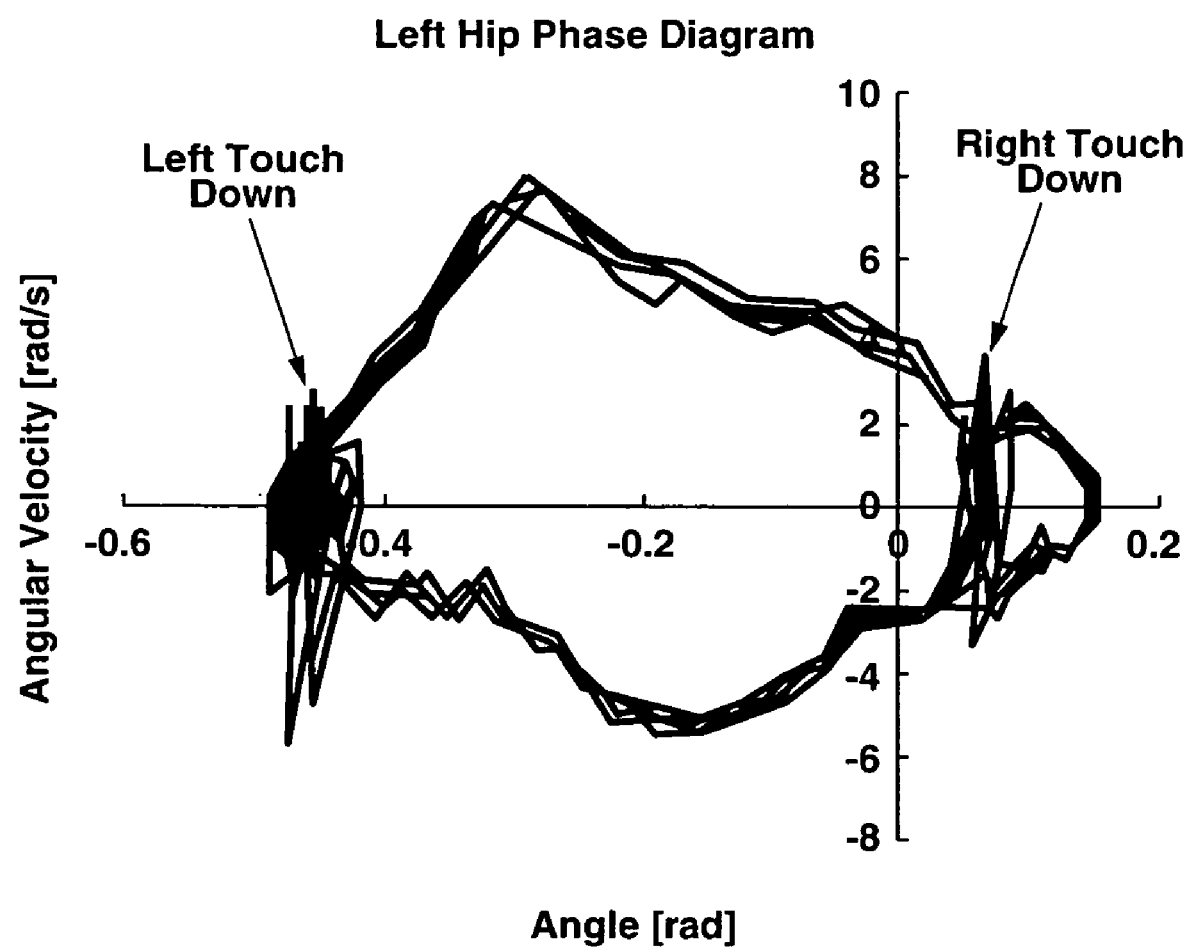
FIG. 27 is a schematic phase plan view of the left hip joint of a robot.
Figure 64:
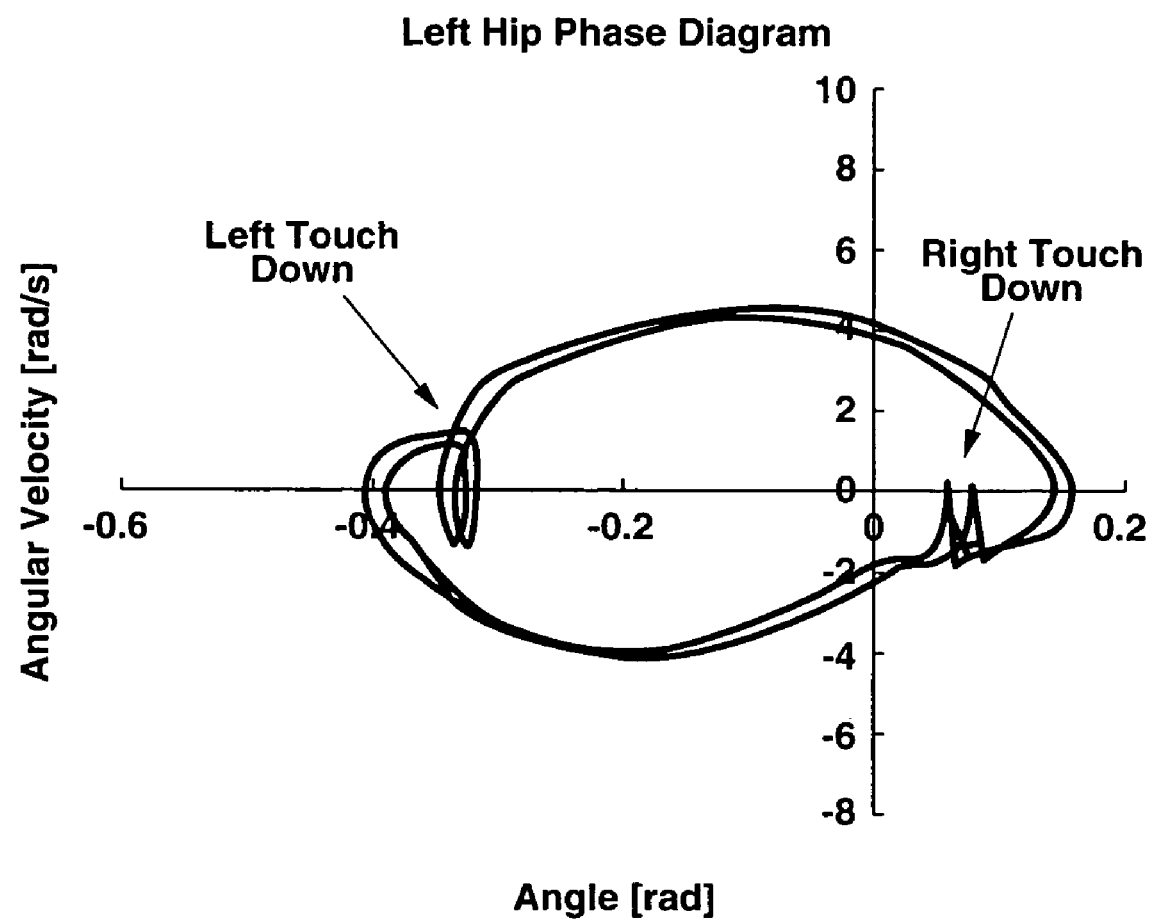
FIG. 64 is a schematic phase plan view of the left hip joint of a robot.

FIG. 64 is a phase plan view showing the change in the phase of an oscillator obtained as a result of a simulation where the left hip joint is regarded as a physical oscillator (PDF) doing a periodic motion and FIG. 27 shows the comparable result of an experiment. From the diagrams, it is clear that a limit cycle is formed there. Since a large change arises in the angular velocity at the time of touch down, it is clear that the toe does not contact the floor with a zero relative speed at the time of touch down. Since the impact involved there makes the behavior of the robot unstable, the conventional ZMP technique avoids such an impact. The robot shows an unnatural walking manner of "stealthy steps".

On the other hand, as it seems that man walks, actively utilizing collisions of the heels to regulate the walking speed, the contact of the toes of a robot with a zero speed relative to the floor may make its walk appear to be closer to the walk of man. As for the walk period, while the natural walk period of a neural oscillator is 0.33 seconds per step, the walk period in a steady state is 0.368 seconds in average to prove that it is regulated by the entrainment characteristics. Additionally, since it is relatively close to man's walk period and differs from the latter by 8%, such a value may represent a rather natural walk of robot. The stride of walk of the robot is not necessarily constant and different strides for the left and right legs are observed. However, regardless of the difference of stride, the robot is able to continue walking to prove that the present algorithm can be applied even if the robot shows different strides. Now, let us consider about adjusting the walking speed by adjusting the stride.

Taga reports that the walking gait of a robot can be changed from walk to run by increasing the steady input value c that changes the activity (amplitude) of the neural oscillators [6]. The value of c can be varied between 1.8 and 3.5 and the robot cannot walk outside the range of the steady input value. When c is small, the stride is reduced excessively, the stability margin is reduced so that the robot can easily stumble and fall. When the stride is increased excessively, on the other hand, the gait of the robot becomes unstable because of the large impact that the robot receives as the swing leg touches down.

The impression of the walking gait of the robot varies as the value of c changes. The walking gait of the robot gives a graceful impression when the value of c is small, whereas it gives a marching impression when the value of c is large. Therefore, c may be used as means of expression.

Figure 28:
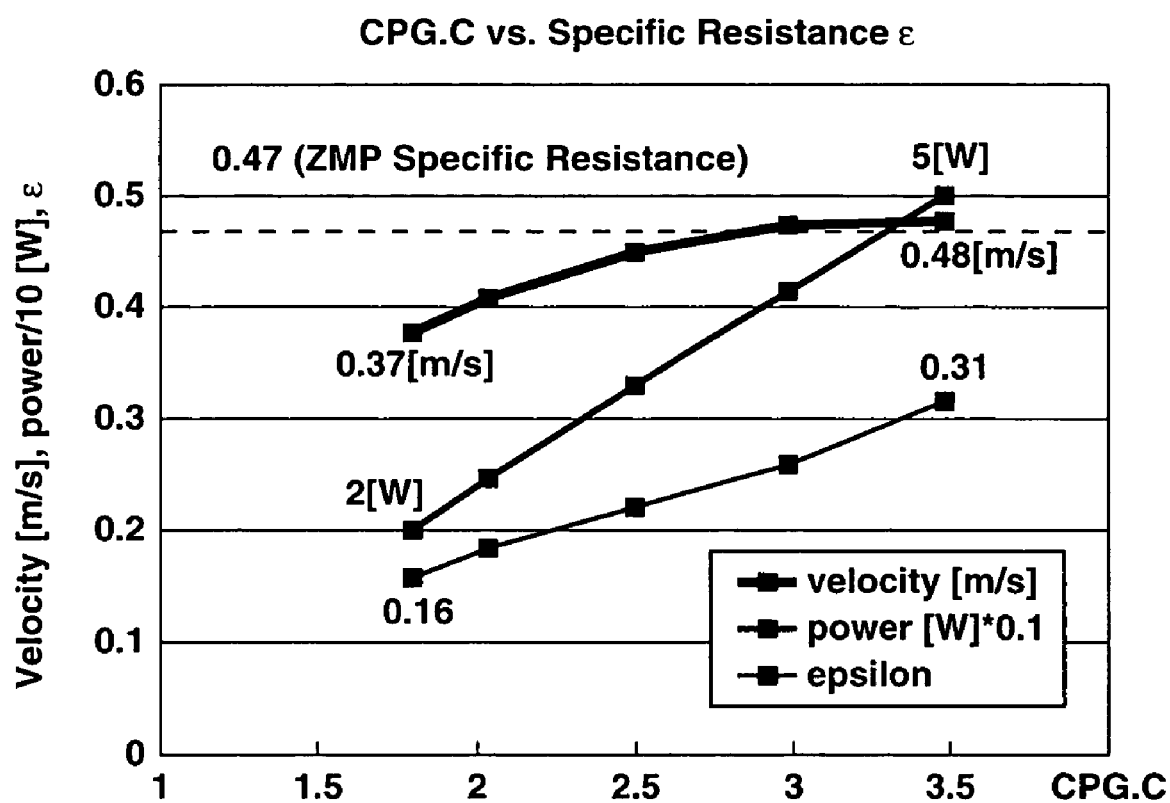
FIG. 28 shows a graph illustrating the relationship of steady input value c, non-dimensional value of walking velocity/mechanical energy consumption/moving efficiency and transfer power.

FIG. 28 is a graph illustrating the relationship of steady input value c, non-dimensional value of walking velocity/mechanical energy consumption/moving efficiency and specific resistance. The consumed energy is computed from the torque command value to the servo driver and the measured angular velocity and the specific resistance is computed by using the consumed energy and the measured walking velocity. It is possible to increase the stride and change the walking velocity by increasing the value of c. However, the range of velocity adjustment is limited and may depend heavily on the radius of the circular arc of the sole in the case of this experimental hardware that does not have any ankle joints.

The current algorithm is intended to make the robot keep on walking by actively utilizing the dynamic effect and the robot can walk only within a frequency range close to the natural frequency of the machine body in the pitch direction. This characteristic is a problem common to walks of robots that actively utilize the passive dynamics of the machine body as remarkably observable in "Passive Dynamic Walking" [17]. It seems that a low walking speed movement indispensably requires a control operation using the ankle torque and a feedback pathway. Taga argues that stepping on the spot and steady walking require different frameworks.

The energy consumption increases as the value of c increases. It is found by determining the specific resistance that the energy consumption is minimum and the specific resistance shows a large value when c is equal to 1.8. By using the current algorithm, it is possible to make a legged mobile robot move with a very high-energy consumption efficiency. The energy consumption is determined purely from the machine output and the electric power being applied to the actuators is about 340 [W] when c=2.05 (efficiency: 0.7%). In the case of Spring Flamingo [18] that aimed at high efficiency walking, the electric power was 200 [W] for a machine output of 5 [W] (efficiency: 2.5%). Thus, the hardware characteristics may need to be improved as a matter of top priority to improve the net efficiency particularly in terms of long battery operation times.

Figure 29:
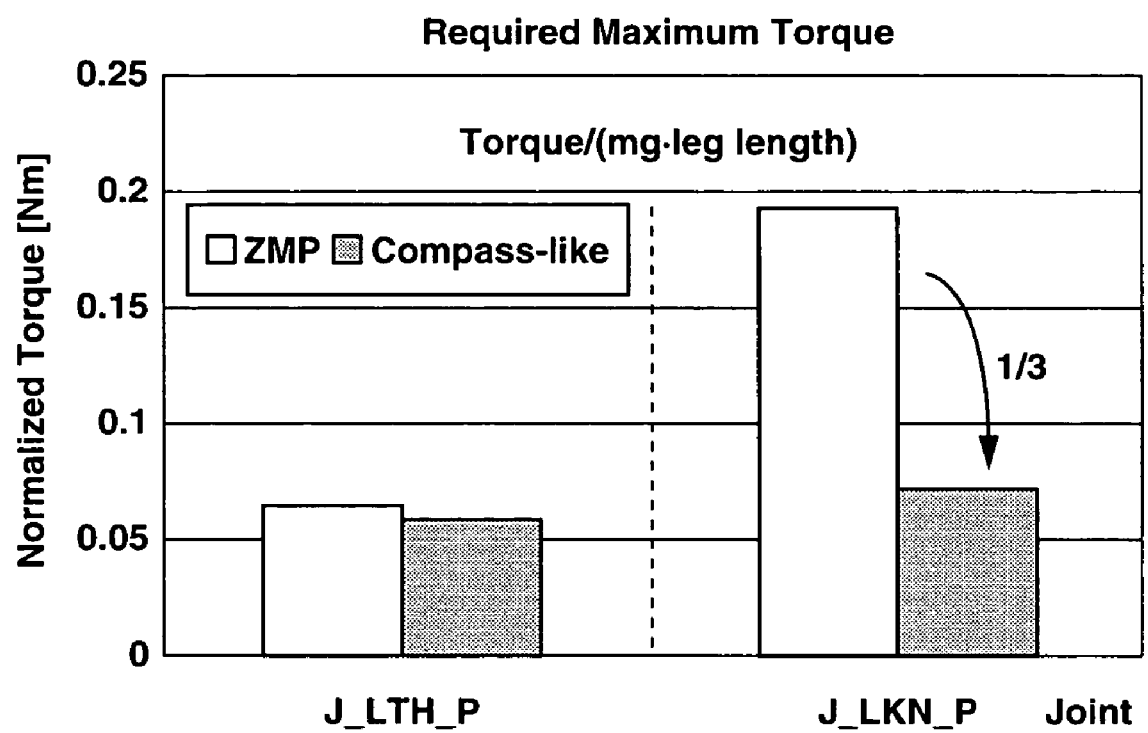
FIG. 29 shows a graph illustrating the results obtained by comparing the maximum torques of joints normalized by leg length/mass and those obtained by using typical target ZMP criteria.

By observing a walk realized by the current algorithm, it is found that the knees are bent only to a small extent. FIG. 29 is a graph illustrating the results obtained by comparing the maximum torques of joints normalized by leg length/mass and those obtained by using typical target ZMP criteria. From the graph, it will be seen that the torque applied to the knees is reduced to about ⅓.

One of the most important advantages of the current algorithm is that it is possible to select a low joint gain. The reason why many of the currently available legged mobile robots are inevitably expensive is a large gain selected to realize trajectory tracking with an enhanced degree of precision. To obtain a large gain, it is necessary to meet rigorous hardware requirements including reduction of gear backlash and improvement of response characteristics. Additionally, a state where the joint stiffness is high is very dangerous from the viewpoint of human-robot interactions. Reflex-based motions vary depending on the environment. Therefore, the response of the robot to a fall can vary depending on the conditions surrounding the robot. The inventors of the present invention think this characteristic aspect of the robot may be a key point for making the robot not boring to man.

B-2. Learning of Man's Walk by Means of a Motion Learning Primitive and Applications Thereof.

Humanoid Robots including SDR (Sony), ASIMO (Honda), HRP (National Institute of Advanced Industrial Science and Technology) and H7 (The University of Tokyo) have been developed and the advancement of high level biped locomotion is remarkable. A walk pattern is generated by a joint trajectory plan using a ZMP in many of them (as described earlier). While motion generation algorithm using a ZMP as criteria are well proven techniques for realizing biped locomotion on a stable basis, a trajectory plan requires an operation of accurately modeling a robot and a high precision trajectory tracking control system is needed to realize a motion. Additionally, the problem of a walk pattern with bent knees has been pointed out. Such a walk pattern is designed to avoid singular posture of inverse kinetics.

Apart from this, attempts have been made to generate walking motions with the autonomous adaptive mechanism of a CPG using neural oscillators biologically inspired control algorithm (as described earlier). Neural oscillators proposed by Matsuoka and obtained by nonlinear differential equations for modeling flexors and extensors are widely used as CPG [2] and applied for controlling periodic motions by utilizing the entrainment property that accompanies interactions with the environment. Specific examples include control of biped locomotion [19, 20], control of quadruped locomotion [12], juggling [21], drumming [4] and slinky (coil spring) control [3]. However, there still remains problems for designing the control system including how to design mutual combinations of oscillators and the difficulty of tuning the parameters of the oscillators to be used for realizing a target motion.

Figure 30:
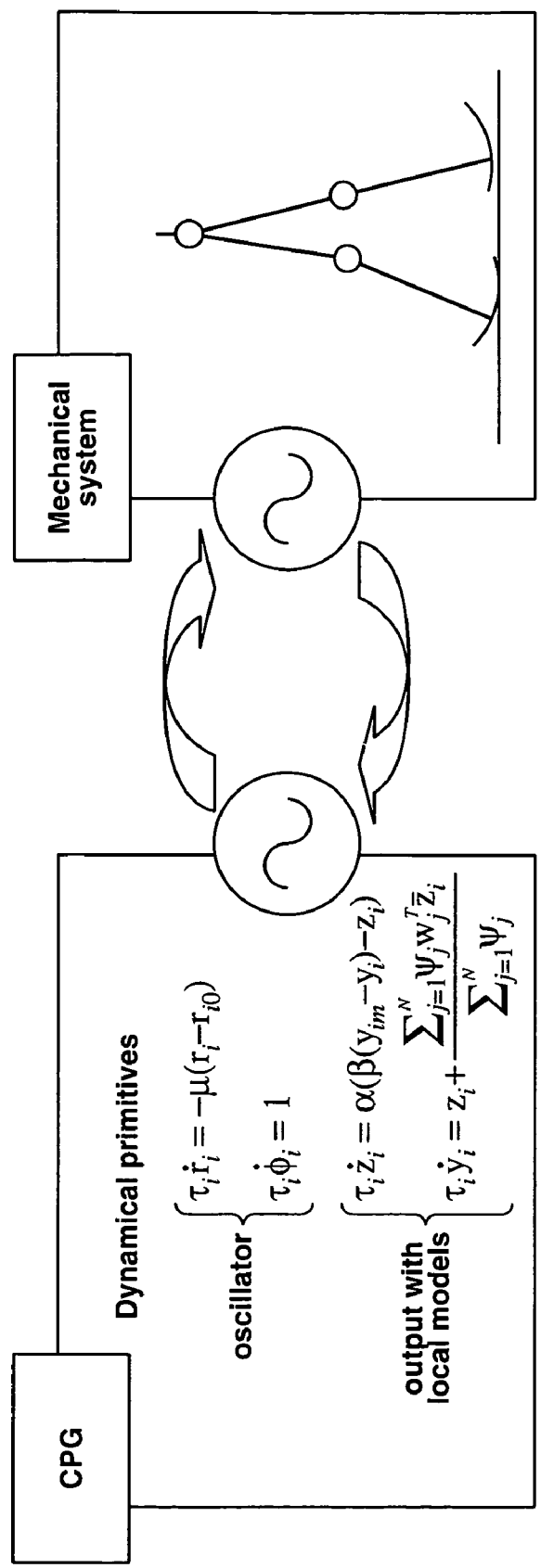
FIG. 30 is a schematic illustration of generation of a walking motion of a robot based on appropriate scaling of motion obtained by learning the walking motion of man, using a rhythmic movement primitive having a limit cycle attractor formed on the basis of a phase oscillator and locally weighted regression as CPG model.

In this section, attention is paid to physical and dynamic properties of a walking robot and techniques for designing a control system that can realize a natural and smooth walking motion for a robot so as to make it appear like man will be described. The inventors of the present invention are looking into motion generating/motion describing algorithms for realizing complex and smooth motions like those of man by mimicking. The inventors of the present invention have already proposed to describe a joint trajectory by a nonlinear differential equation and a motion learning primitive that can quickly learn demonstrated movements of a teacher by means of a statistic learning technique [22]. In this section, an operation of generating a walking motion of a robot by using a rhythmic movement primitive having a limit cycle attractor formed on the basis of a phase oscillator and locally weighted learning (locally weighted regression) [23] as CPG model, learning the walking motion of man and appropriately scaling the acquired motion. FIG. 30 is a schematic conceptual illustration of the operation.

The advantages of using this primitive as CPG include that it can quickly learn demonstrated movements of a teacher typically in the form of a measured walk pattern of man and that it is easy to scale the amplitude, the period and the offset of the learned rhythmic motion. In this section, phase resetting using the feedback from the environment [24] and a rule of autonomous application of a walking period, utilizing the entrainment caused by interactions of a phase oscillator, a machine system and the environment will be proposed and the fundamental effectiveness of the technique will be discussed by way of numerical simulation.

Figure 31:
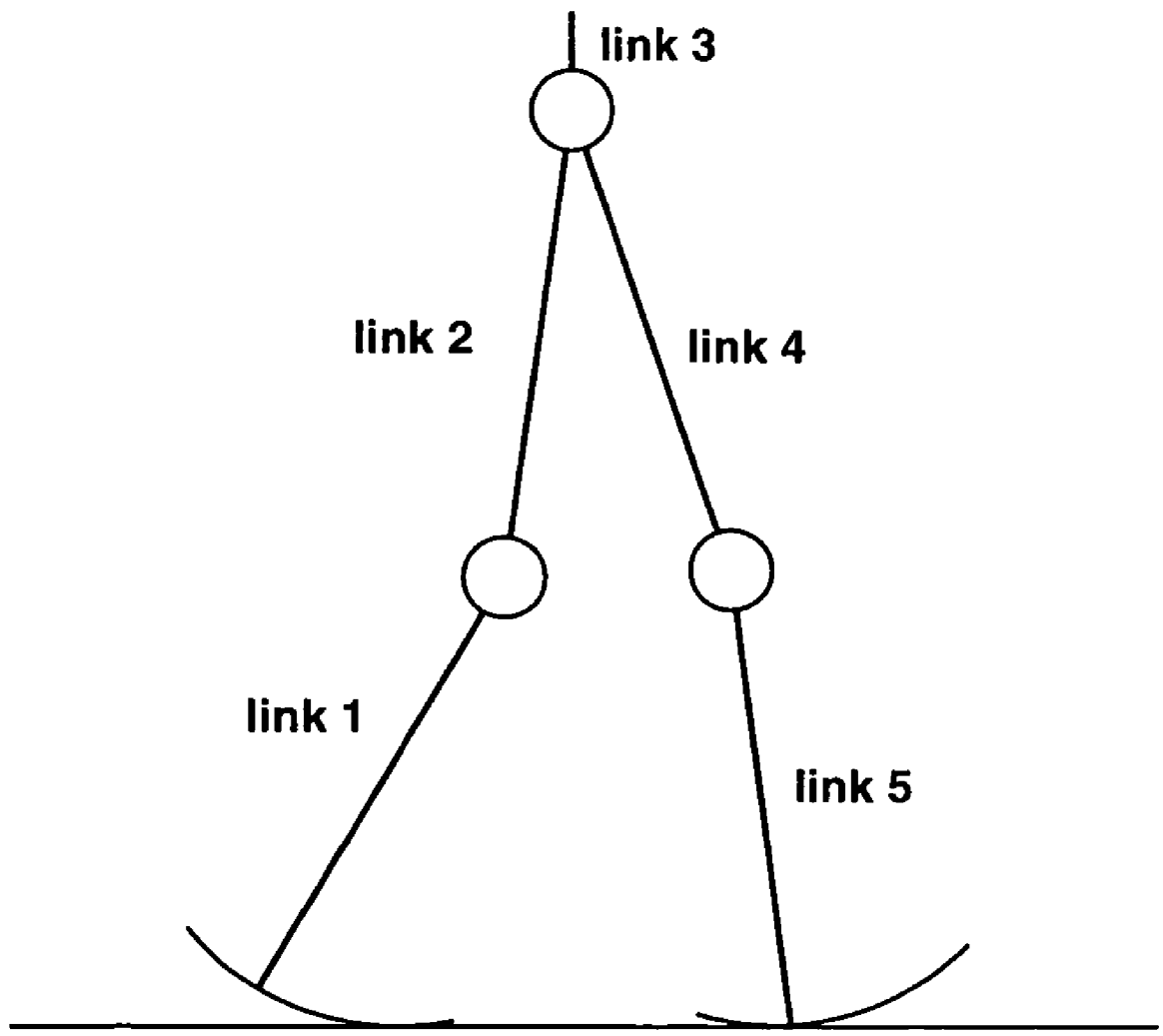
FIG. 31 is a schematic illustration of a model of biped robot with plane five links.

In this section, a numerical simulation using a biped robot with plane five links as shown in FIG. 31 as model. The total height of the robot is 40 cm and the weight of the robot is 3 kg. It uses the physical parameters for the numerical simulation as listed in the table below.

TABLE 2

|  | link1 | link2 | link3 | link4 | link5 |
| --- | --- | --- | --- | --- | --- |
| mass [kg] | 0.05 | 0.43 | 1.0 | 0.43 | 0.05 |
| length [m] | 0.2 | 0.2 | 0.01 | 0.2 | 0.2 |
| inertia ($\times 10^{-4}$ [kg·m]) | 1.75 | 4.29 | 4.33 | 4.29 | 1.75 |

Referring to FIG. 31, assume that the robot has two actuators at the hip joints and also has two actuators at each of the knee joints and its motion is constrained to a sagittal plane. In the simulation, the dynamic equation of the robot is derived by using SD/FAST [25] and integrated at time intervals of 1 millisecond by means of the Runge-Kutta Method and the reaction force of the floor is computed by means of a spring/damper model for the contact with the floor.

B-2-1. Learning from Human Walking with Dynamical Movement Primitives

B-2-1-1. Rhythmic Dynamical Movement Primitives

In this section, the dynamical movement primitives [22] proposed by the inventors of the present invention is briefly described. The motion learning primitive is adapted to describe demonstrated movements of a teacher by means of a nonlinear differential equation and quickly learn the motion by means of a statistic learning method so as to be used to generate a motion for the robot. Formulation of the motion leaning primitive for a periodic motion will be described below.

As a basic periodic motion pattern generator, let us consider a limit cycle oscillator system expressed by a polar coordinate system $(\Phi, r)$ that is expressed by the formula below, $$\tau\dot{\phi}=1 \quad \tau\dot{r}=-\mu(r-r_0) \quad \text{[formula 8]}$$

In the formula above, $(\Phi, r)$ respectively represent the phase and the amplitude of the oscillator. $\tau$ is a time constant and $r_0$ is a (relative) target amplitude, while $\mu$ is a positive constant. The phase dynamics of the above formula can also be expressed by the formula below. It should be noted that the formula below corresponds to a phase generator for generating a phase signal $\Phi$ for a periodic motion of a robot as oscillator.

$$\dot{\phi} = \omega \text{ where } \omega \stackrel{def}{=} 1/\tau \quad \text{[formula 9]}$$

The output y of the motion learning primitive is expressed by the formula below, which shows secondary system dynamics using the state $(\Phi, r)$ of the phase oscillator and v (hat)=[r cos $\Phi$, r sin $\Phi$] T obtained by coordinate transformation as input.

$$\tau\dot{z}=\alpha_z(\beta_z(y_m-y)-z) \quad \tau\dot{y}=z+f(\tilde{v}, \phi) \quad \text{[formula 10]}$$

In the above formula, $\alpha z$ and $\beta z$ are positive constants and ym is the offset of the output, while $f$ represents a nonlinear function approximater using local linear models [23] expressed by the formula below, which local linear models are weighted by Gaussian $\psi i=\exp(-hi \pmod{(\Phi, 2\pi)}-ci)2)$. The output is obtained by calculating the weighted average of the local linear models.

$$f(\tilde{v}, \phi) = \frac{\sum_{i=1}^{N} \Psi_i w_i^T \tilde{v}}{\sum_{i=1}^{N} \Psi_i} \quad \text{[formula 11]}$$

In the above formula, wi is a parameter of the local linear models, which is determined by locally weighted regression when a demonstrated trajectory is given as will be described in greater detail hereinafter.

The above two formulas [formula 10] and [formula 11] describe a periodic motion of a robot such as a walking motion by means of phase information $\Phi$ and correspond to a controller for controlling the operation of driving a movable section such as a leg. With such a controller, it is possible to continuously change with ease the amplitude, the synchronization, the offset and so on by simply selecting parameter values.

Figure 32:
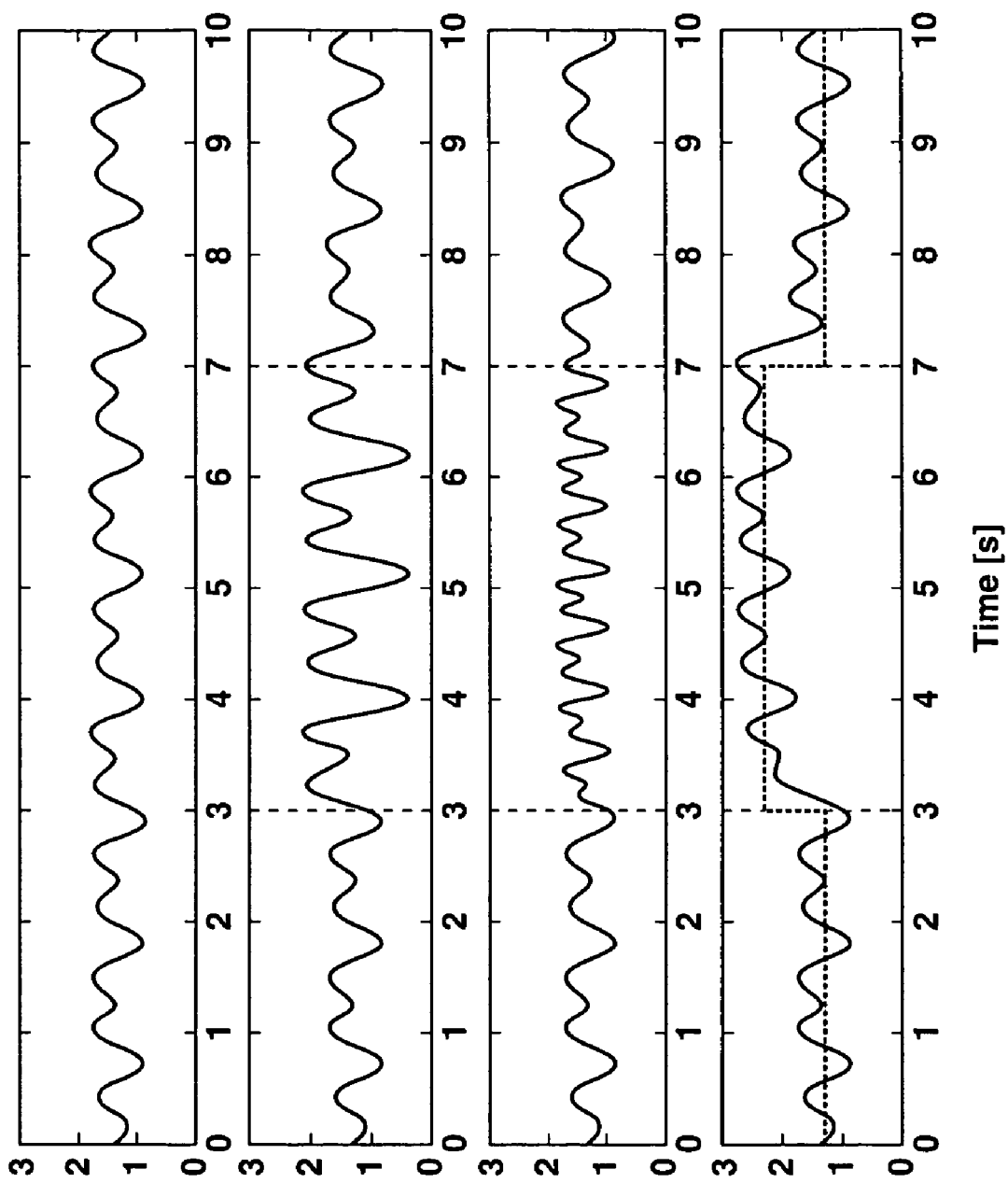
FIG. 32 is a schematic illustration of alternations made to a learnt trajectory of motion.

FIG. 32 is a schematic illustration of alternations made to a learnt trajectory of motion to show a characteristic feature of the motion learning primitive described in this section. It is possible to change with ease the amplitude, the period and the offset of a learnt motion by changing the parameters r0, $\tau(=1/\omega)$ and Ym. The inventors of the present invention verified the effectiveness of the motion learning primitive in an experiment where humanoid robot DB is driven to draw numeral 8 and learn a drumming motion [22].

B-2-1-2. Biped Robot Control System Using a Motion Learning Primitive

Figure 33:
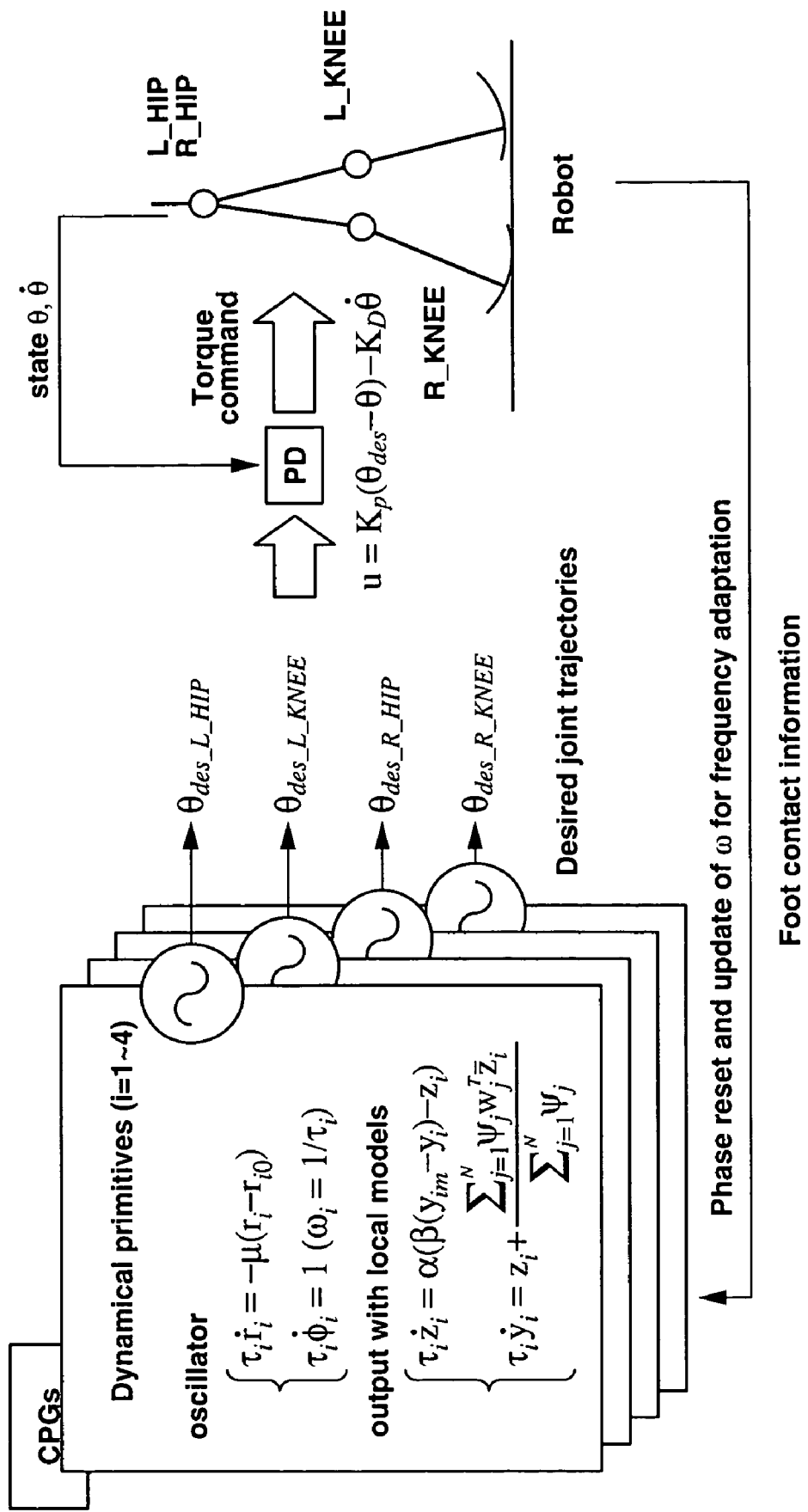
FIG. 33 is a schematic and conceptual illustration of the control system of an embodiment of robot according to the invention.

FIG. 33 is a schematic and conceptual illustration of the control system of an embodiment of robot according to the invention. A motion learning primitive as described in B-2-1-1 is used as CPG model and the output is used for target joint trajectory Odes of the robot. Here, a motion learning primitive is used to generate the target trajectory of each of the joints (i=1 to 4). A local PD controller is used for controlling the joint angle of each of the joints of the robot. Touch down information is fed back from the robot to the CPG for phase resetting [24] and updating the natural frequencies ω of the oscillators.

In this section, the operation of reducing the phase of the oscillator of the touch down leg to $\Phi=0$ and that of the oscillator of the other leg to Φ=π at the time of touch down will be described as phase resetting. The rule for updating the natural frequency of each of the oscillators for adapting it to the walking period will be described in detail in B-2-4. Phase resetting will be discussed in detail later in this section.

B-2-1-3. Learning a Walk Pattern of Man

Figure 34:
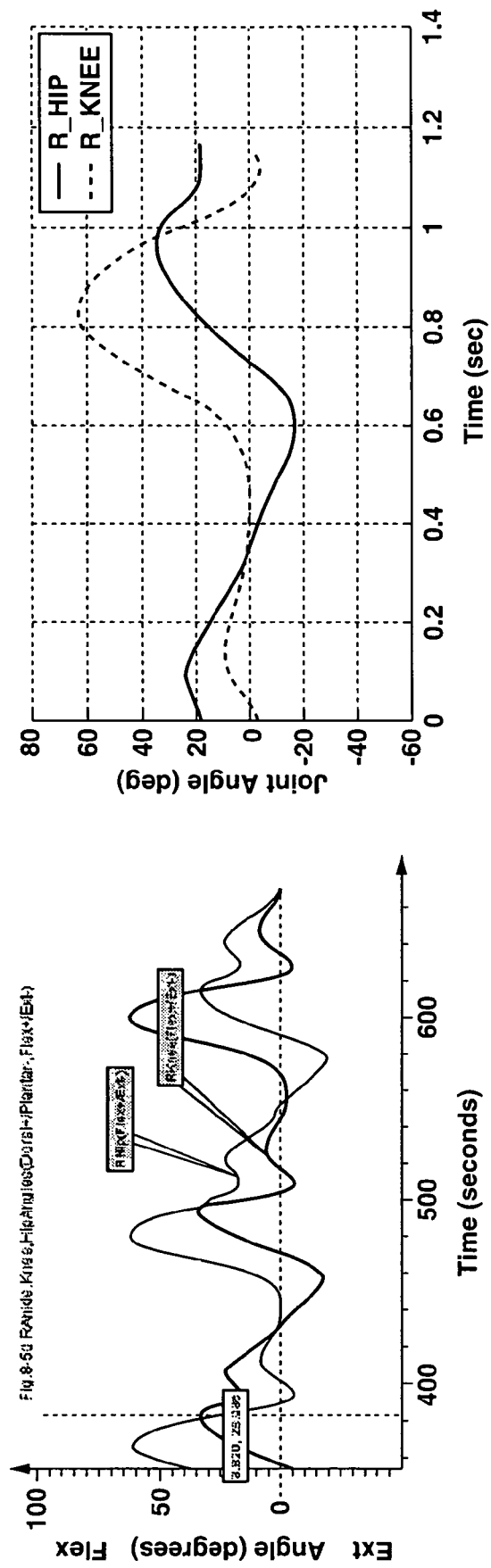
FIG. 34 shows graphs illustrating the joint angles and a period of motion from a touch down to the next touch down of the right leg obtained from collected data.

Walk Data: In this section, joint angle data of a walking man (at right hip joint and right knee joint of male, 29 years old, height: 176 cm, weight: 83.5 kg) are used [26]. In the future, data will be collected on various conditions for learning. The left graph in FIG. 34 shows the joint angles obtained from the collected data and the right graph in FIG. 34 shows the joint angles of a period from a touch down to the next touch down of the right leg. In the learning session that will be described in the next section, the trajectory of a period is repeated for 20 periods and the obtained period trajectory is used as leaning data. The walk data of FIG. 34 are used only for the sake of convenience and it is desirable to obtain data of a sufficiently large number of periods when acquiring walk data by actually observing a walk of man. From the data, period T=1.17 seconds and frequency f=1/T=0.855 Hz are estimated by obtaining the power spectrum and the autocorrelation by means of discrete FFT.

Locally Weighted Learning: A technique of determining locally weighted learning [23] by using the learning parameter wi in the above formula [formula 10] that corresponds to a controller when the joint trajectory ydemo is obtained from an exemplary motion of man will be described.

Assume that a data point at a given time t or data point (ftarget, v (hat)) is given.

$$f_{target} = \dot{y}_{demo} - \beta_z(y_m - y_{demo})$$ [formula 12]

At this time, the learning parameter wi is updated sequentially by locally weighted regression [23].

$$w_i^{t+1} = w_i^t + P_i^{t+1} \tilde{v} e_i,$$ [formula 13]

where $$P_i^{t+1} = \frac{1}{\lambda}\left(P_i^t - \frac{P_i^t \tilde{v} \tilde{v}^T P_i^t}{\frac{\lambda}{\Psi_i} + \tilde{v}^T P_i^t \tilde{v}}\right), e_i = f_{target} - w_i^T \tilde{v},$$ [formula 14]

where λ∈[0, 1] is forgetting coefficient. For leaning, it is possible to approximate an unknown object of approximation with a desired level of approximation accuracy without determining the structure of the function approximater in advance by adding the number and the arrangement of local models and optimizing the related region of the local model on an online basis.

Figure 35:
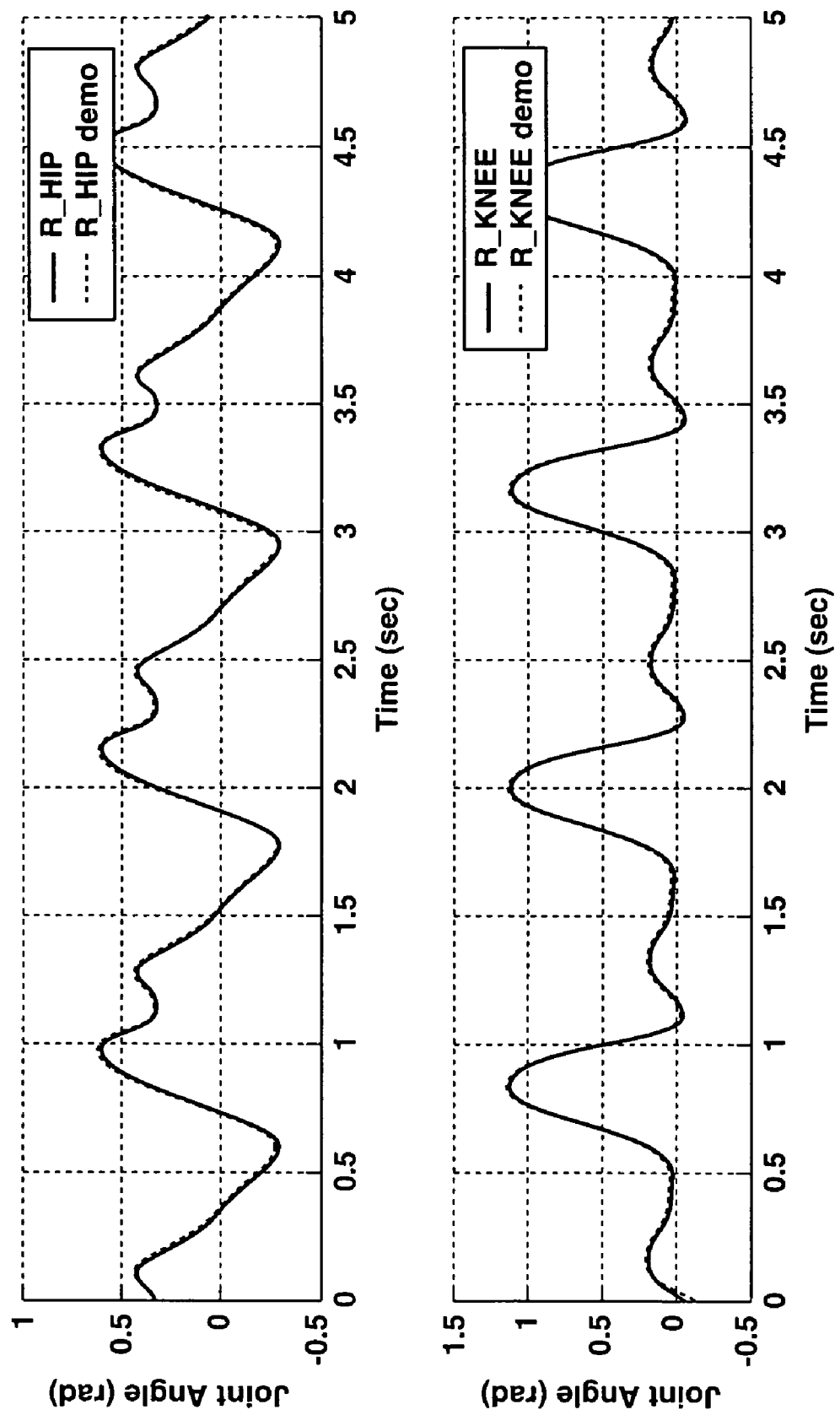
FIG. 35 shows graphs illustrating some of the results of learning a walk trajectory of man of a motion leaning primitive.

FIG. 35 shows graphs illustrating some of the results of learning a walk trajectory of man of a motion learning primitive. Since only data on the right leg is collected in the simulation described below, the learning parameters that correspond respectively to the right hip joint (R_HIP) and the right knee joint (R_KNEE) are determined from the data on the right hip joint and the right knee joint. Then, a target walk trajectory is generated by using the learning parameters for the right hip joint and the right knee joint respectively for the left hip joint (L_HIP) and the left knee joint (L_KNEE) and shifting the phase of the left oscillators by π[rad] from that of the right oscillators.

B-2-1-4. Numerical Simulation

Selection of Parameter Values: In the numerical simulation, the following parameter values are selected for the motion learning primitive, the PD controller and so on as shown in the table below.

TABLE 3

| | Parameter | Description | Value used |
|---|---|---|---|
| Dynamical primitives | $\tau_0$ | (relative) amplitude | 0.7 for all joints |
| | $\omega$ | natural frequency | 6.28 rad/s (1.0 Hz) after 10 steps for all joints |
| | $y_m$ | offset | Hip: $y_m = 0.0$ and Knee: $y_m = 0.35$ |
| Phase resetting | $\phi_i$ | phase | $\phi_1 = \phi_2 = 0, \phi_3 = \phi_4 = \pi$ at left leg heelstrike |
| | | | $\phi_1 = \phi_2 = \pi, \phi_3 = \phi_4 = 0$ at right leg heelstrike |
| PD gains | $K_P$ | position gain | Hip: $K_P = 8.0$ and Knee: $K_P = 6.0$ |
| | $K_D$ | velocity gain | 0.05 for all joints |

Currently, the above parameter values are empirically determined by simulations. However, the physical significance of these parameters is rather intuitive particularly for period and amplitude and hence they can be regulated relatively easily if compared with other CPG models. In the simulation described in this section, the period of the oscillators is shifted stepwise and made equal to 1.5 seconds from the start of walk to the second step (in terms of angular frequency ω=4.19 rad/s), 1.2 seconds from the third step to the ninth step (in terms of angular frequency ω=5.24 rad/s), 1.0 seconds from the tenth step and on (in terms of angular frequency ω=6.28 rad/s). These values are obtained empirically. In the following description, the rule of autonomous adaptation of walk period that uses the entrainment phenomenon and the rule of scaling the period that are obtained from the results obtained by applying the rule of autonomous adaptation will be discussed.

Figure 36:
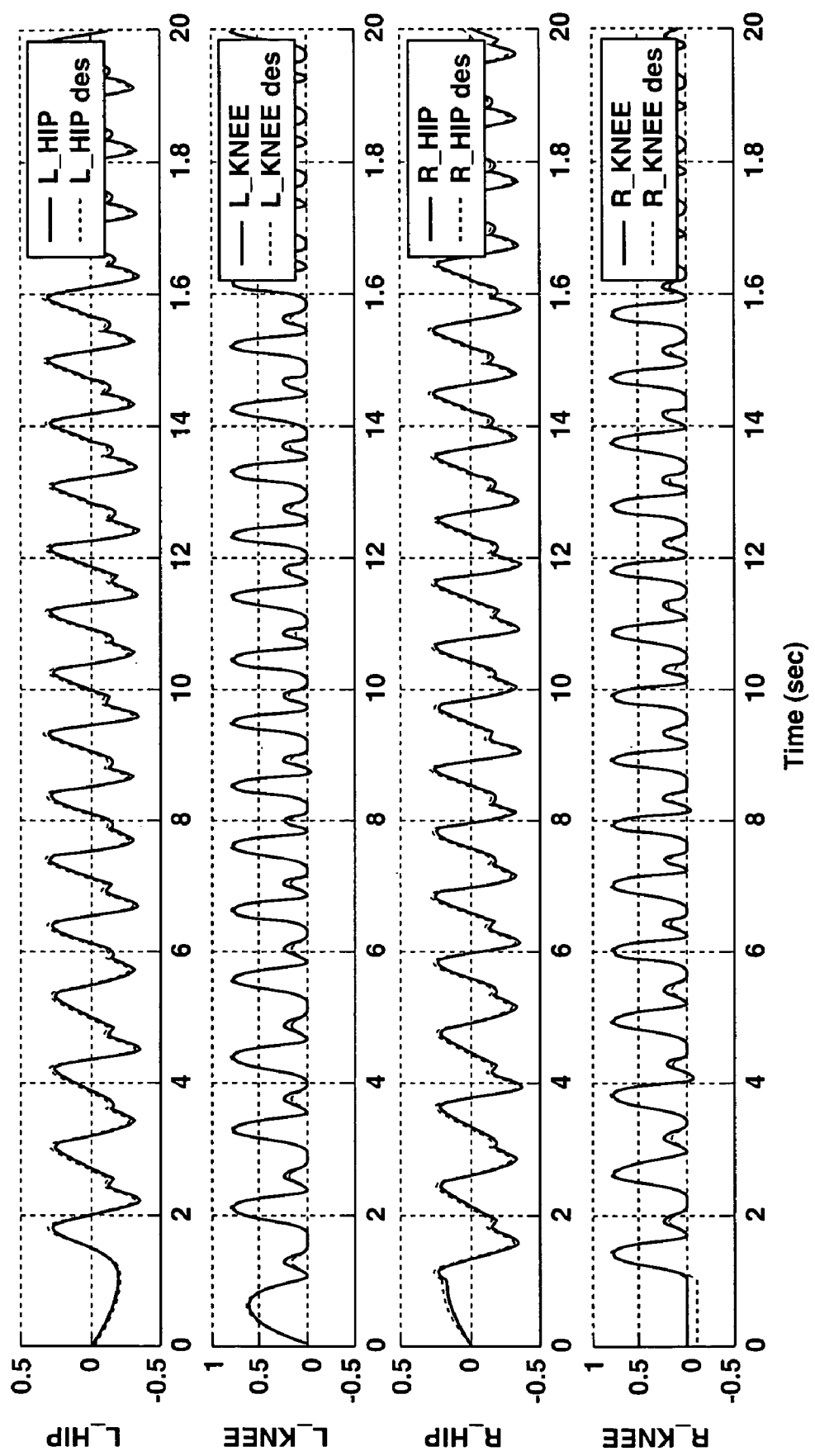
FIG. 36 shows graphs illustrating target joint trajectories and the trajectories of the joints of a robot with the output of a motion learning primitive for t=0 to 20.
Figure 37:
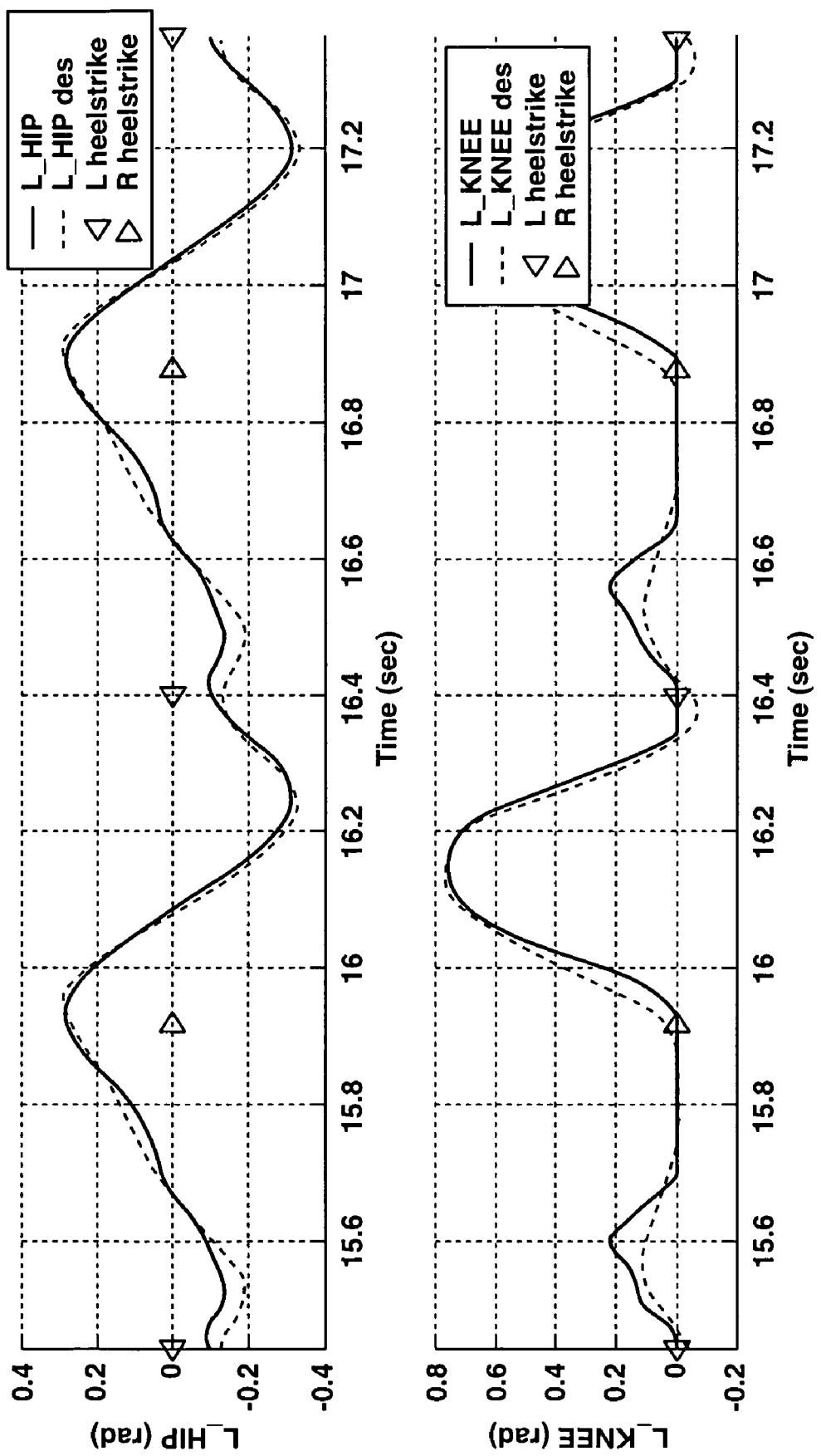
FIG. 37 shows graphs illustrating a target joint trajectory of the left leg of a robot, the trajectories of the joints and the touch down timings of the legs for two walk periods (four steps)
Figure 38:
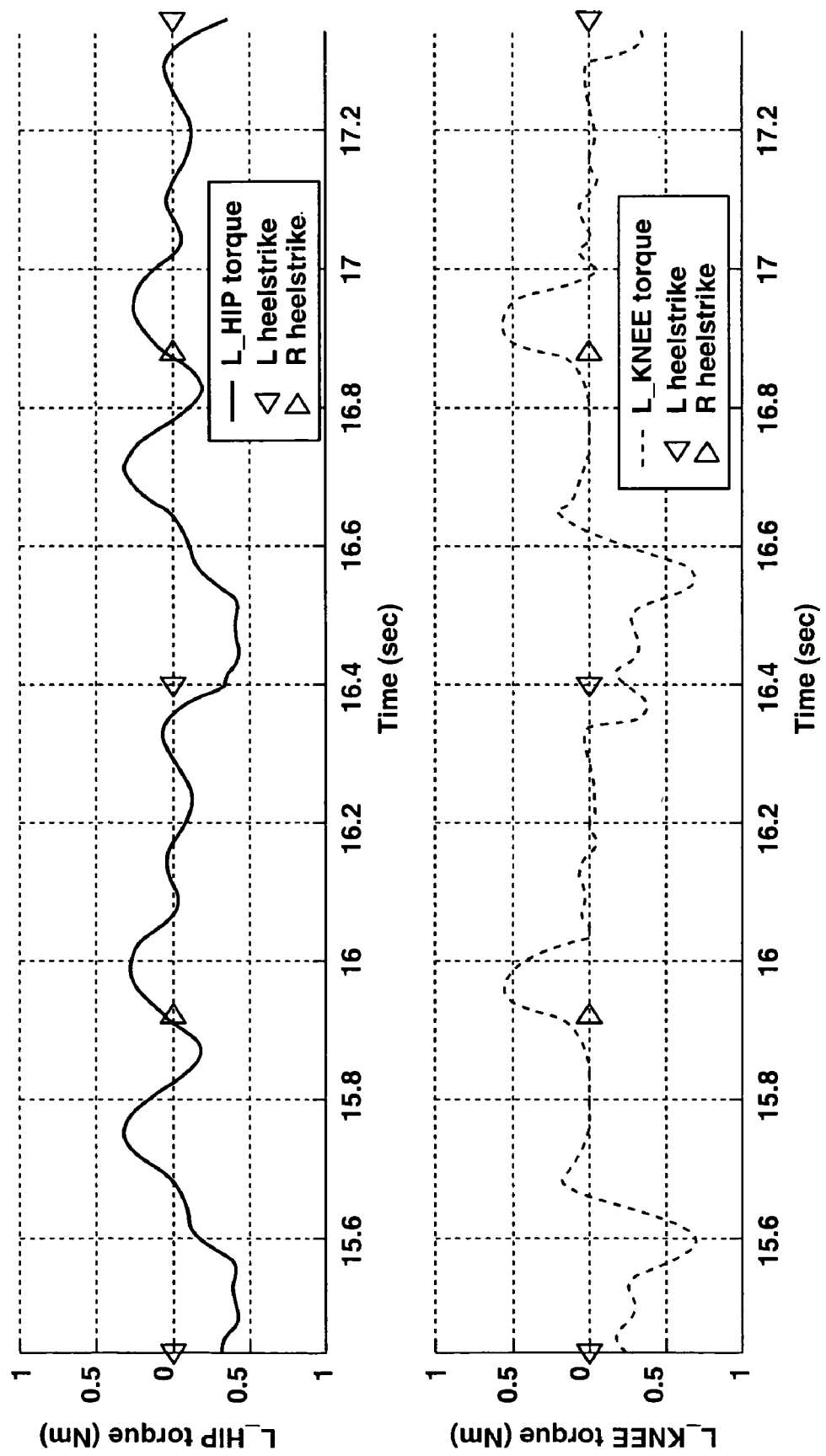
FIG. 38 shows graphs illustrating joint torque command values.

Results of Simulation: In the simulation, the designer generates a trajectory for making the first step of walk from a state where the two legs are put side by side on the floor. FIG. 36 shows graphs illustrating target joint trajectories and the trajectories of the joints of the robot with the output of the motion learning primitive for t=0 to 20. FIG. 37 shows graphs illustrating the target joint trajectory of the left leg of a robot, the trajectories of the joints and the touch down timings of the legs for two walk periods (four steps). FIG. 38 shows graphs illustrating joint torque command values. The command speed of the hip joint and that of the knee joint are found within respective ranges of −3.12 to 2.22 rad/s and −6.09 to 5.23 rad/s.

Figure 39:
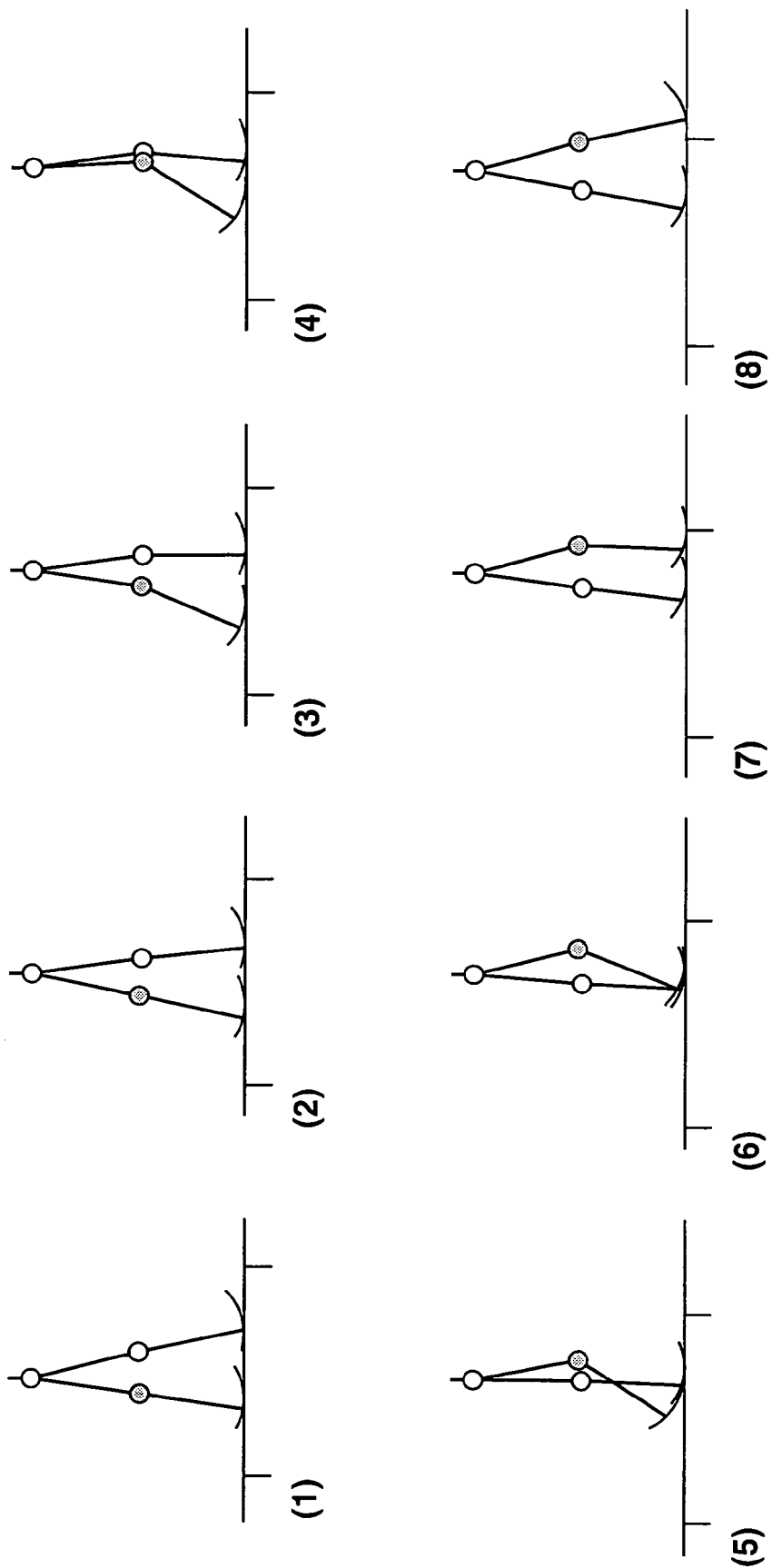
FIG. 39 is a schematic illustration showing how a robot walks in a steady state.

It will be seen from the torque command value of the knee joint at time t=11.2 to 11.6 seconds that practically no torque is required to swing out the knee. From this finding, it is conceivable that the swing of the link under the knee is made passively by utilizing the swinging out motion of the thigh link. FIG. 39 is a schematic illustration showing how a robot walks in a steady state. The time interval between two consecutive frames is 66 milliseconds.

Figure 40:
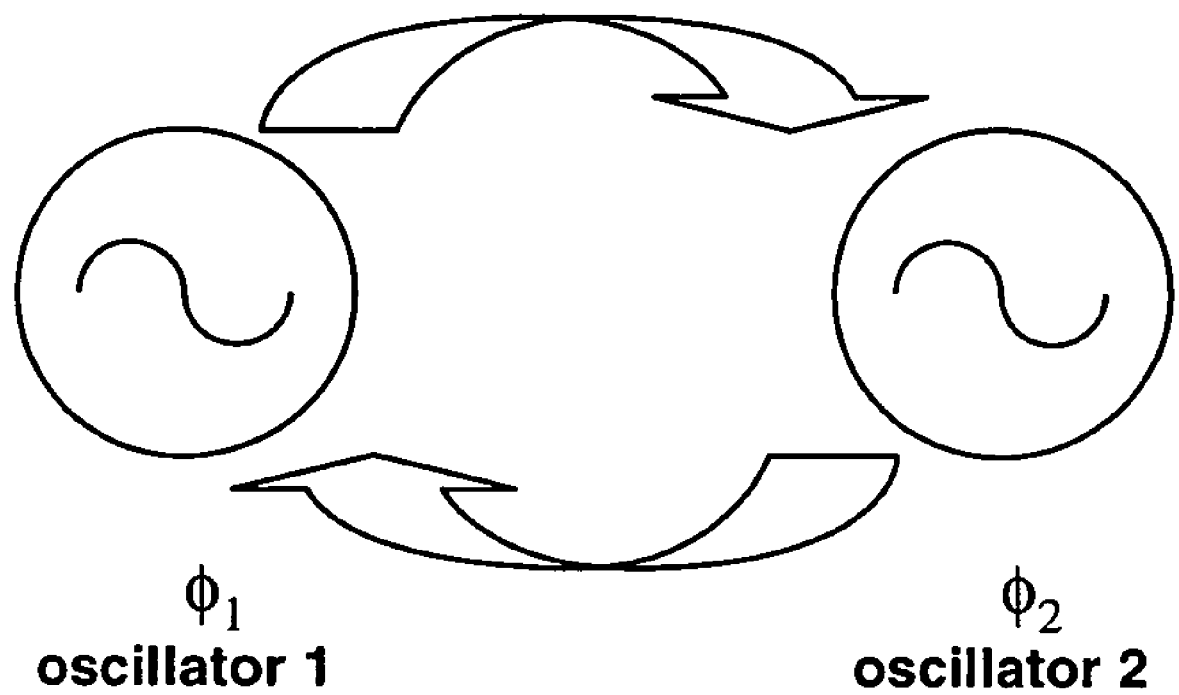
FIG. 40 is a schematic illustration of the dynamics of two coupled phase oscillator.
Figure 42:
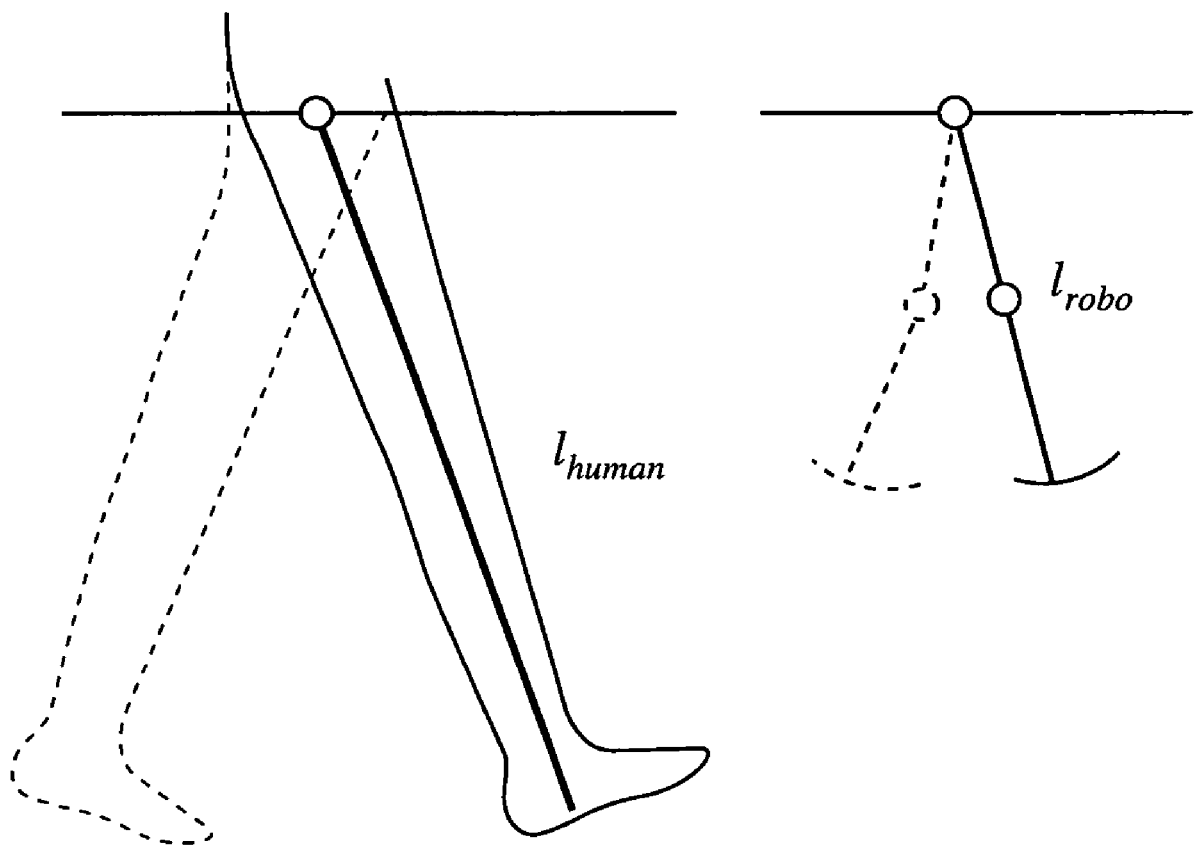
FIG. 42 is a schematic illustration of the motions of two single pendulums with different lengths based on an assumption that the swing leg is swung by free oscillation.

B-2-2. Autonomous Adaptation of Walk Period Utilizing Entrainment of Phase Oscillator B-2-2-1. Synchronization of Coupled Phase Oscillator System by Entrainment Entrainment by Phase Difference Feedback:

Firstly, synchronization of a coupled phase oscillator system by entrainment of phase difference feedback will be described [27]. Let us consider the dynamics of two coupled phase oscillators as shown in FIG. 40. The formula below corresponds to a phase generator that generates phase information $\Phi 1$ and $\Phi 2$ relating to the periodic of two movable sections of a robot.

$$\dot{\phi}_1 = \omega_1 + K_1(\phi_2 - \phi_1)$$

$$\dot{\phi}_2 = \omega_2 + K_2(\phi_1 - \phi_2) \qquad [\text{formula 15}]$$

When the phase difference $\psi$ is defined as $\psi = \Phi 2 - \Phi 1$, the time differential is expressed by the formula below.

$$\dot{\psi} = (\omega_2 - \omega_1) - (K_1 + K_2)\psi \qquad [\text{formula 16}]$$

Then, the equilibrium point $\psi^*$ is defined by the formula below.

$$\psi^* = \frac{\omega_2 - \omega_1}{K_1 + K_2} \qquad [\text{formula 17}]$$

The frequency of each oscillator is entrained in a manner as defined by the formula below.

$$\omega^* = \frac{K_2\omega_1 + K_1\omega_2}{K_1 + K_2} \qquad [\text{formula 18}]$$

Therefore, it will be seen that, as a result of entrainment of each oscillator, the oscillators oscillate in an asymptotically synchronized manner with frequency $\omega^* = (K2\omega 1 + K1\omega 2)/(K1+K2)$ and phase difference $\psi = \Phi 2 - \Phi 1 = (\omega 2 - \omega 1)/(K1+K2)$.

Achievement of Target Phase Difference by Adaptation of Natural Frequency:

In the case of the above described phase oscillators, if the natural frequencies $\omega 1$ and $\omega 2$ of the oscillators are fixed, they oscillate in a synchronized manner with phase difference $\psi = \Phi 2 - \Phi 1 = (\omega 2 - \omega 1)/(K1+K2)$ as a result of entrainment. If $\omega 1 = \omega 2$, it will be clear that the oscillators oscillate with phase difference 0. Therefore, let us consider here about introducing dynamics of updating the natural frequencies as expressed by the formula below and asymptotically making $\omega 1 \rightarrow \omega 2$ to realize synchronization by concordance of frequencies and phase difference 0 by means of entrainment.

$$\dot{\phi}_1(t) = \omega_1(t) + K_1(\phi_2(t) - \phi_1(t))$$

$$\dot{\omega}_1(t) = -K(\omega_2 - \omega_1(t))$$

$$\dot{\phi}_2(t) = \omega_2 + K_2(\phi_1(t) - \phi_2(t)) \qquad [\text{formula 19}]$$

Thus, since $\omega 1 \rightarrow \omega 2$ asymptotically takes place, the phase difference $\psi = \Phi 2 - \Phi \rightarrow 0$ is realized.

B-2-2-2. Rule of Autonomous Adaptation of Walk Period

In this section, application of the above described mechanism of entraining coupled phase oscillators to autonomous adaptation of walk period in walk control using a motion learning primitive will be discussed. As shown in FIG. 30, the control system of this embodiment can be regarded as a combination of a CPG using a motion learning primitive and a machine system oscillator (robot).

With regard to generation of a target joint trajectory using a sine synthetic wave, the inventors of the present invention considered to update the frequency of the pattern generator by means of the formula below, using the measured time that the robot takes for a step.

$$\hat{\omega}^{n+1} = \hat{\omega}^n + K(\omega^n_{measured} - \hat{\omega}^n) \qquad [\text{formula 20}]$$

The phase estimator handles with measured phase value on measured, which is based on state quantity V, as estimated phase value. Note, however, that the formula below holds true.

$$\omega^n_{measured} = \frac{\pi}{T^n_{measured}} \qquad [\text{formula 21}]$$

Tn measured is defined as the time that the robot takes for a step at the n-th step (a half period for the oscillator). From the viewpoint of the dynamics of phase oscillators described in B-2-2-1, this is exactly what the above formula [formula 19] is made discrete. However, since no feedback is made for the phase difference simply by updating the frequencies, it will be clear that the above arrangement is not sufficient for realizing a desirable phase difference by entrainment. Therefore, in this embodiment, a rule of adaptation as expressed by the formula below is introduced into the motion learning primitive (phase generator) in order to further feed back the phase difference discretely by "phase resetting" at the touch down time according to the description of B-2-2-1. It is possible by phase resetting to improve and stabilize the transient characteristics in a walk or some other motion (as will be described in greater detail hereinafter). The formula below corresponds to the updating rule of a phase generator for updating the phase signal on the basis of the phase and angular frequency values estimated by a phase estimater.

$$\dot{\phi} = \hat{\omega}^n + \delta(t - t_{heelstrike})(\phi^{robot}_{heelstrike} - \phi) \qquad [\text{formula 22}]$$

$$\hat{\omega}^{n+1} = \hat{\omega}^n + K(\omega^n_{measured} - \hat{\omega}^n)$$

In the above formula, n is the number of steps and $\Phi$ robotheelstrike is the phase of the machine system oscillator (robot) at the touch down time. More specifically, phase resetting is defined relative to the primitive (phase generator) so as to be $\Phi$ robotheelstrike=0 at the touch down time of the own leg and $\Phi$ robotheelstrike=$\pi$ at the touch down time of the other leg. The relationship of the rule with the analysis of the dynamics of the phase oscillator of B-2-2-1 suggests that desirable synchronization is realized for realizing a walk of the phase oscillator and the machine system oscillator. While $\omega$ is updated discretely in this section, it is also possible to introduce a rule of adaptation as defined by the formula below to update $\omega$ continuously and take the gain of the phase feedback into consideration.

$$\dot{\phi} = \omega + K_1\delta(t - t_{heelstrike})(\phi^{robot}_{heelstrike} - \phi) \qquad [\text{formula 23}]$$

$$\dot{\omega} = K_2(\omega^n_{measured} - \omega)$$

B-2-2-3. Numerical Simulation

The rule of autonomous adaptation of walk period described in the immediately preceding section will be simulated in this section. A value of 4.78 rad/s (period of oscillator: 1.5 seconds) is selected for the initial value of angular frequency ω. FIG. 41 shows graphs illustrating some of the results of a walk simulation when incidence numbers of K=0.2, 0.5 and 0,8 are selected. In FIG. 41, the left graph shows the time required for a step while the right graph shows the updated values of angular frequency ω. It will be appreciated from FIG. 41 that autonomous adaptation of walk period is realized by mutual entrainment of a CPG and a machine system.

B-2-3. Discussion on Motion Scaling

The designer empirically scaled the walk period in order to realize a walk for the robot in the simulation described in B-2-2-3. However, as described in B-2-2-2, a walk period that is desirable for the physical characteristics of the robot may be obtained by utilizing the phenomenon of entrainment so as to make the CPG and the machine system operate in a synchronized manner without explicitly giving a target period. Thus, the relationship between the measured walk period of man and the walk period of the robot obtained as a result of autonomous adaptation will be discussed in this section.

Figure 1:
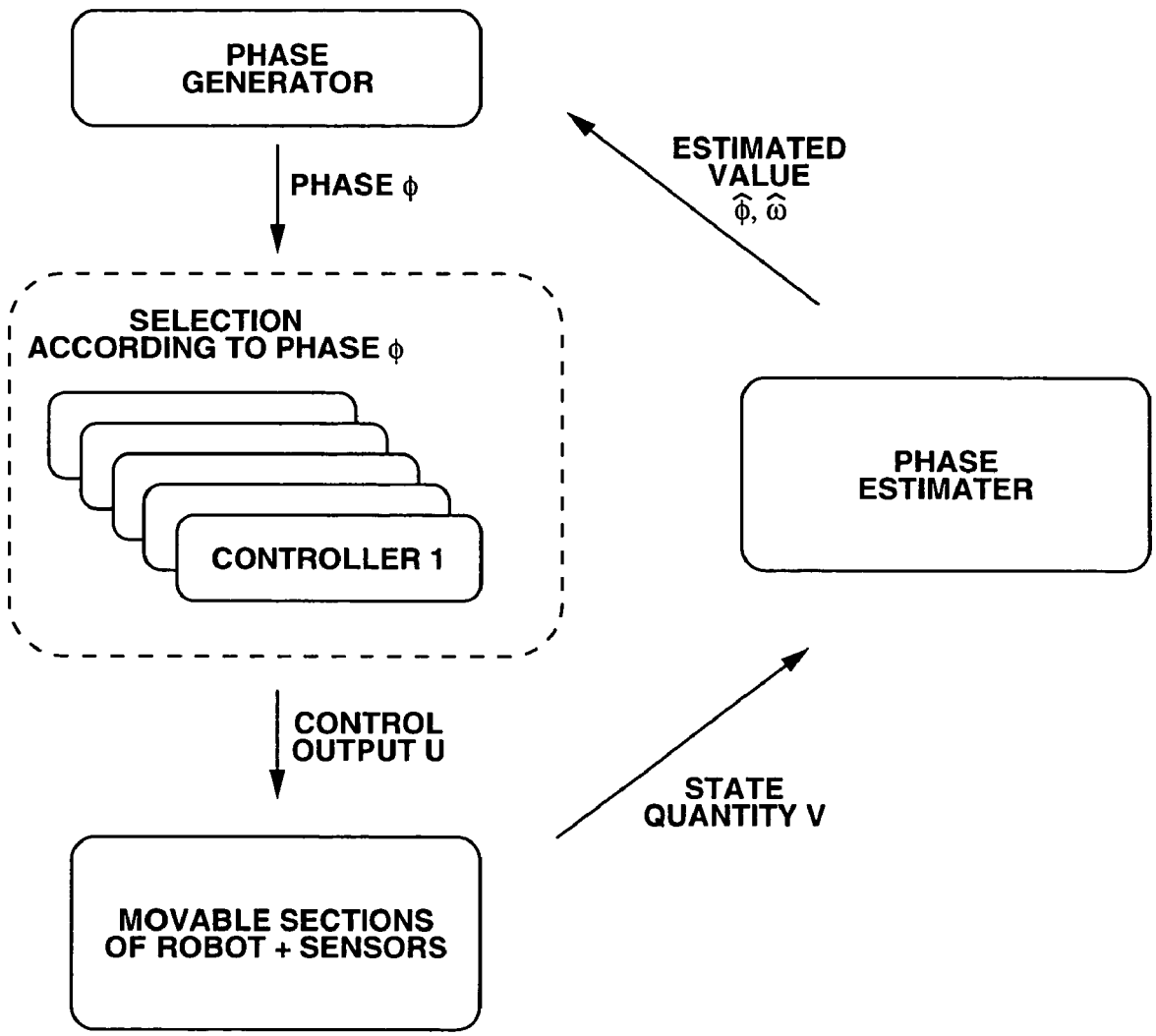
FIG. 1 is a schematic and conceptual illustration of the configuration of the attitude stability control mechanism of a robot according to the invention.
Figure 2:
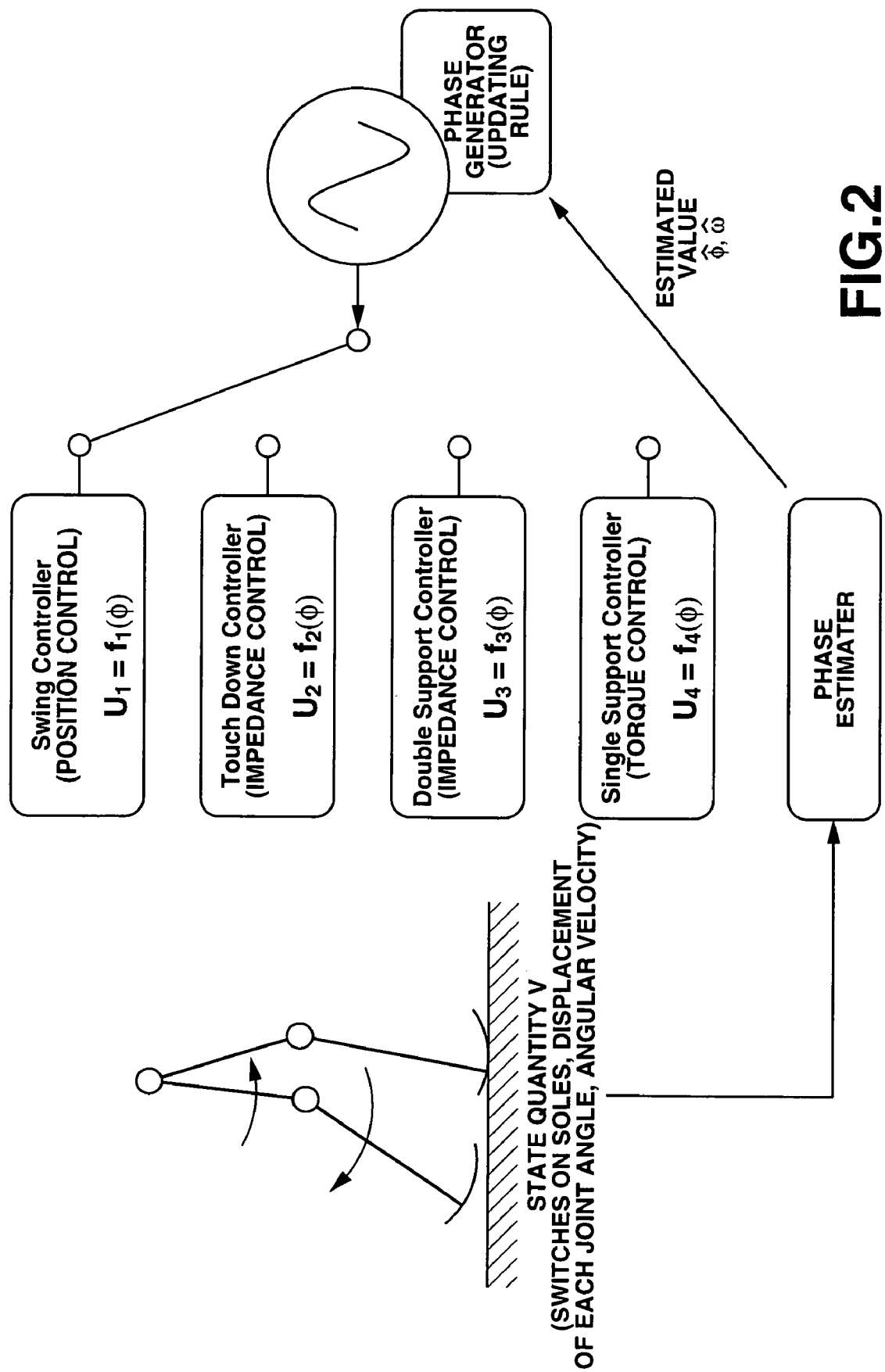
FIG. 2 is a schematic illustration of a mechanism for appropriately selecting a controller according to phase information Φ when a two-legged mobile robot makes a walking motion, using the left and right legs as supporting leg and swing leg alternately in a switched manner.
Figure 3:
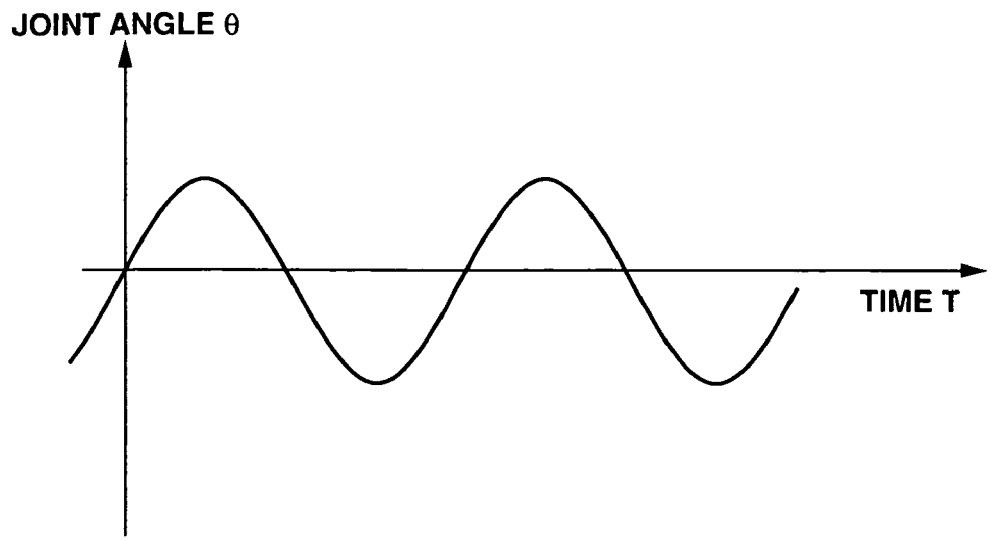
FIG. 3 is a schematic illustration of the relationship of the joint angle θ of a movable section and the phase Φ of the periodic motion thereof.
Figure 4:
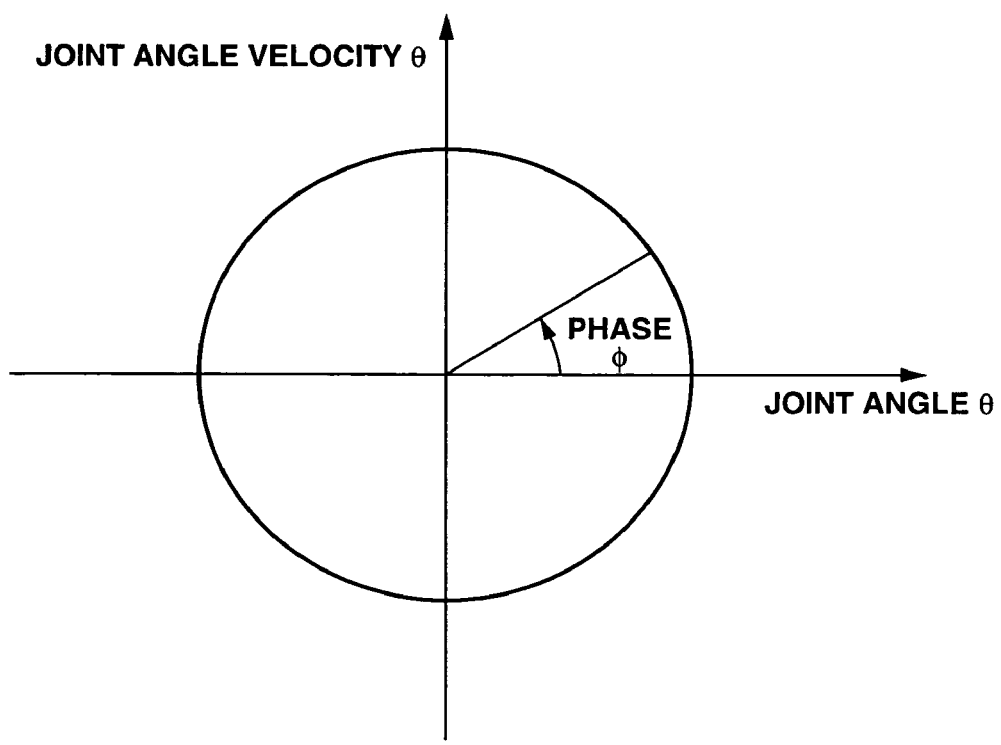
FIG. 4 is a schematic illustration of the relationship of the joint angle θ of a movable section and the angular velocity of the joint for given phase Φ.
Figure 5:
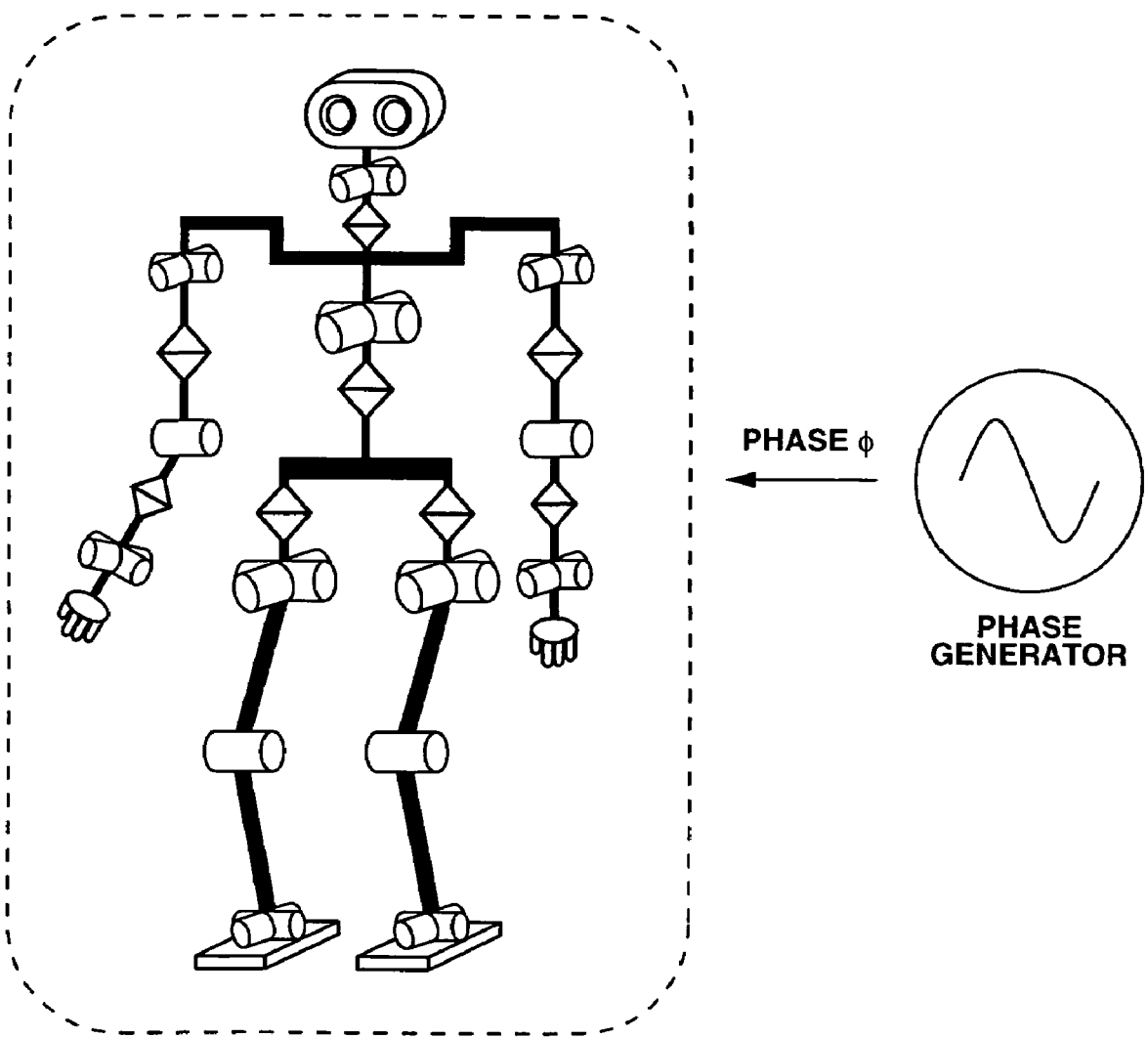
FIG. 5 is a schematic illustration of a single phase generator defined for the entire machine body of a robot by taking the motion of the entire robot for a periodic motion.
Figure 6:
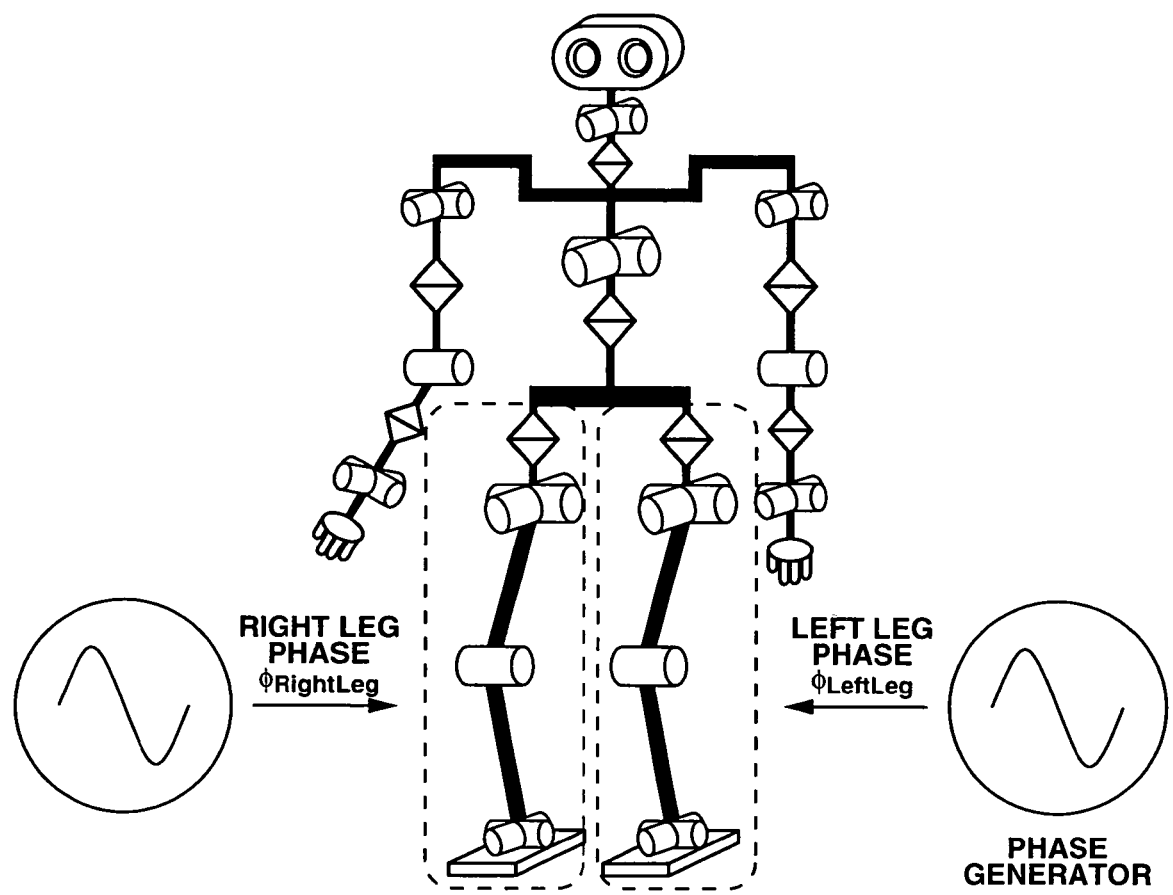
FIG. 6 is a schematic illustration of phase-generators defined respectively for the left leg and the right leg by taking the motion of each of them for an independent periodic motion.
Figure 7:
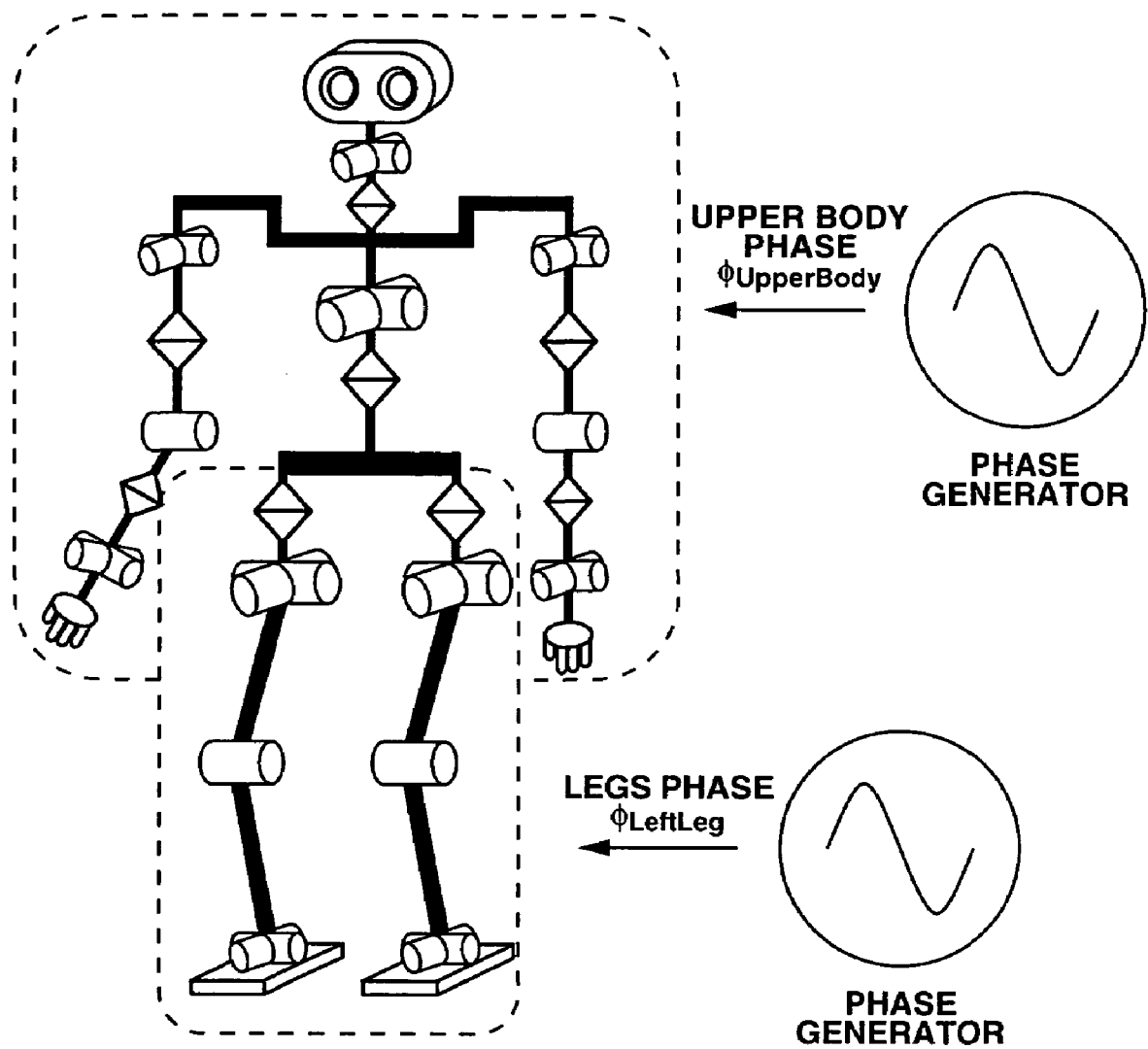
FIG. 7 is a schematic illustration of phase generators defined respectively for the lower limbs and the other members including the upper limbs and the trunk by taking the motion of each of them for an independent periodic motion.
Figure 8:
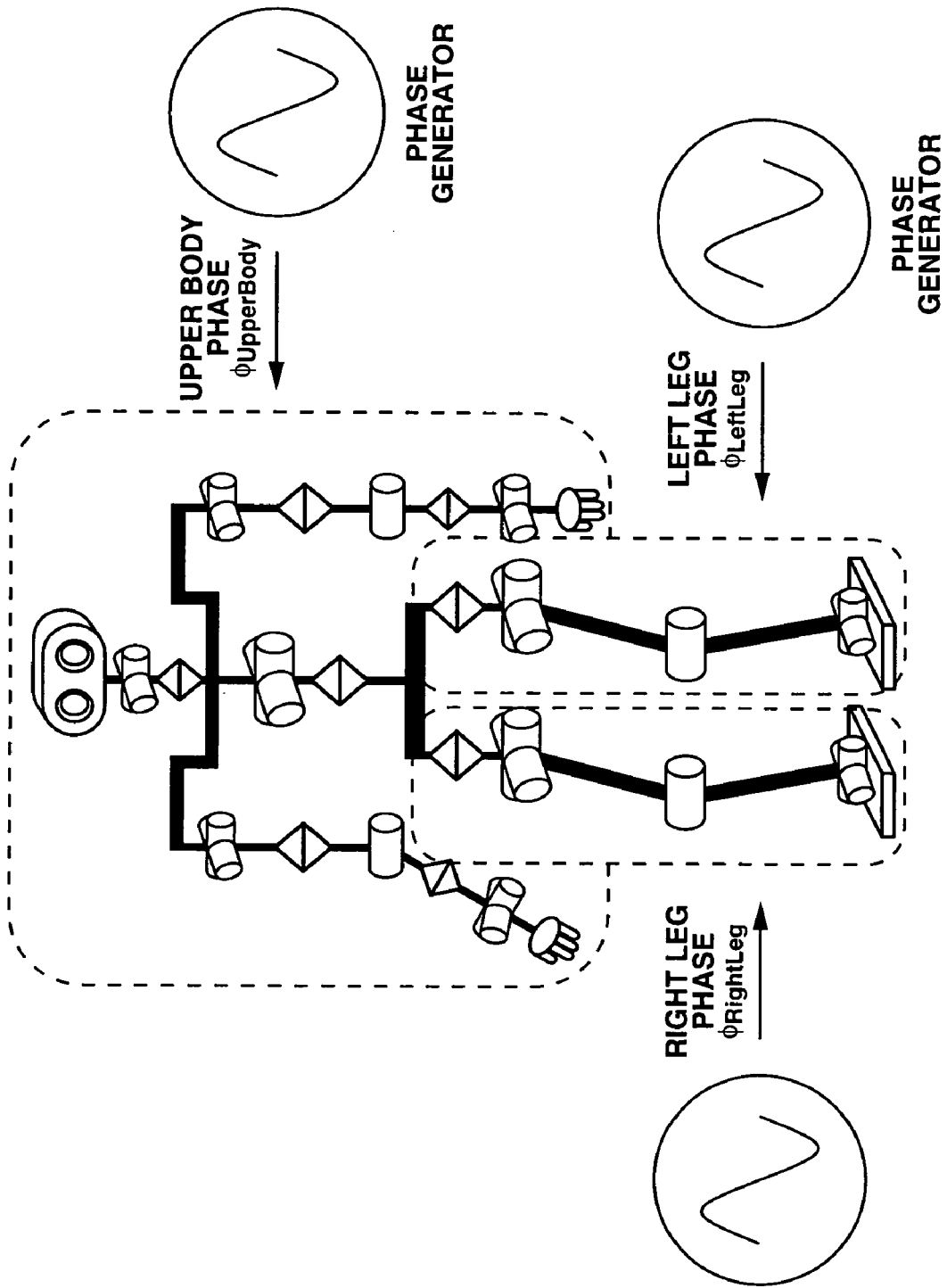
FIG. 8 is a schematic illustration of phase generators defined respectively for the left leg, the right leg and, the other members including the upper limbs and the trunk by taking the motion of each of them for an independent periodic motion.
Figure 9:
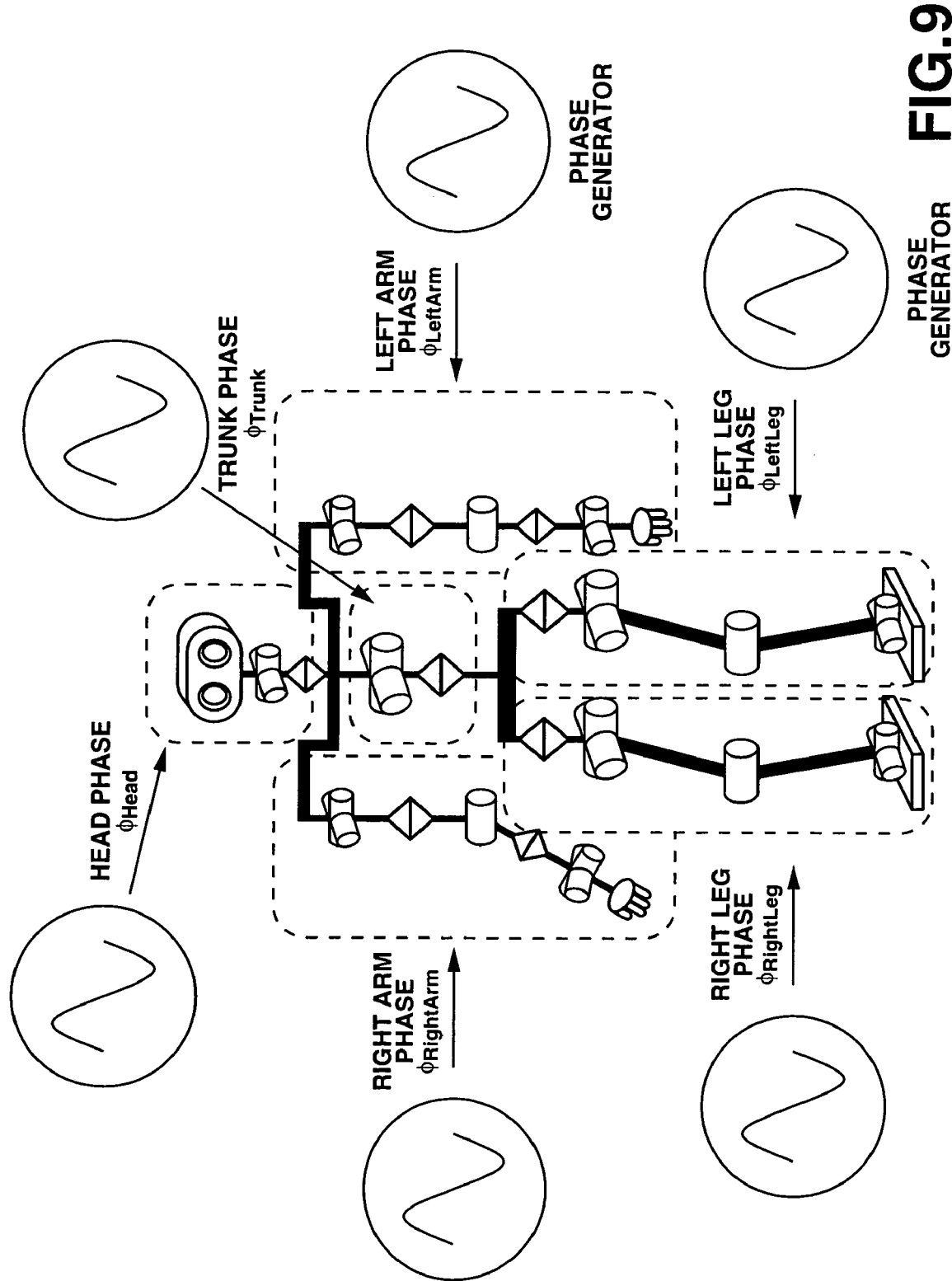
FIG. 9 is a schematic illustration of phase generators defined respectively for the left leg, the right leg, the left arm, the right arm, the trunk and the head by taking the motion of each of them for an independent periodic motion.
Figure 10:
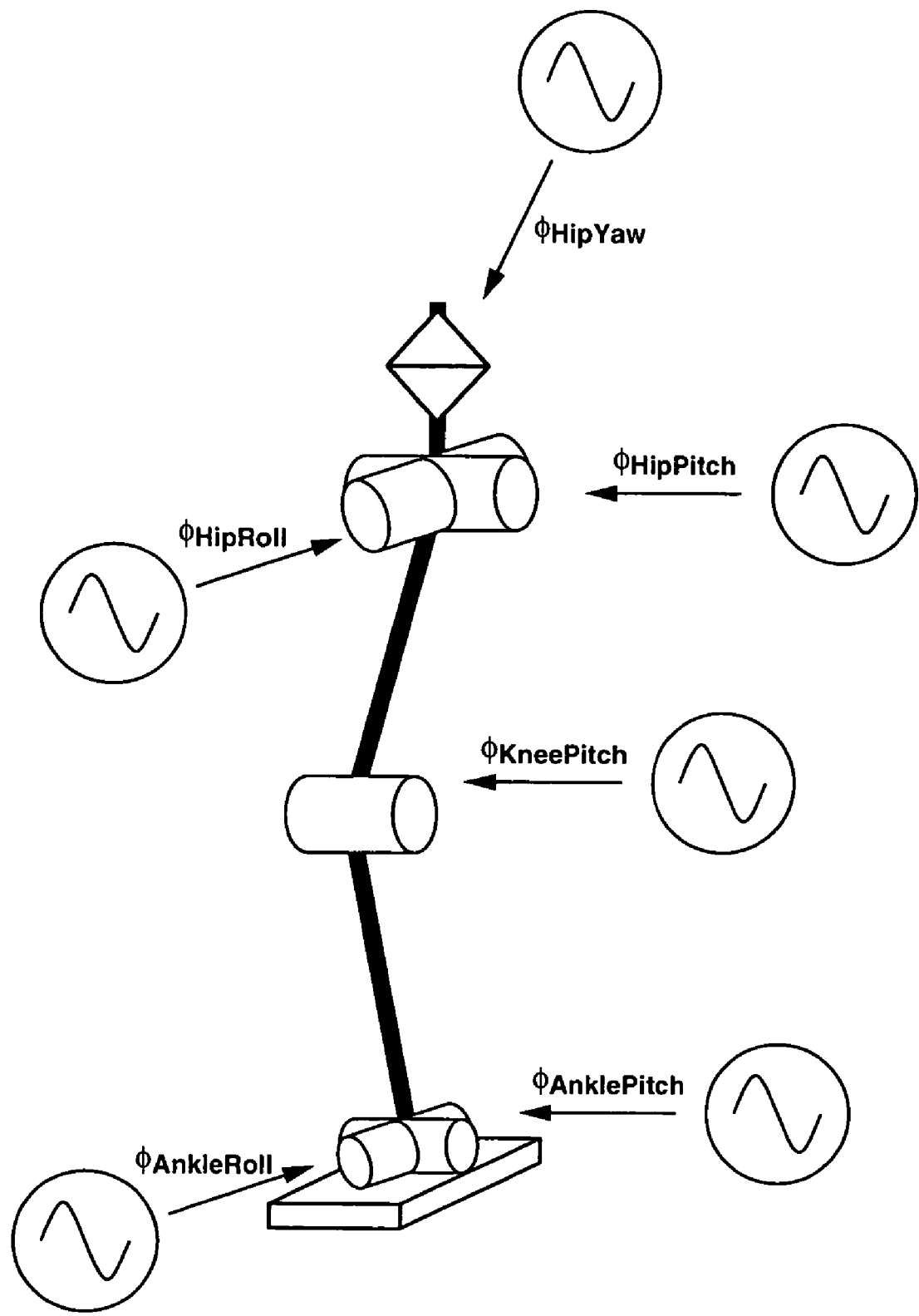
FIG. 10 is a schematic illustration of phase generators defined respectively for the joints by taking the motion of each of them for an independent periodic motion.
Figure 11:
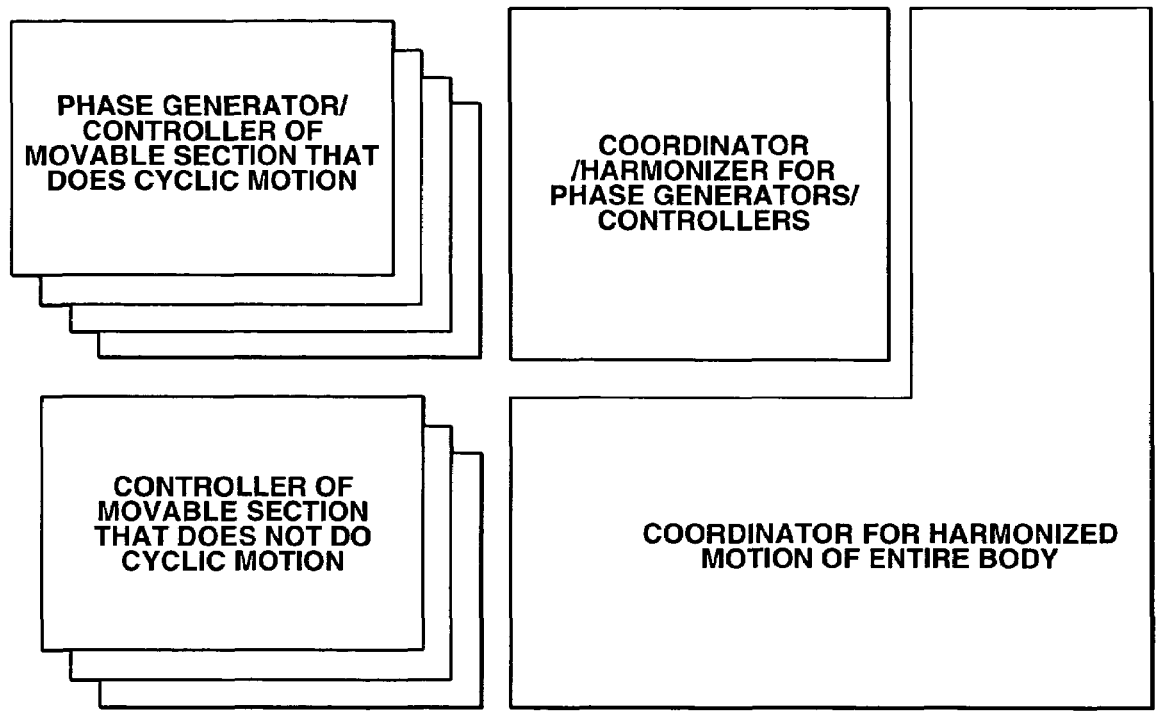
FIG. 11 is a schematic illustration of the arrangement for realizing a coordinated motion of the entire robot by coordinating the control quantities for the movable sections.

Assume that the swing leg of a walking man is swung out forward by a free oscillation and let us consider the motions of two single pendulums having different length as shown in FIG. 4. It is well known that the motion of pendulums that are assumed to be linear dynamics is expressed by the formula below.

$$\ddot{\theta} + \frac{g}{l}\theta = 0 \qquad \text{[formula 24]}$$

Then, the natural frequency ω is expressed by the formula below.

$$\omega = \sqrt{\frac{g}{l}} \qquad \text{[formula 25]}$$

Therefore, when the frequency ωhuman of walk of man, the length lhuman of the legs of man and the length lrobot of the legs of a robot are given, the desirable frequency ωrobot of the robot can be estimated on the basis of the ratio of the frequencies of the single pendulums by the formula below.

$$\hat{\omega}_{robot} = \omega_{human} \sqrt{\frac{l_{human}}{l_{robot}}} \qquad \text{[formula 26]}$$

Now, the relationship between the walk data of man and the walk period of the robot obtained by autonomous adaptation in the simulation of B-2-2-2 will be discussed below.

The walk data contained in the Reference Document [26] are those of a man aged 29 with a height of 176 cm. It is known by human anatomy that the length of the legs takes about 49% of the height of man [28]. Therefore, it is assumed here that the length of the legs of man is lhuman=1.76×0.49=0.86 m. Since the length of the legs of the robot is lrobot=0.4 m, it is possible to estimate the walk frequency and the time necessary for a step of the robot by using the formula below, on the basis of the scaling rule of the above formula [formula 26].

WLAK FREQUENCY: $\hat{\omega}_{robot}$=7.87 rad/s

TIME NECESSARY FOR A STEP: 0.399 sec [formula 27]

As a result of the simulation of a robot, using the rule of adaptation of B-2-2-2, the approximation formula shown below is obtained (average values between the 90th step to the 100th step for K=0.2, 0.5 and 0.8).

WLAK FREQUENCY: $\omega_{robot}$=8.120 rad/s

TIME NECESSARY FOR A STEP: 0.387 sec [formula 28]

The above result suggests that the error between the estimated values and the corresponding respective values obtained by the simulation is about 3% and it is possible to compute the desirable walk period of the robot on the basis of the frequency scaling rule of the above formula [formula 26].

Figure 65:
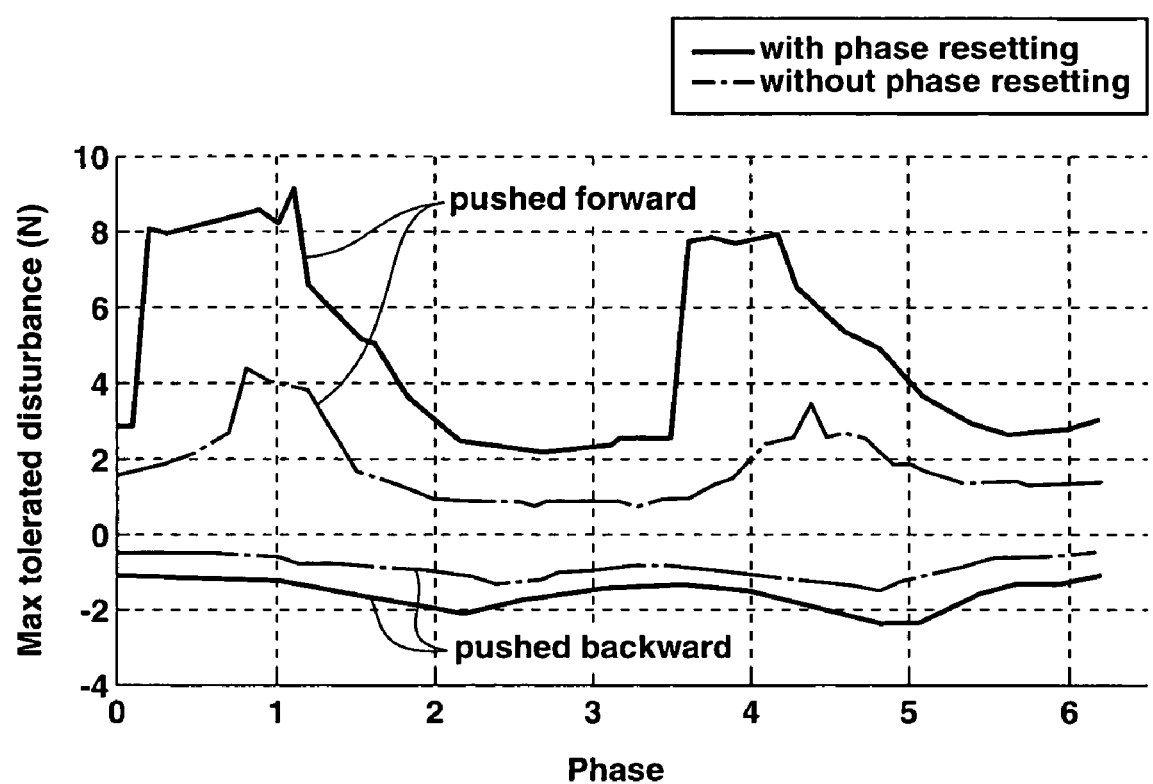
FIG. 65 shows a graph illustrating tests involving phase resetting and those not involving phase resetting in comparison.
Figure 66A:
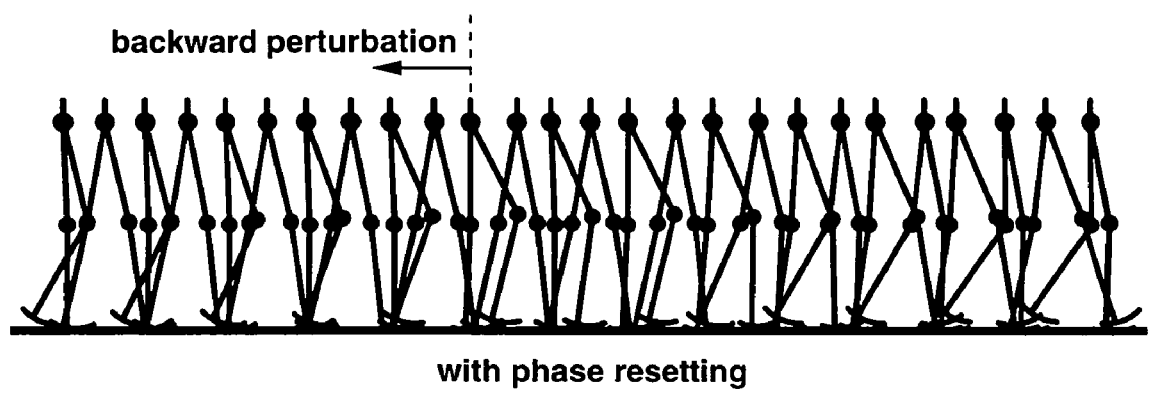
FIGS. 66A and 66B shows instances of response where external force was applied as external disturbance.
Figure 66B:
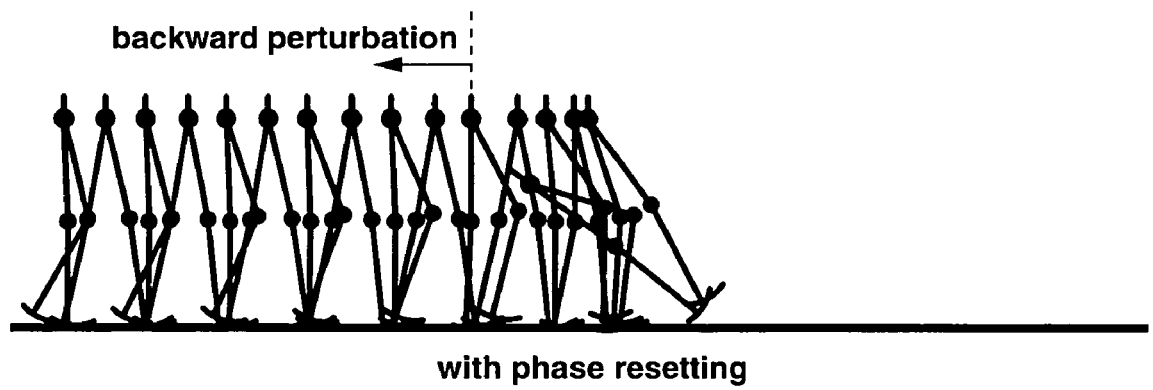

Now, that phase resetting is effective for the robustness of walk relative to external disturbances will be illustrated by means of a simulation. In this simulation, external pushing force is applied to the walking robot forwardly or backwardly for 0.1 sec. at various timings as external disturbance to see how long the robot can continue its walk without falling against the external force what was made to vary. More specifically, the magnitude of external disturbance that the walking robot can withstand and continue walking for every phase Φ (at intervals of 0.1 rad) between 0 and 2π was observed. FIG. 65 shows a graph illustrating tests involving phase resetting and those not involving phase resetting in comparison. FIGS. 66A and 66B illustrate instances of response where external force of −2.0N was applied for 0.1 sec. as external disturbance at Φ=2.0 rad (to push the robot backward by force of 2.0N). FIG. 66A shows an instance involving phase resetting, whereas FIG. 66B shows an instance not involving phase resetting. From the obtained results, it is seen that phase resetting is effective for improving the robustness of the robot relative to external disturbances.

B-2-4. Phase resetting for Distributed Type Phase Generator

According to the present invention, a robot is regarded as a physical oscillator that shows a periodic motion and a phase generator for generating phase signals is defined. If a plurality of movable sections that independently show respective periodic motions (e.g., left and right legs, a combination of legs and a trunk etc.) are found, a plurality of phase generators are defined for each movable section as described above by referring to FIGS. 6 through 10.

On the other hand, while a neural oscillator (CPG), passive dynamics, state machine, reinforcement learning, optimization and kinetic energy constraint can be used in place of a ZMP for the purpose of realizing machine motions that resemble motions of living things, it is difficult to build a realistic design theory that can cover all the nonlinear dynamic systems (that are not based on mathematic principles).

Thus, as a matter of consequence, an idea of describing interactions of a plurality of distributed neural oscillators and a physical world by means of phase response curves or phase resetting curves) for designing a robot is conceivable. Since it is only necessary to deal with phase oscillators and hence, when the physical world is set a part, it only requires to analytically obtain a solution for establishing a stable period for a discrete dynamic system. Thus, the net result is very simple. While the entire system is a hybrid control system, it is simplified by approximation of the feedback from the physical world by phase resetting. Inversely, with regard to the action of the neural oscillators to the physical world, a continuous flow of information is assumed by using at least part of the gain of the local feedback for the target trajectory, torque, the motion command for muscles, stiffness and deviation from the target trajectory. As for the influence of the oscillators on the phase, two or three phase resetting operations, if possible only a single phase resetting operation, will be conducted within a period.

As for mutual synchronization of the phase generators that are arranged in a distributed manner, while it may be possible to design it with diffusion of stable variables and/or a system of continuous dynamics that involves a sine function of phase difference and so on, it may be better to design it by means of a phase response curve from the viewpoint of obtaining a good perspective for designing and realizing different phase differences (gates).

The description of a complex behavior (including walk) caused by a chain of stimulus→response→stimulus→response made by Sherrington, founder of reflexology, is simplistic when it tells that the existence of a CPG that generates a rhythmic motion without requiring a stimulus is denied by actual proofs. For instance, it is said that a stick insect (seven joints) walks on such a principle and a CPG is modified by the inputs from the senses. While a state machine does not positively have any oscillators, it may be described by further roughly viewing the phase of oscillator, dividing it into a small number of regions and paying attention only to the top-down type motion program for a motion system that is driven only in a certain range of phase. Then, it may be safe to say that phase oscillators are arranged in the background of a state machine in a negative sense of the word. The theory of designing a robot according to the invention intrinsically lies on systematically reducing a state machine to phase oscillators and phase resetting.

Figure 43:
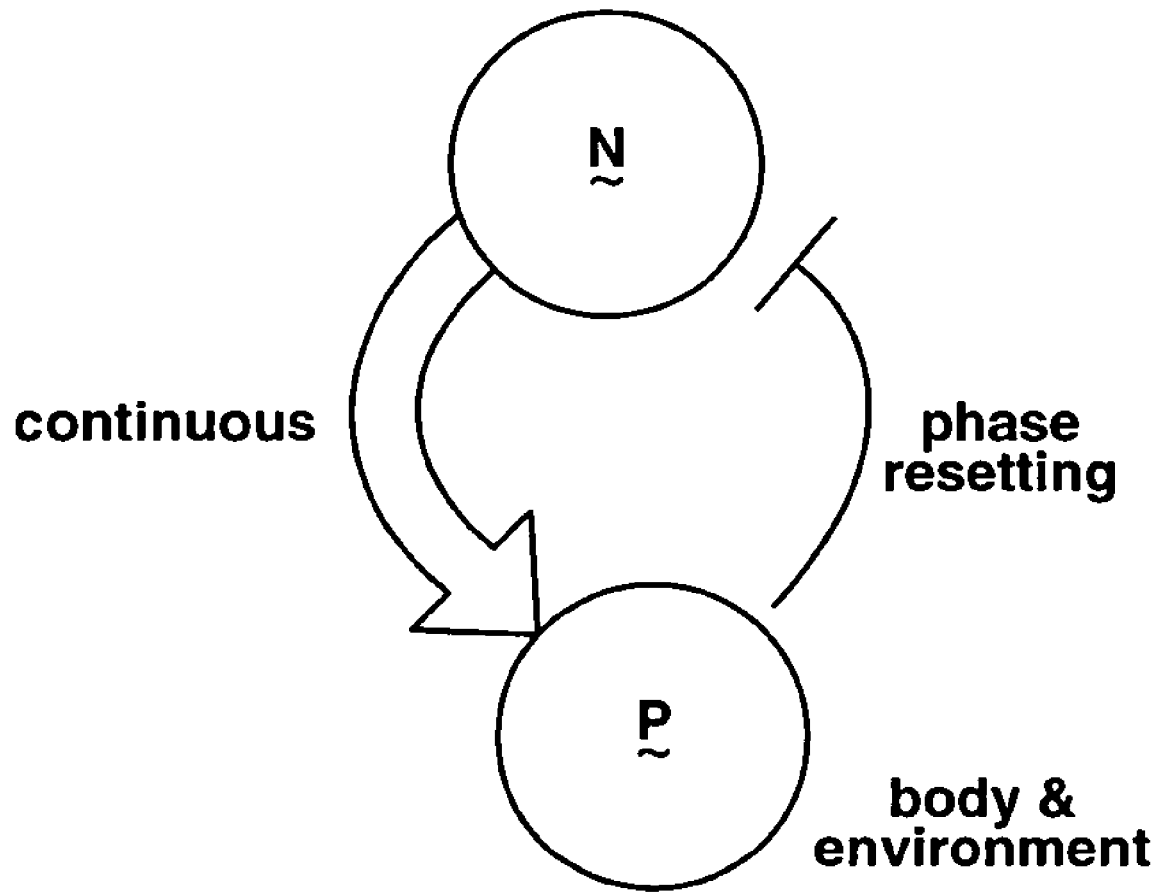
FIG. 43 is a schematic illustration of a phase oscillator and the mechanism of phase resetting.

FIG. 43 is a schematic illustration of a phase oscillator and the mechanism of phase resetting. In the illustrated instance, neural oscillator N that corresponds to a phase generator and physical oscillator P comprising sensors for detecting movable sections and their state quantities are extracted from a state machine, which may be a legged mobile robot. The neural oscillator N continuously supplies phase information Φ and/or control output U based on the phase information. On the other hand, the physical oscillator P supplies phase resetting information.

The inventors of the present invention are thinking of phase resetting for a phase generator by means of a continuous interaction or by approximating a certain continuous interaction. The reason for this is as follows. It can be argued that walk is realize by discrete phenomena including touch down, stance and swing. As far as hybrid control of discretely resetting the phases and continuously controlling trajectories, force and stiffness is concerned, it may be rational from the viewpoint of nonlinear dynamic system to apply rules of continuous control that are identical in terms of quality when topologically identical open or closed kinematics chains are involved and reset the phases (and hence a plurality of programs) discretely, paying attention to a discrete event (touch down).

Figure 44:
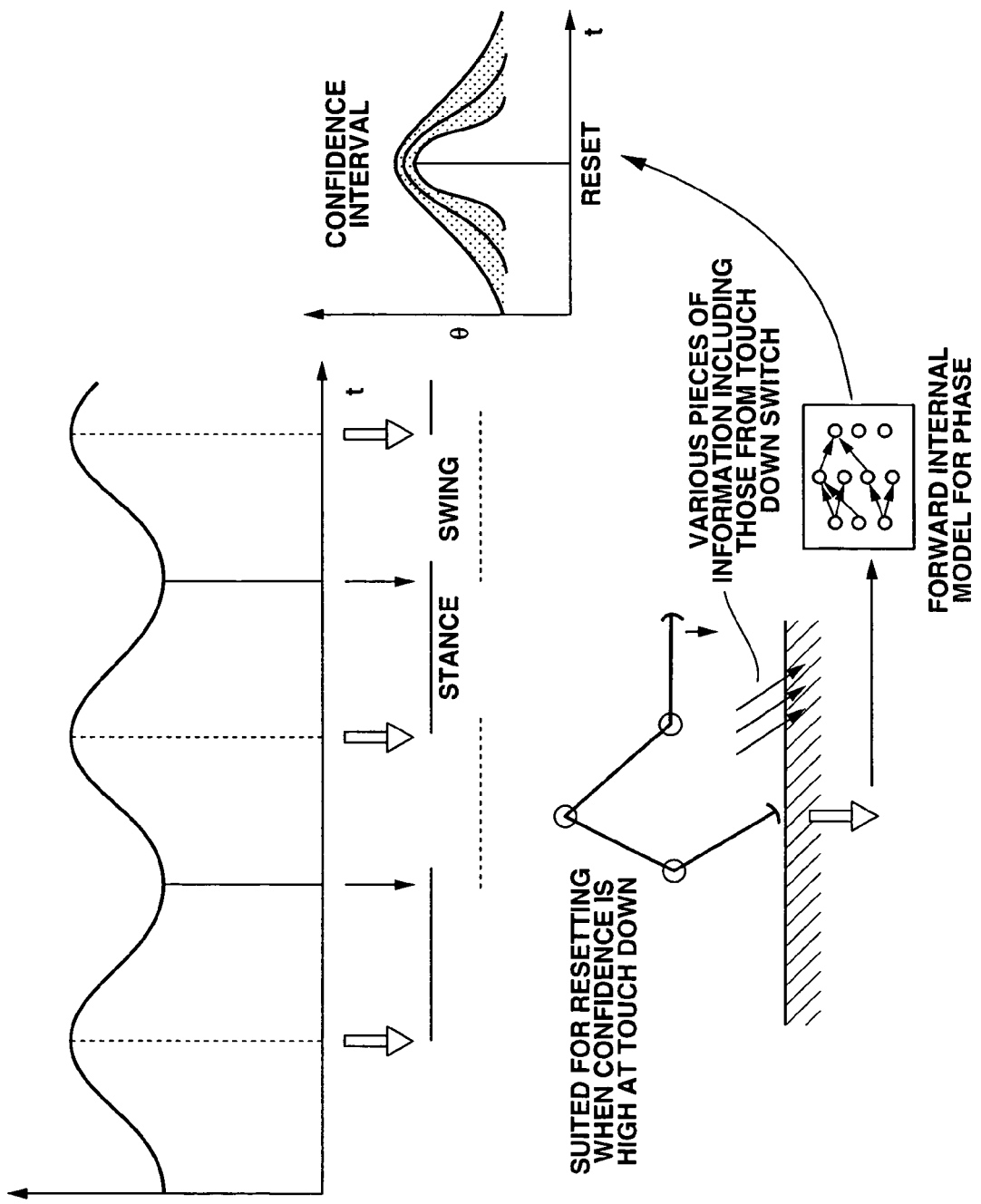
FIG. 44 is a schematic illustration of a mechanism for phase estimation that utilizes the switches on the soles of a two-legged mobile robot.

The phases of the legs are discretely estimated in a walking motion in such a way that the phase of the touch down of a leg is $\Phi=0$ and that of the touch down of the other leg is $\Phi=\pi$ by utilizing the switches on the soles as described above in B-2-2. FIG. 44 is a schematic illustration of a mechanism for phase estimation that utilizes the switches on the soles of a two-legged mobile robot. In the illustrated instance, the phases are reset each time when lift off or touch down is detected by one of the switches on the soles of the left and right legs. More specifically, the left and right legs alternately take stance and swing in a period and the period is repeated. Since information on touch down shows a higher degree of confidence than information on lift off, the former is more suitable for the timing of phase resetting.

However, it is not exquisitely accurate to estimate a discrete event (phase) only by means of the switches on the soles. In other words, the degree of confidence can be raised by estimating the phases by means of not only the switches on the soles but also other various state quantities. It is desirable to estimate the phases by means of a feed forward neural network, taking the degree of confidence into consideration, so that the phases may be reset when the degree of confidence is high and the situation is critical. It may be desirable that the small brain cerebellum has a phase estimater (forward model) and a phase resetter (reverse model).

Figure 45:
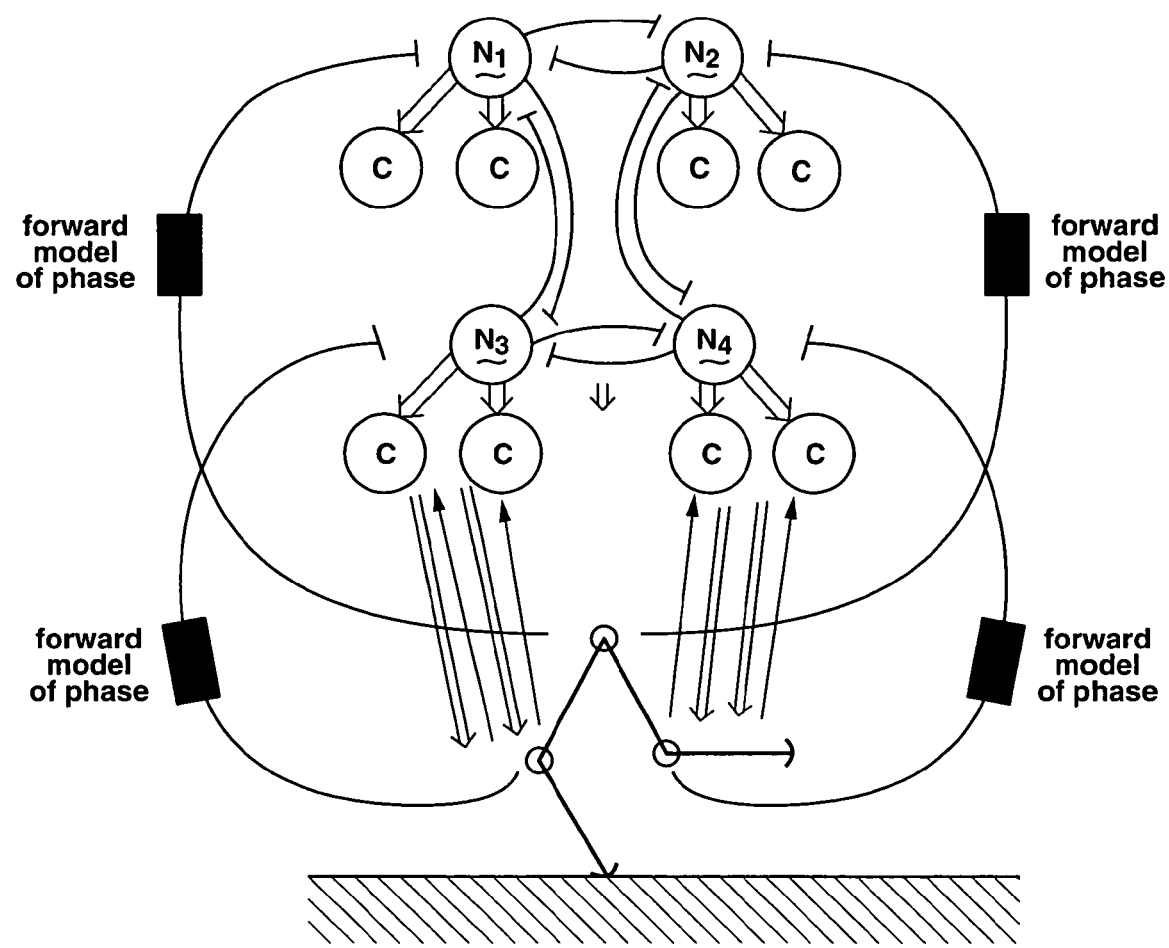
FIG. 45 is a schematic illustration of the mechanism of phase resetting by a continuous interaction.

FIG. 45 is a schematic illustration of the mechanism of phase resetting by a continuous interaction. A plurality of movable sections that show independent periodic motions are found from the machine body of the robot. Neural oscillators N1, N2, N3, N4 are defined as phase generators for each body member of the robot.

The phase generators N1, N2, N3, N4 output phase information to controllers C of a lower order that are physical oscillators. Then, the controllers C generate control information that is output to the corresponding movable sections according to the phase information.

In the illustrated control mechanism, each phase generator is provided with a phase feed forward model (i.e. phase estimator). Thus, as the state quantity of a movable section is detected, the phase or the angular frequency of the periodic motion of the movable section is estimated on the basis of the state quantity. Then, the estimated values are fed back to the phase generators N1, N2, N3, N4, which by turn updates the phase signals according to a predetermined updating rule, using the estimated phase or angular frequency.

The sequence of operation of the control mechanism illustrated in FIG. 44 will be described below.

(1) The neural oscillators N that operate as phase generator switch the controllers C of a lower order that control the operation of driving the movable sections.

(2) The phases of the neural oscillators N that operate as phase generators are reset according to the single phase (or several phases) of the movable sections of the physical oscillators.

(3) The phase generators are made to become synchronized with each other according to the behavior of the neural oscillators in the period-phase physical system by using a phase response curve. The phase response curve will be described in greater detail in the next section.

(4) A forward model for phase estimation is used for phase resetting.

B-2-5. Updating Rule of Phase Generators Using Phase Response Curve

The updating rule of the phase generators is reliably designed to produce a stable period solution in a form that can be intuitively understood with ease by using a phase response curve (PRC), or phase resetting curve.

A phase response curve shows the relationship between an external stimulus and the change in the phase of an oscillator as observed in rhythmical phenomena that gives rise to concordance in a living body (e.g., a cycle of sleep and wake, finger tapping of man). For example, if an external disturbance is applied to a pendulum in a periodic motion for a short period of time, the pendulum restores the original motion of the same period after the elapse of a long time if the external disturbance is not so significant. While the motion obtained as a result of convergence may have a period same as the period of the original motion before the external disturbance, there may arise a phase shift. A phase response curve (PRC) is a curve on a graph where the horizontal axis represents the timing of application of external disturbance and the vertical axis represents the produced phase shift (forward or backward).

Figure 46:
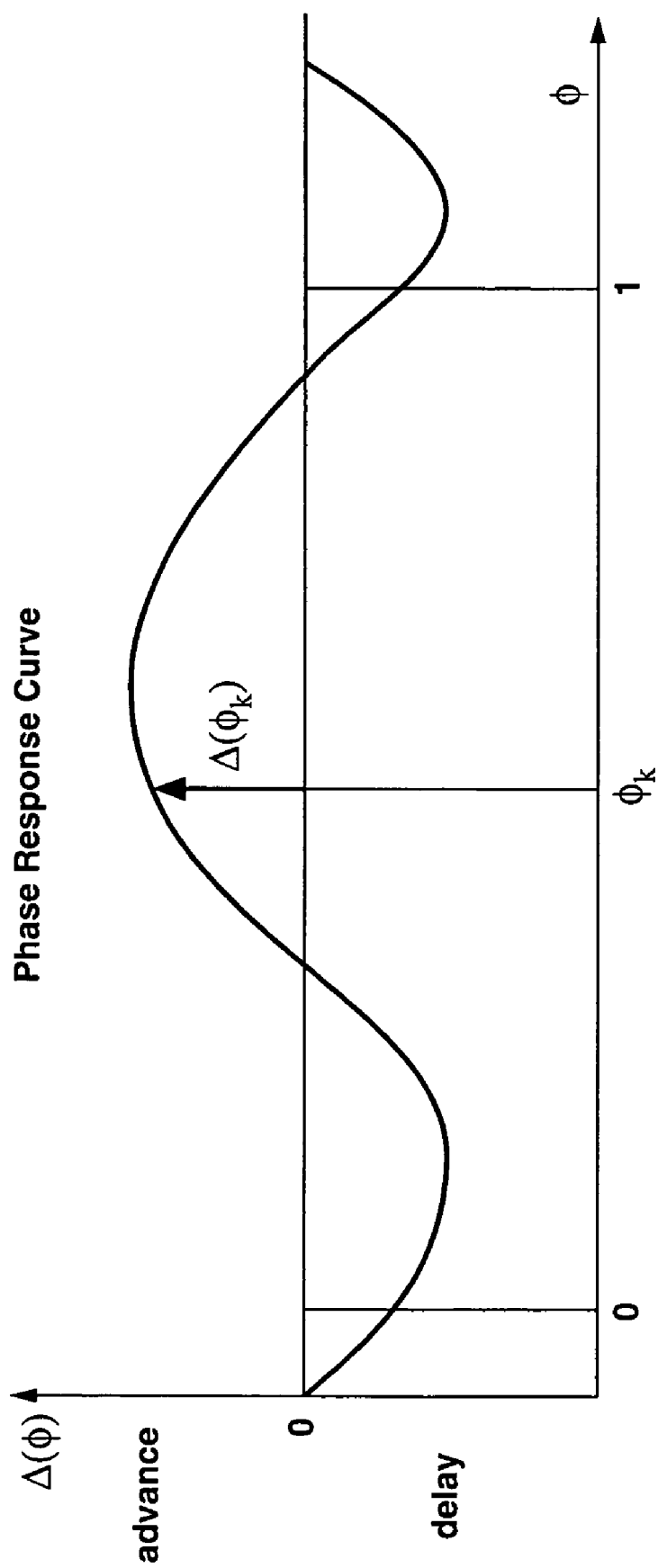
FIG. 46 shows a graph illustrating an exemplary phase response curve.

Let us consider about a phase response curve as shown in FIG. 46 as example. If the phase signal generated by the phase generator is Φk, a phase shift of ΔΦk arises when a signal is input from the phase estimator. Then, let us generate a periodic motion that is desirably in concordance with an external rhythm by designing such a phase reaction curve so as to effectively utilize the dynamics of the robot machine body. A framework of reinforcement learning can be used for designing such a PRC.

Assume here that the phase estimater generates discretely an output once per period. More specifically, it outputs a signal when the right leg of the robot touches down. Then, let us consider an updating rule for discretely carrying out a phase shift of ΔΦk, using the phase response curve. For the purpose of simplicity, it is assumed here that frequency ω is not updated. In other words, TP and TN respectively show constant values.

Figure 47:
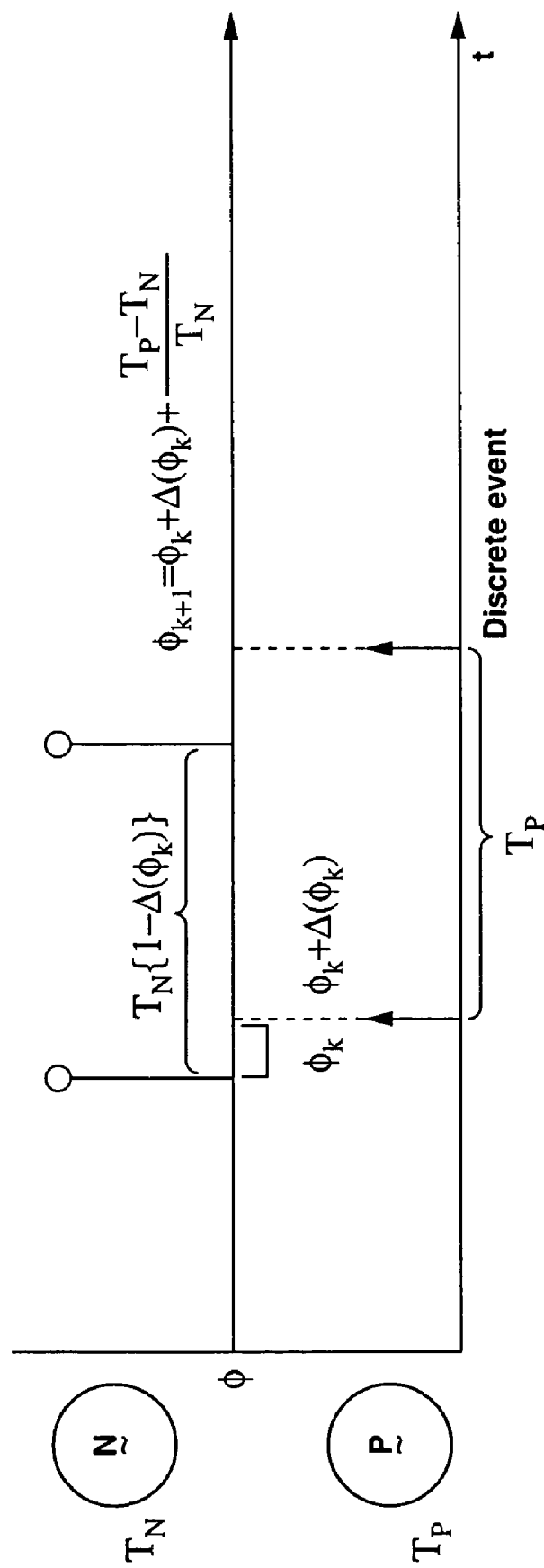
FIG. 47 is a schematic illustration of a differential equation of entrainment.

FIG. 47 is a schematic illustration of a differential equation of entrainment, where TN is the natural period of the phase generator and TP is the natural period of a movable section of the robot that does a periodic motion, while Φ is the phase of the neural oscillator that operates as phase generator, Δ(Φ) is the phase response curve of the phase generator (whose sign is positive when moving forward) and Φk is the phase of the neural oscillator when a pulse is generated by the physical oscillator at the time of the k-th sampling.

From FIG. 47 and formulas (1) and (2) below, the phase Φk+1 at the time when the phase estimater generates the next output on the new phase that is produced after the phase regulation, using the phase response curve PRC, is expressed by formula (3) below. It is essential for a stable periodic motion that the output of the phase generator and the input from the phase estimater shows a certain fixed phase relationship after the elapse of a sufficient time. Thus, Φk+1=Φk in the formula (3). Therefore, an equilibrium point is obtained as expressed by formula (4).

[formula 29]

Old phase $\phi_k$ (1)

New phase $\phi_k + \Delta(\phi_k)$ (2)

$$\phi_{k+1} = \phi_k + \Delta(\phi_k) + \frac{T_P - T_N}{T_N} \quad (3)$$

Equilibrium $\Delta(\phi_*) = \frac{T_N - T_P}{T_N}$ (4)

$T_N > T_P$: need phase advance $T_N < T_P$: need phase delay

Figure 48:
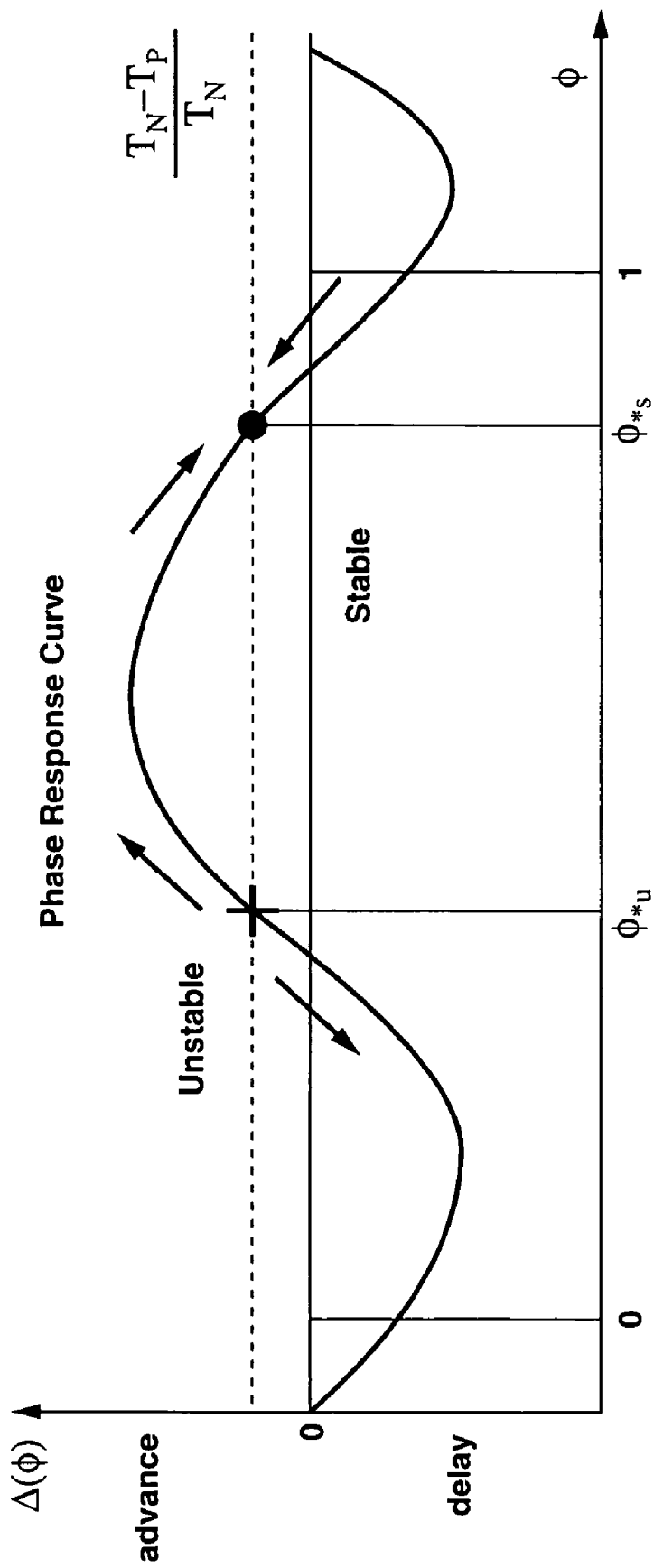
FIG. 48 is a schematic illustration of an operation of seeking for stability of a stationary solution on a phase response curve.

It is possible to graphically obtain stability of stationary solution by using a phase response curve PRC. FIG. 48 illustrates the upper formula (4) shown on a phase response curve. As illustrated, the points of intersection of the formula and the curve represent the phase shift after convergence. If the gradient of the phase response curve is negative, the points of intersection are points of stable equilibrium to indicate that a stationary periodic solution exists. If, on the other hand, the gradient of the phase response curve is positive, no stable solution exists because the phase diverges. Thus, it is possible to graphically guarantee the existence of a stationary periodic solution with ease by designing such a phase response curve.

Figure 49:
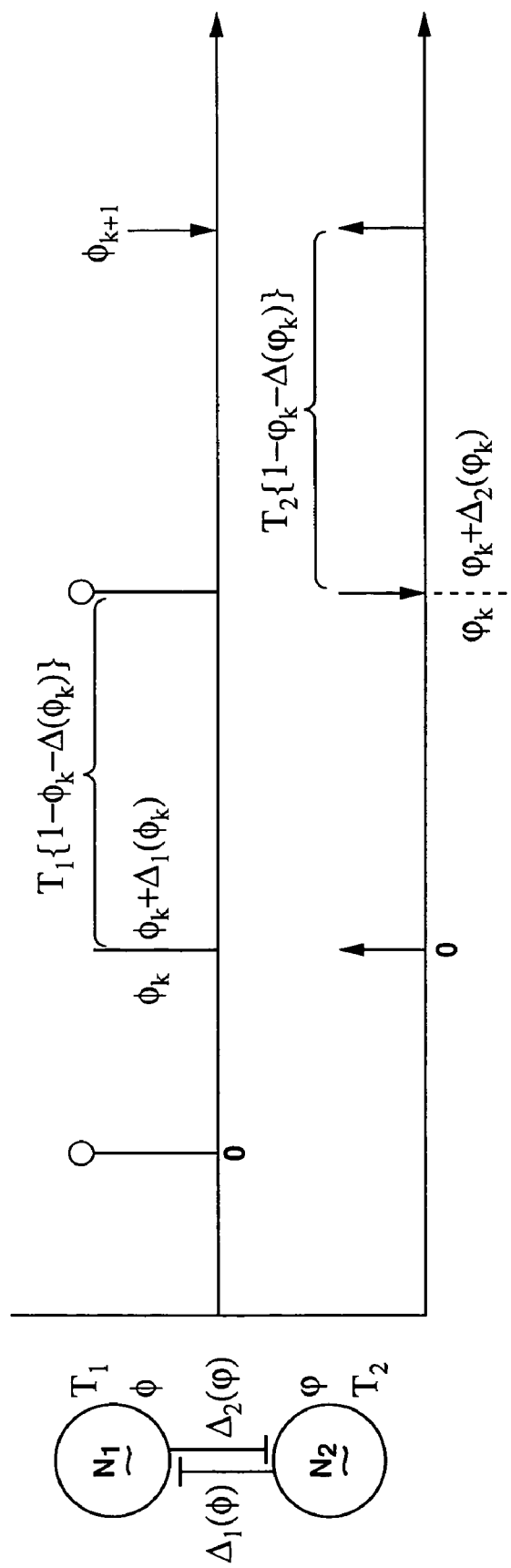
FIG. 49 is a schematic illustration of entrainment using mutually discrete signals between two phase generators.

A design using a phase response curve can be applied among a plurality of phase generators. FIG. 49 is a schematic illustration of entrainment using mutually discrete signals between two phase generators.

Figure 50:
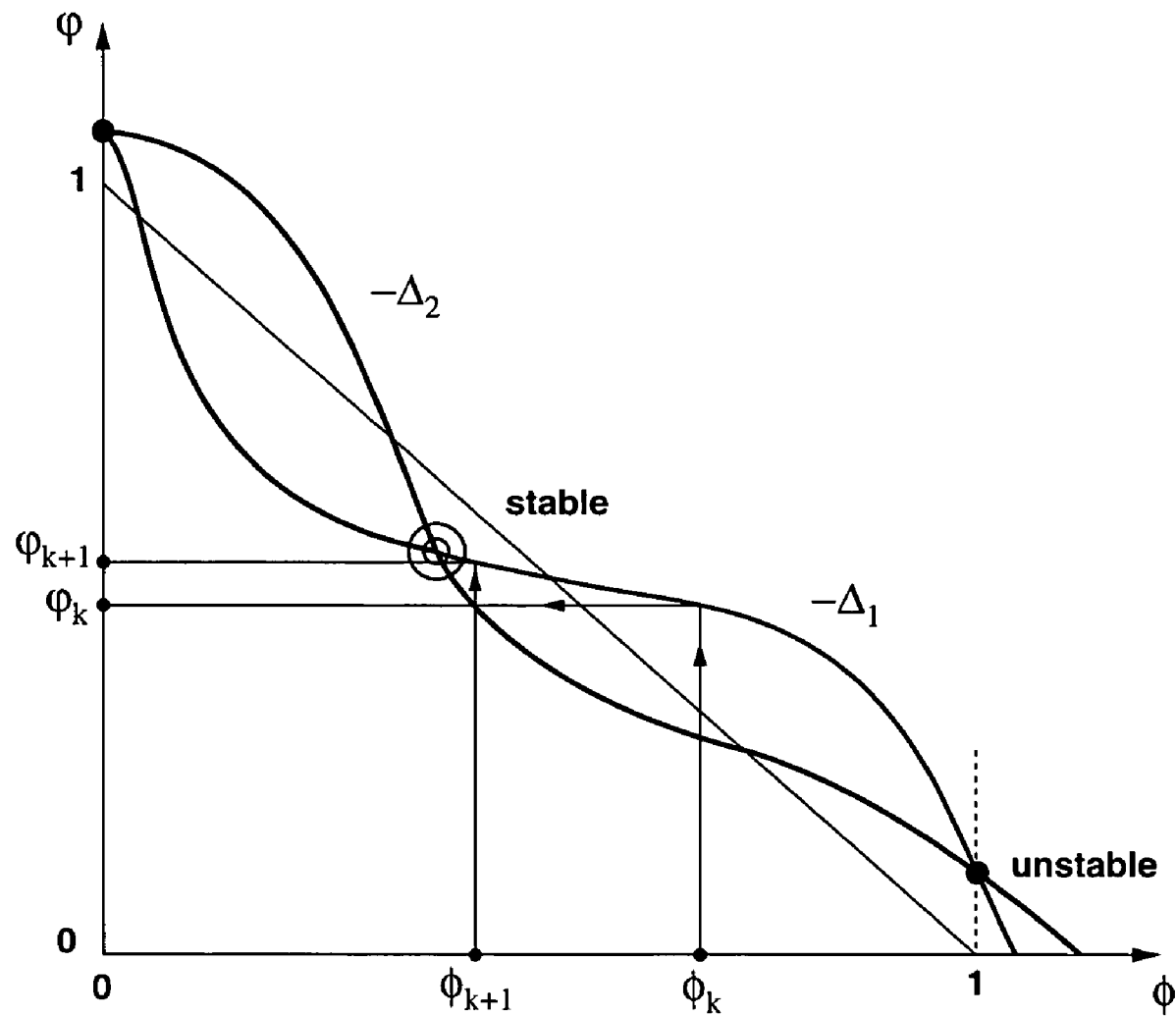
FIG. 50 shows a graph illustrating a differential equation of mutual entrainment.

The differential equation for mutual entrainment is expressed by formulas (5) through (7) below. FIG. 50 shows a graph illustrating the differential equation of mutual entrainment. As shown in FIG. 50, it is possible to graphically determine the stability. Thus, by using a phase response curve, it is possible to graphically realize with ease where the stationary periodic solution is found among a plurality of phase generators.

[formula 30]

$$\varphi_k = \frac{T_1}{T_2}(1 - \phi_k - \Delta_1(\phi_k)) \quad (5)$$

$$\varphi_{k+1} = \frac{T_1}{T_2}(1 - \phi_k - \Delta_2(\phi_k)) \quad (6)$$

$$\varphi_{k+1} = \frac{T_1}{T_2} - 1 + \phi_k + \Delta_1(\phi_k) - \frac{T_2}{T_1}\Delta_2\left[\frac{T_1}{T_2}\{1 - \phi_k - \Delta_1(\phi_k)\}\right] \quad (7)$$

B-2-6. Phase Estimater Using a Neural Network

In the above described embodiment, the switches on the soles are utilized to discretely estimate the phase of touch down of one of the legs to be Φ=0, for instance, and that of touch down of the other leg to be Φ=π in a walking motion. However, it is not exquisitely accurate to estimate a discrete event (phase) only by means of the switches on the soles. In other words, the degree of confidence can be raised by estimating the phases by means of not only the switches on the soles but also other various state quantities. In this section, a typical configuration of a phase estimater using a neural network will be described.

A neural network is configured so as to output estimated phase value Φ' on the basis of reading v of a sensor. As an example, take linear model expressed by the formula below.

$$\phi' = \sum_{i=1}^{n} w_i b_i(v) \qquad \text{[formula 31]}$$

In the above formula, wi is the load (parameter) of the i-th network and bi ( ) is the i-th basis function. For example, radial basis functions as expressed by the formula below may be used. In the formula below, n is the number of basis functions.

$$b_i(v) = \exp(-(v-v_i)^T D(v-v_i)) \qquad \text{[formula 32]}$$

In the formula above, vi is the central value of the i-th basis function and D is the parameter for determining the size of the basis function.

Now, let us consider a probability model realized by the normal distribution expressed by the formula below, using the output of a neural network.

$$P(\phi \mid v) = \frac{1}{\sqrt{2\pi\sigma^2}} \exp\left\{-\frac{(\phi-\phi')^2}{2\sigma^2}\right\} \qquad \text{[formula 33]}$$

In the formula above, σ2 represents variance. A probability model is obtained for the current phase by using the formula above. Thus, if both Φa<Φ<Φb and P(Φ|v)>a hold true, for instance, it is possible to switch a controller. In the above expressions, Φa and Φb represent phases for switching the controller and a represents a threshold value.

It is also possible to configure a phase estimator by using a probability model and through Bayes estimation. Firstly, as an example, the prior probability of phase is expressed by the normal distribution expressed by the formula below.

$$P(\phi) = \frac{1}{\sqrt{2\pi\sigma_0^2}} \exp\left\{-\frac{(\phi-\phi_0)^2}{2\sigma_0^2}\right\} \qquad \text{[formula 34]}$$

In the above formula, Φ0 is the average phase output from the phase output unit and σ2 is the variance thereof. Additionally, the probability model for the sensor reading that is predicted when a phase is given is expressed by the formula below.

$$P(v \mid \phi) = \frac{1}{(2\pi)^{d/2}|\Sigma|^{1/2}} \exp\left\{-\frac{1}{2}(v-v'(\phi))^T \Sigma^{-1}(v-v'(\phi))\right\} \qquad \text{[formula 35]}$$

In the above equation, v'(Φ) is the function for outputting the readings from the current phase and Σ is the covariance matrix of the readings. Then, the following equation is obtained by Bayes estimation.

$$P(\phi \mid v) = \frac{P(v \mid \phi)P(\phi)}{P(v)} \qquad \text{[formula 36]}$$

Thus, if both Φa <Φ<Φb and P(Φ|v)>a hold true, for instance, it is possible to switch a controller. In the above expressions, Φa and Φb represent phases for switching the controller and a represents a threshold value.

It is also possible to use a mixed distribution as a technique of expressing a more complex probability distribution.

B-3. Efficient Learning Algorithm for Biped Locomotion by Model-Based Reinforcement Learning A learning algorithm for biped robots will be described in this section in order to comprehend the walk learning mechanism of man and also realize an efficient walk by way of the process of the learning algorithm. While a walking motion can be expressed as a task for stepping forward for the next step without falling, it is often not easy to obtain a teacher trajectory for generating a stable walk. Therefore, reinforcement learning is used as framework of learning in this embodiment.

B-3-1. Biped Robot

Figure 51:
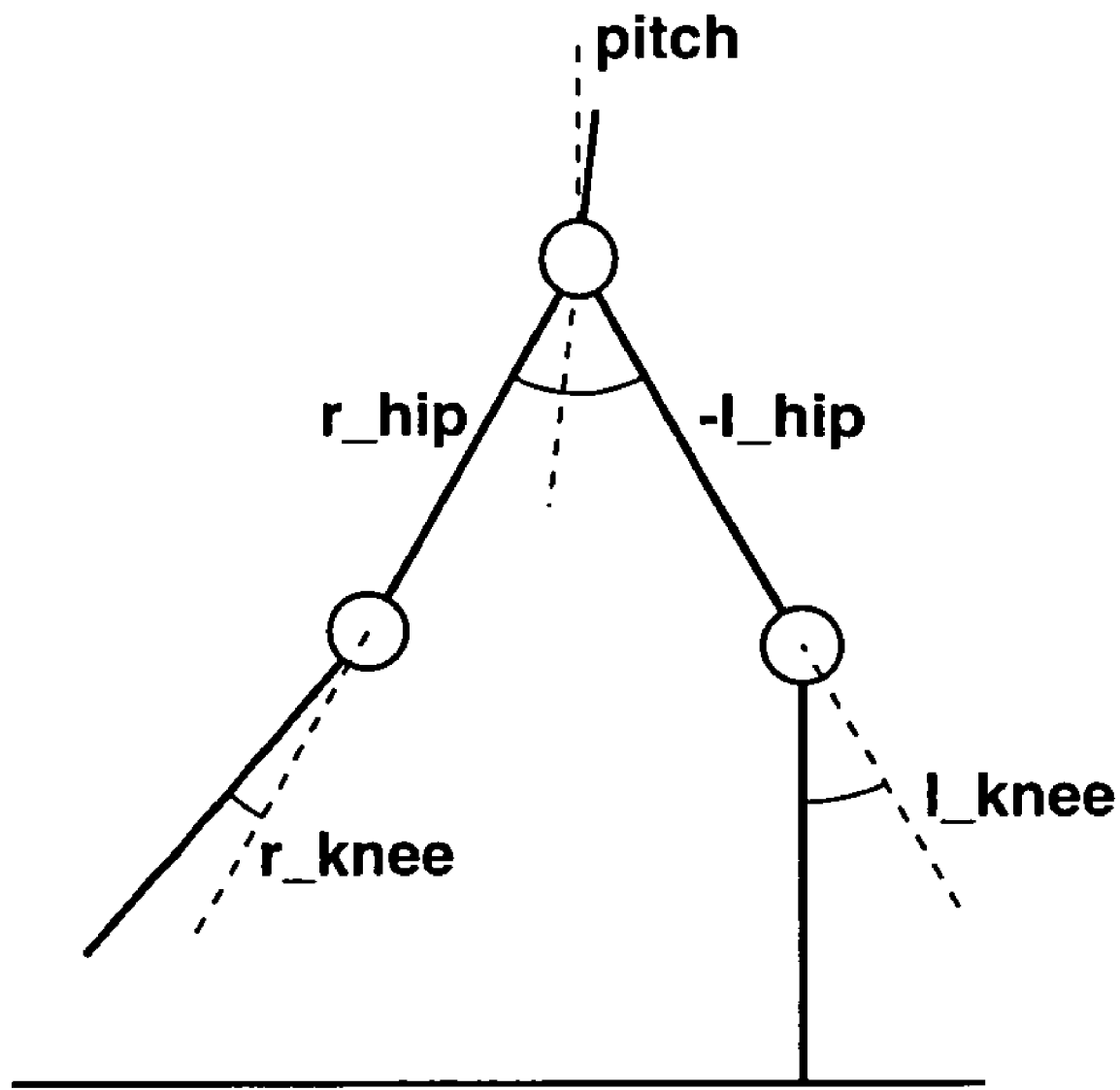
FIG. 51 is a schematic illustration of a two-legged mobile robot with five links constrained to a two-dimensional plane by a support rod.

A 5-link biped robot that is constrained to a two-dimensional plane by means of support rods will be handled in this section (see FIG. 51). The developed real robot has an enhanced level of back drivability as a result of using direct drive type motors as actuators. The identified physical parameters of the robot are listed in the table below.

TABLE 4

|  | link1 | link2 | link3 | link4 | link5 |
| --- | --- | --- | --- | --- | --- |
| mass [kg] | 0.05 | 0.43 | 1.0 | 0.43 | 0.05 |
| length [m] | 0.2 | 0.2 | 0.01 | 0.2 | 0.2 |
| inertia ($\times 10^{-4}$ [kg · m]) | 1.75 | 4.29 | 4.33 | 4.29 | 1.75 |

For handling the issue of biped locomotion, the contact/collision between the floor and the sole will be a problem. The collision model that was used in the developed simulator is expressed by the formula below.

$$F_x = k_x(x_g - x) - b_x \dot{x},\ F_z = k_z(z_g - z) - b_z \dot{z}\ (\text{if } z < z_g)$$

$$F_x = 0,\ F_z = 0\ (\text{if } z \geq z_g) \qquad \text{[formula 37]}$$

In the above formula, Fx and Fz respectively represent the reaction force in the horizontal direction and the reaction force in the vertical direction of the floor and x, z respectively represent the horizontal position and the vertical position of the toe, while xg represents the touch down point of the toe and zg represents the height of the toe. A spring-damper model is used to express the reaction force of the floor. A position gain of kx=3,000 and a velocity gain of bx=30 are used for the horizontal direction, whereas a position gain of kz=500 and a velocity gain of bz=100 are used for the vertical direction. For a horizontal ground contact model, xg=x is used when Fx>cFz, where c=1.0 is the coefficient of static friction.

B-3-2. Realization of Biped Locomotion by a Real Robot Using a State Machine

Techniques that provide a basis for the leaning algorithm will be discussed in this section. As the first attempt, a method using a state machine [29] that has already obtained excellent results as technique for building a walk controller is applied to a real robot (see FIG. 51).

B-3-2-1. State Transition Diagram

Figure 52:
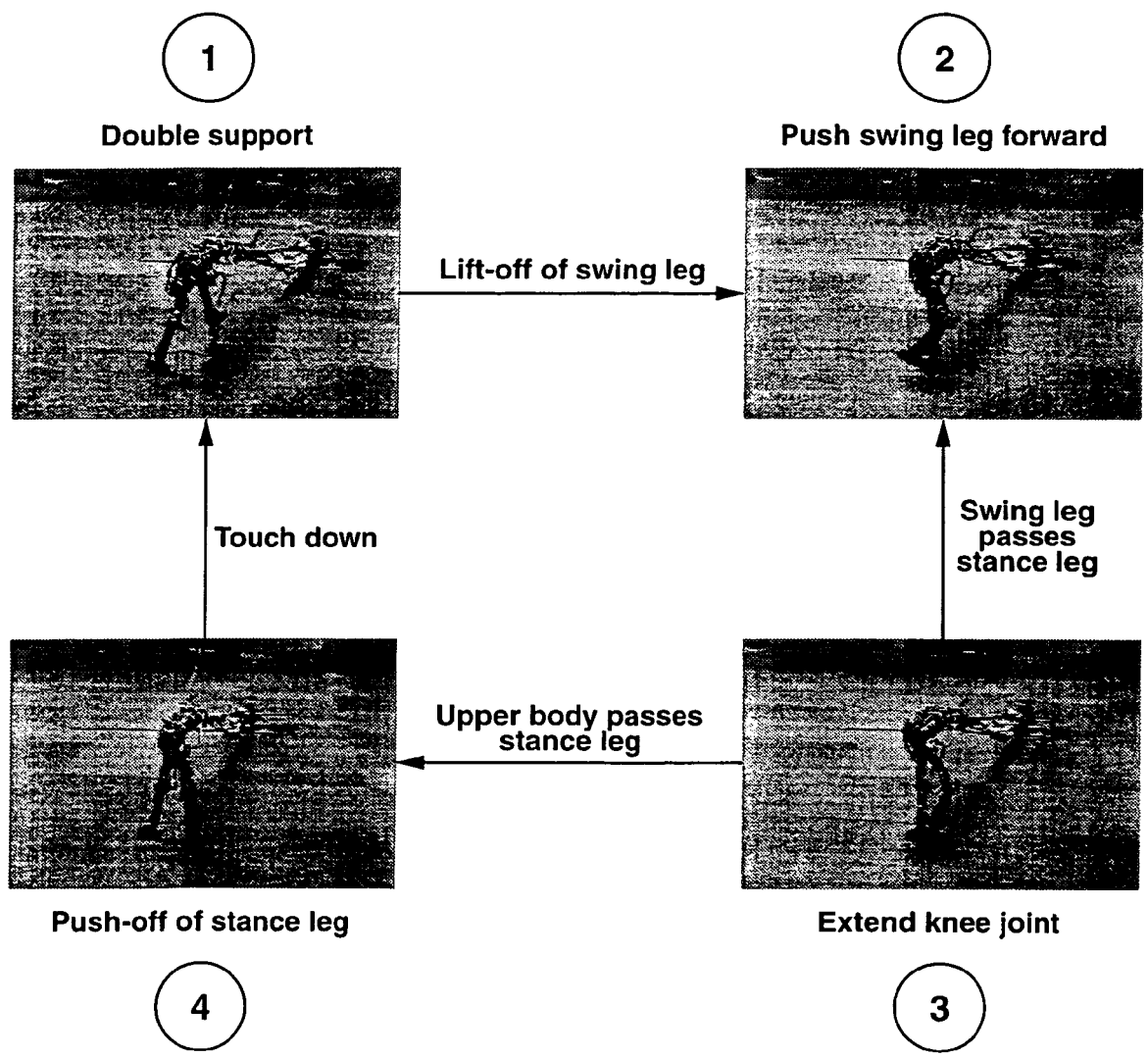
FIG. 52 is a schematic illustration of state transition of the real robot shown in FIG. 51.

For a method using a state machine, it is necessary to define states and conditions for transition. Definitions of states and conditions are experimentally provided by using simulations and a real hardware. FIG. 52 is a schematic illustration of state transition of a real robot.

Referring to FIG. 52, State 1 is a double leg support state. As the swing leg is lifted from the floor, transition occurs to produce State 2. State 2 is a state where the swing leg is swung forward. As the toe of the swing leg passes by the toe of the support leg, transition occurs to produce State 3. State 3 is a state where the swing leg is stretched. As the upper body passes over the support leg, transition occurs to produce State 4. State 4 is a state where the knee of the slightly bent support leg is stretched to kick the floor so as to inject energy. As the swing leg touches down, transition occurs to return to State 1. In this way, the left and right legs alternately operate as support leg and swing leg.

B-3-2-2. Results of Experiment

Figure 53:
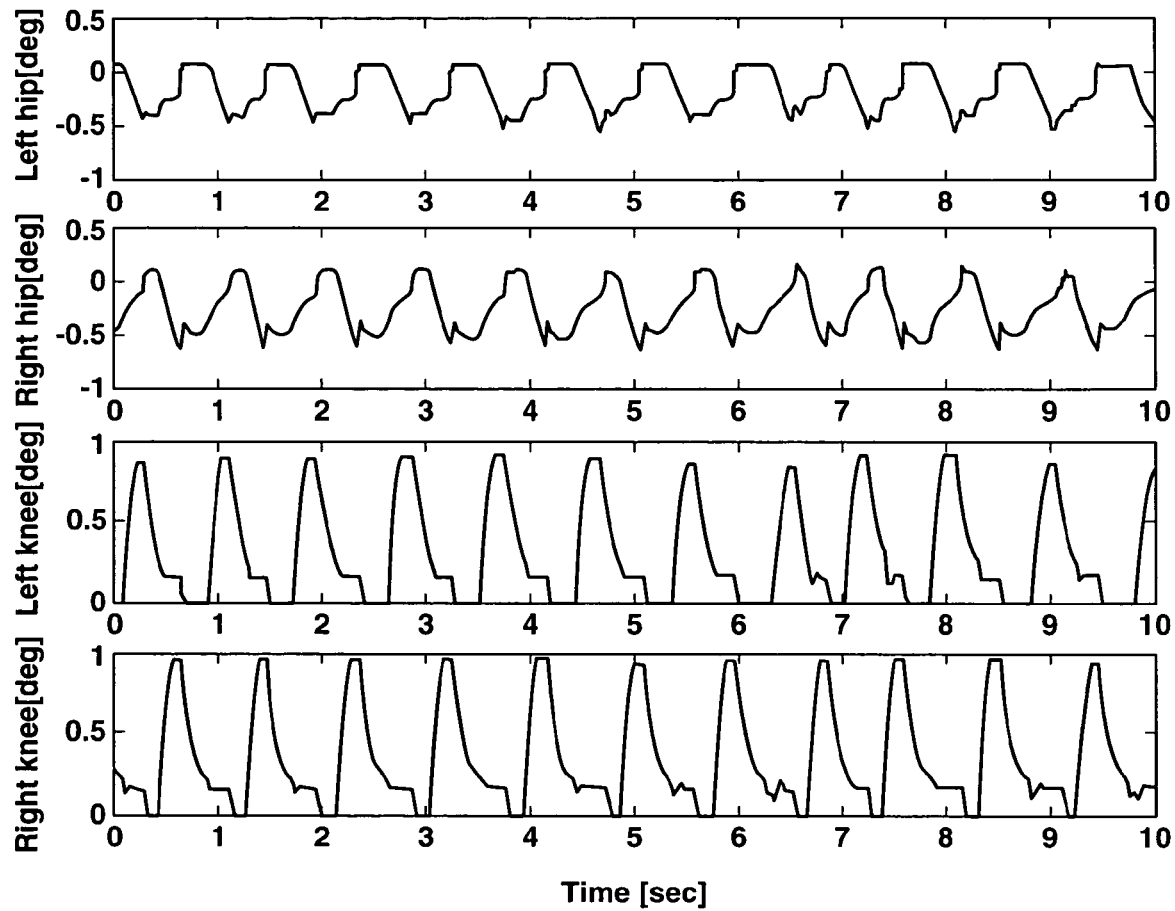
FIG. 53 shows graphs illustrating joint angle trajectories in a walk obtained by an experiment.
Figure 54:
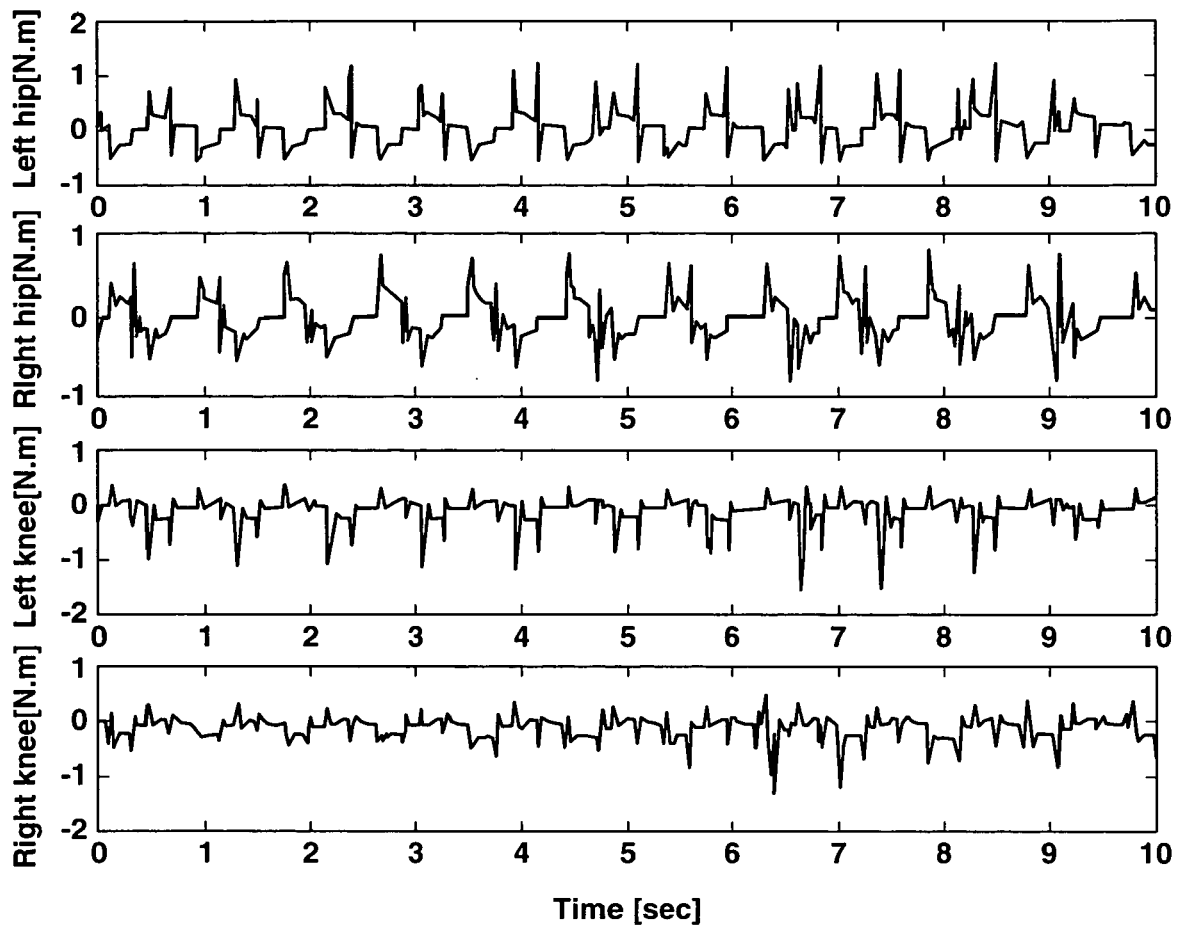
FIG. 54 shows graphs illustrating output torque trajectories obtained by an experiment.
Figure 55:
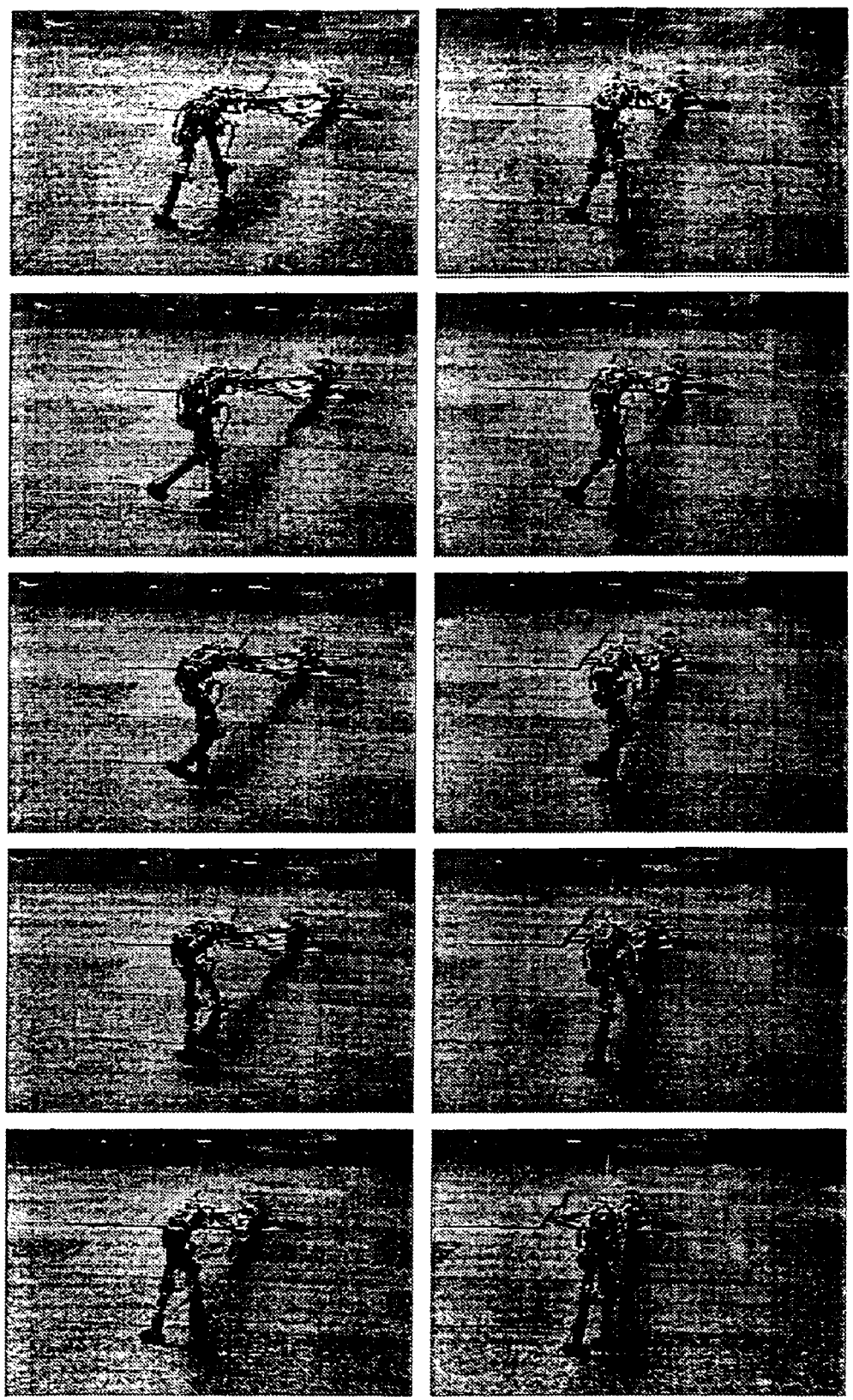
FIG. 55 is a schematic illustration of an ultimately obtained recorded walk pattern.

FIG. 53 shows graphs illustrating joint angle trajectories in a walk obtained by an experiment and FIG. 54 shows graphs illustrating output torque trajectories obtained by the experiment. FIG. 55 is a schematic illustration of the recorded walk pattern that is obtained by using a real hardware (walk pattern of a real robot, (left column): the left leg is the support leg, (right column); the right leg is the support leg, the walk progresses from above to down).

B-3-3. Estimation of Walk Period

A dynamic biped locomotion using a state machine is described in the immediately preceding section. However, a state machine using the same parameters may not be able to deal with changes in the environment. Adaptability to the environment of a walk controller will be discussed in this section.

FIG. 56 is a schematic illustration of an animal experiment using a cat. The left side illustration of FIG. 56 shows a walk adaptation experiment of a cat. Only the left forward treadmill can change its speed. The right illustration of FIG. 56 shows a model of cerebellum and CPG. In the illustration, CF denotes the climbing fiber. The CF receives feedback from the CPG. The experiment suggests that the cerebellum participates in altering the parameters of the central pattern generator (CPG) [30]. It is believed that the learning of the brain is generally a supervised learning, using error signals transmitted by the climbing fiber [31]. There is a report that firing frequency of the climbing fiber remarkably increases in an adaptation experiment that requires alterations to the CPG parameters [30]. In view of the above knowledge, it may be safe to say that the subject is getting some sort of error signals for altering the CPG parameters through interactions of the walking subject and the surroundings.

While it is not clear what error signals are actually involved, the inventors of the present invention came to an idea of detecting errors by way of the walk period. Let us make the walk period of the walk trajectory generator adapt to the dynamic system of the subject by using information from the surroundings. The angular frequency $\omega^*$ for realizing the target walk period is led from the period that is required for a real walk to obtain the formula below.

$$\omega^* = \frac{\pi}{T} \quad \text{[formula 38]}$$

Thus, the error signal is expressed by the formula below.

$$E = \omega^* - \hat{\omega}_n \quad \text{[formula 39]}$$

In the formula above, $\hat{\omega}_n$ is the angular frequency estimated for the n-th step. Thus, the updating rule of angular frequency is expressed by the formula below.

$$\hat{\omega}_{n+1} = \hat{\omega}_n + K(\omega^* - \hat{\omega}) \quad \text{[formula 40]}$$

Figure 57:
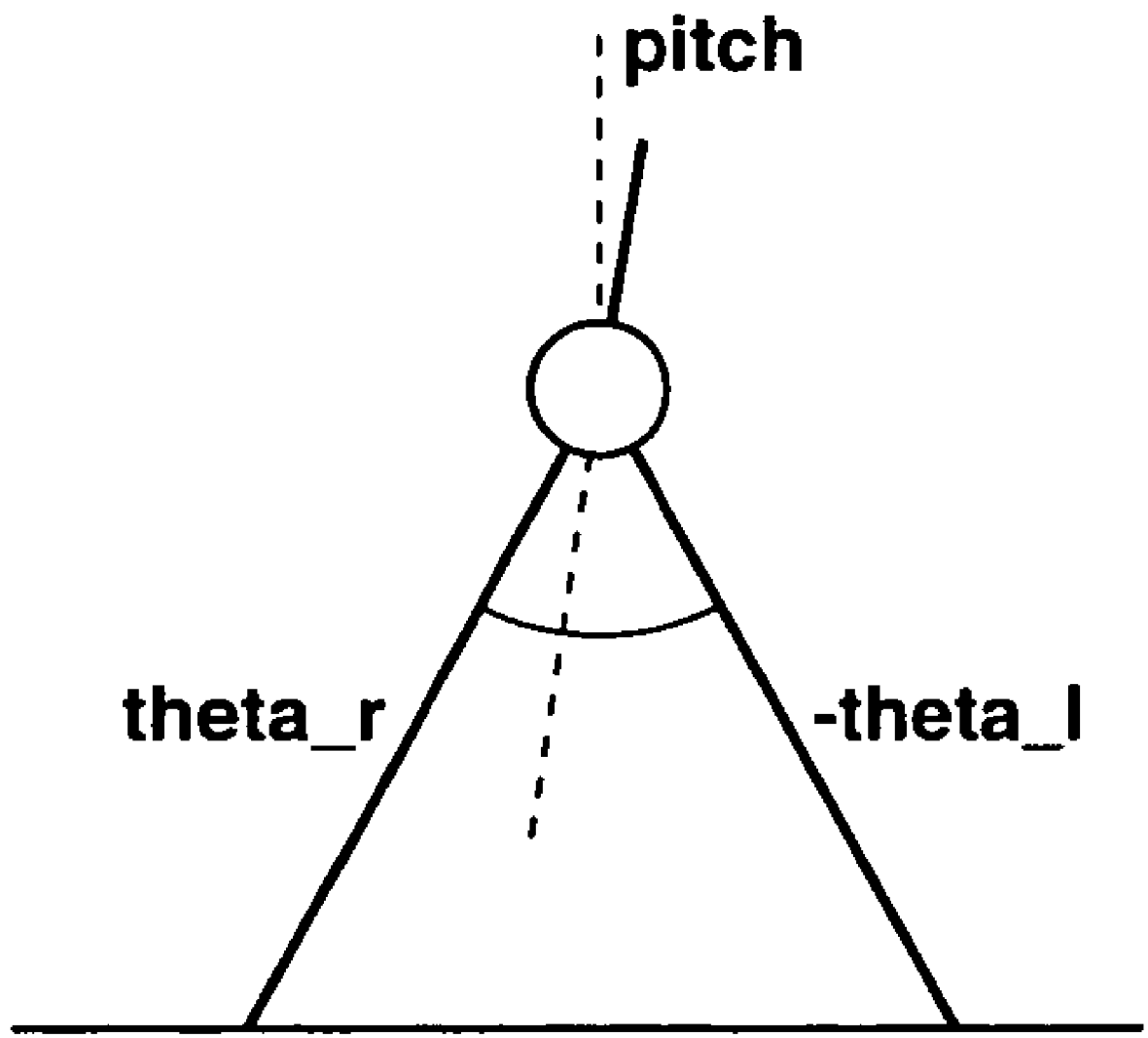
FIG. 57 is a schematic illustration of a mobile robot model with a simple 3-link configuration.

A biped robot model with a simple 3-link configuration as shown in FIG. 57 is used to verify the above described technique. The employed controller is made to follow a periodic target trajectory as expressed by the formula below.

$$\tau_l = k(\alpha \sin \phi - \theta_l) - b\dot{\theta}_l$$

$$\tau_r = k(-\alpha \sin \phi - \theta_r) - b\dot{\theta}_r \quad \text{[formula 41]}$$

In the formula above, $\tau l$ and $\tau r$ are respectively the torque applied to the left leg and the torque applied to the right leg and k=5.0 and b=0.1 are respectively the position gain and the velocity gain, while $\theta l$ and $\theta r$ are respectively the angle of the left leg and that of the right leg. The estimated current phase is expressed by $\Phi = \hat{\omega}(\text{hat}) t$, where t is the current clock time.

B-3-3-1. Results of Simulation

Firstly, an experiment was conducted by simulation for a case where the walk period was not estimated. Appropriate initial conditions (initial speed of 0.2 [m/s] in the moving direction) were given and initial values (T=0.42 [sec], $\omega 0$=15 [rad/sec]) were selected for a walk period that is good for a walk on a flat floor (angle of gradient=0). When the robot was made to walk on an uphill (3 degrees) and then on a downhill (4 degrees), it stumbled and fell before it walked by 10 steps on each slope.

When, on the other hand, the walk period was estimated, the robot could continue walking on the above described slopes. Note, however, the above angles of gradient indicate the limits for the robot to continue walking when the walk period is estimated. When the angles of gradient exceed the above respective limits, the robot cannot deal with the slopes only by estimating the walk period.

B-3-4. Acquisition of Walking Motion by Using Reinforcement Learning

From the above, it will be seen that a stable walk can be obtained by making the periodic walk trajectory match the timing of the dynamic system of the environment. However, there is no means for modifying the walk trajectory. A method of learning a trajectory that makes a robot become able to walk by using a framework of reinforcement learning will be discussed in this section for an occasion where the robot cannot walk stably with an initially given walk trajectory. A framework similar to that of the state machine described in B-3-2 is used for the model proposed here. Additionally, since the conditions for transition are given in terms of phase, the method of estimating the walk period described in the immediately preceding section is also applicable.

Figure 58:
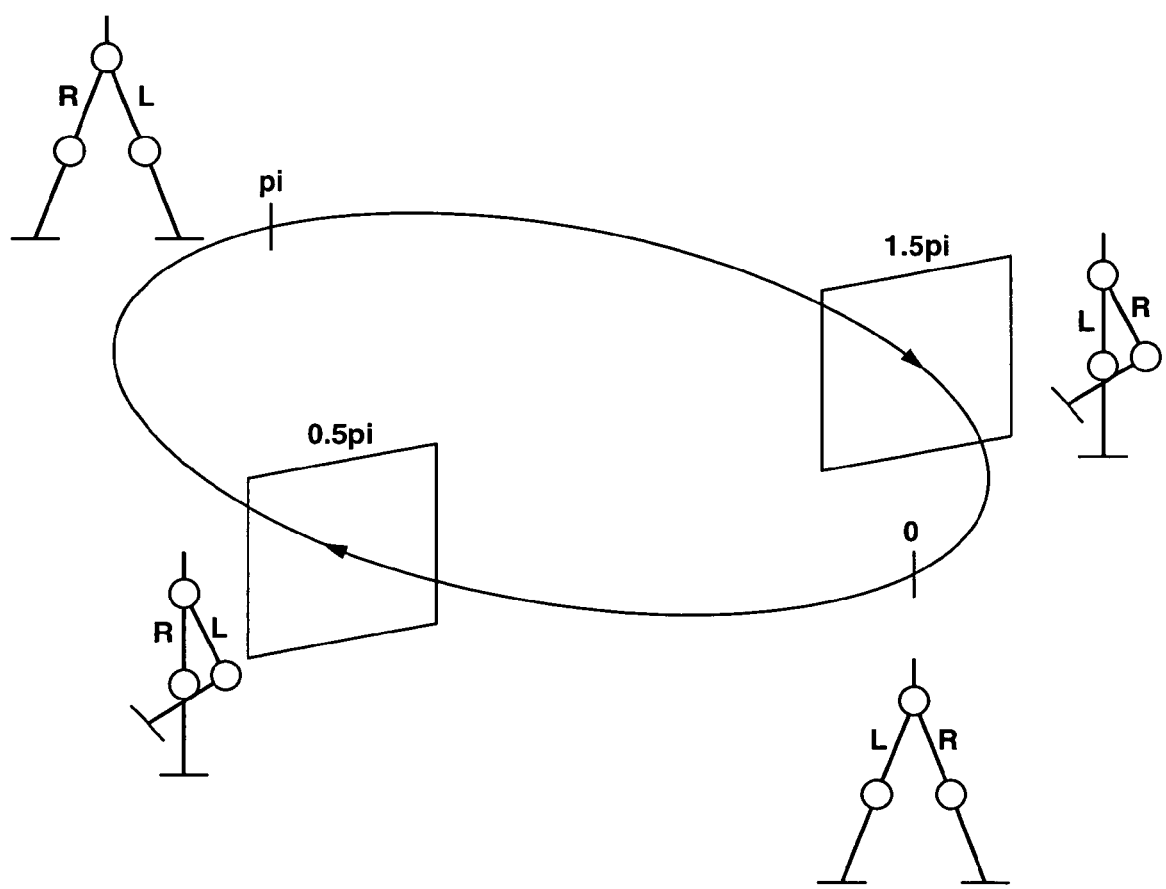
FIG. 58 is a schematic illustration of a walk trajectory generation model.

With the technique proposed in this section, parameter updating and behavior decision are realized on two poincare sections (on phases $\Phi = \pi/2$, $\Phi = 3\pi/2$) on the walk trajectory. As shown in FIG. 58, the walk trajectory is expressed by means of four intermediate attitudes (routing points) (only parameter updating and behavior selection are realized on the poincare cross sections at phase $\Phi = \pi/2$, $\Phi = 3\pi/2$). However, it should be noted that it is only necessary to determine two intermediate attitudes because of lateral symmetry. This framework indicates that the conditions of state transition of the state machine is determined by means of phase (state transition is made to take place at phases $\Phi = 0$, $\Phi = \pi/2$, $\Phi = \pi$ and $\Phi = 3\pi/2$ as shown in FIG. 58). A technique of using the output of Matsuoka's oscillator [2] for the condition of state transition is also proposed as similar framework and succeeded in an application to quadruped robots [32]. The proposed technique may be regarded as trajectory generating method using four intermediate attitudes as routing points [33].

Figure 59:
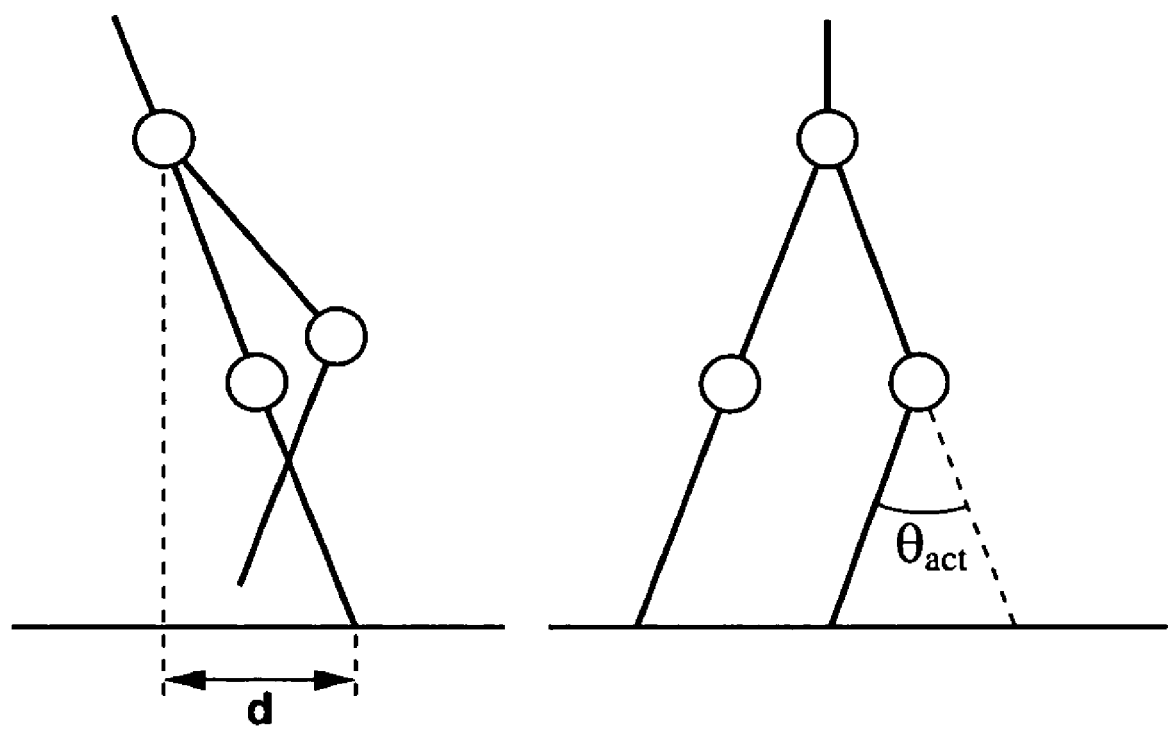
FIG. 59 is a schematic illustration of a definition of a state for learning (left) and a definition of behavior (right)

Now, a learning technique will be designed by using the model. The state of the input x to the learning organ is made to include the displacement of the upper body from the toe of the support leg and the acceleration component. FIG. 59 is a schematic illustration of a definition of a state for learning (left) and a definition of behavior (right). In short, an expression of a state that corresponds to an inverted pendulum that uses the support leg as support point is used here. As shown in FIG. 59, the output of the learning organ is the target angle of knee joint of the swing leg that corresponds to selection of the touch down point of the swing leg.

B-3-4-1. Model-Based Reinforcement Learning Method

Reinforcement learning using a model [34, 35] will be briefly described in this section. If a model of the object of control is already known, it can be used for reinforcement learning. However, it is assumed here that such a model is not known. Then, it is necessary to learn a model of the object of control. Thus, firstly a method of leaning a model will be described here.

Model Learning:

A model of the object of control can be obtained within a framework of supervised learning. Learning a dynamics model by using the technique of this embodiment means acquiring a mapped state x from phase $\pi/2$ to phase $3\pi/2$ (and also from phase $\phi=3\pi/2$ to phase $\Phi=\pi/2$ because of symmetry). Discrete time dynamics is expressed in a manner as shown below. Let us consider about approximation using a function approximater.

$$x_{\frac{3\pi}{2}} = f(x_{\frac{\pi}{2}}, u_{\frac{\pi}{2}}) \qquad \text{[formula 42]}$$

In other words, a function approximater having parameter m that is expressed by the formula below is employed to estimate the dynamics. A state at a discrete time as shown below can be used for a training signal.

$$\hat{f}(x_{\frac{\pi}{2}}, u_{\frac{\pi}{2}}) = \hat{f}(x_{\frac{\pi}{2}}, u_{\frac{\pi}{2}}; m) \qquad \text{[formula 43]}$$

Leaning a Value Function:

The objective of reinforcement learning is to acquire a behavior rule that maximizes (or minimizes) the sum of the rewards (or punishments) received at respective times by way of a series of behaviors. In other words, if the reward received at time T is r(T), the behavior rule is updated so as to maximize the expected value (referred to as value function) of the accumulated reward defined by the formula below, where $\gamma$ ($0 \leq \gamma \leq 1$) represents the discount rate.

$$V(x(T))=E[r(T+1)+\gamma r(T+2)+\gamma^2 r(T+3)+ \ldots ] \qquad \text{[formula 44]}$$

The problem here is how to estimate the value function by way of leaning and update the behavior rule by using it. Let us consider here about approximating the value function by means of a function approximater that uses a continuous function, using the formula blow.

$$\hat{V}(x)=\hat{V}(x; v) \qquad \text{[formula 45]}$$

In the above formula, v represents the parameter vector of the function approximater. The deviation from the relationship between the reward and the value function that satisfies the above formula [formula 44] is expressed by the formula below and referred to as temporal difference error (TD error).

$$\delta(T)=r(T+1)+\gamma \hat{V}(T+1)-\hat{V}(T) \qquad \text{[formula 46]}$$

The value function is updated in a manner as expressed by the formula below, using the above error. Note, however, that $\beta=0.2$ is the learning rate, which has to be defined as parameter.

$$\hat{V}(x(T)) \leftarrow \hat{V}(x(T))+\beta \delta(T) \qquad \text{[formula 47]}$$

Learning Behavior Rule:

The estimated model and the value function are used to update the behavior rule. The procedure for updating the behavior rule is shown below.

(1) Estimate the state at the next clock time (phase) by using the current behavior rule and the estimated model.
(2) Compute the gradient $\partial V/\partial x$ of the value function in the state at the next clock time (phase).
(3) Compute the gradient $\partial f/\partial u$ for the input of the model in the state at the next clock time (phase).
(4) While it is desirable to update the behavior rule so as to allow a transition of state to the gradient $\partial V/\partial x$ of the value function to take place, it is not possible to allow such a transition to take place within a discrete time of a step by a control input. Therefore, a mapping operation is performed in a direction that allows the control input to do so by means of the gradient $\partial f/\partial u$ for the input of the model. In other words, update the behavior rule in the direction of a $\partial V/\partial x \cdot \partial f/\partial u$.

$$u(x(T)) \leftarrow u(x(T)) + \alpha \frac{\partial V}{\partial x} \frac{\partial f}{\partial u} \qquad \text{[formula 48]}$$

In the above formula, $\alpha=0.2$ is the learning rate, which has to be defined as parameter.

As function approximater, receptive field weighted regression (RFWR) [23] is used.

Results of Experiment:

The above-described technique was used for a 5-link model as shown in FIG. 51 and verified by means of simulation. However, a target trajectory was prepared separately for an initial step.

Figure 60:
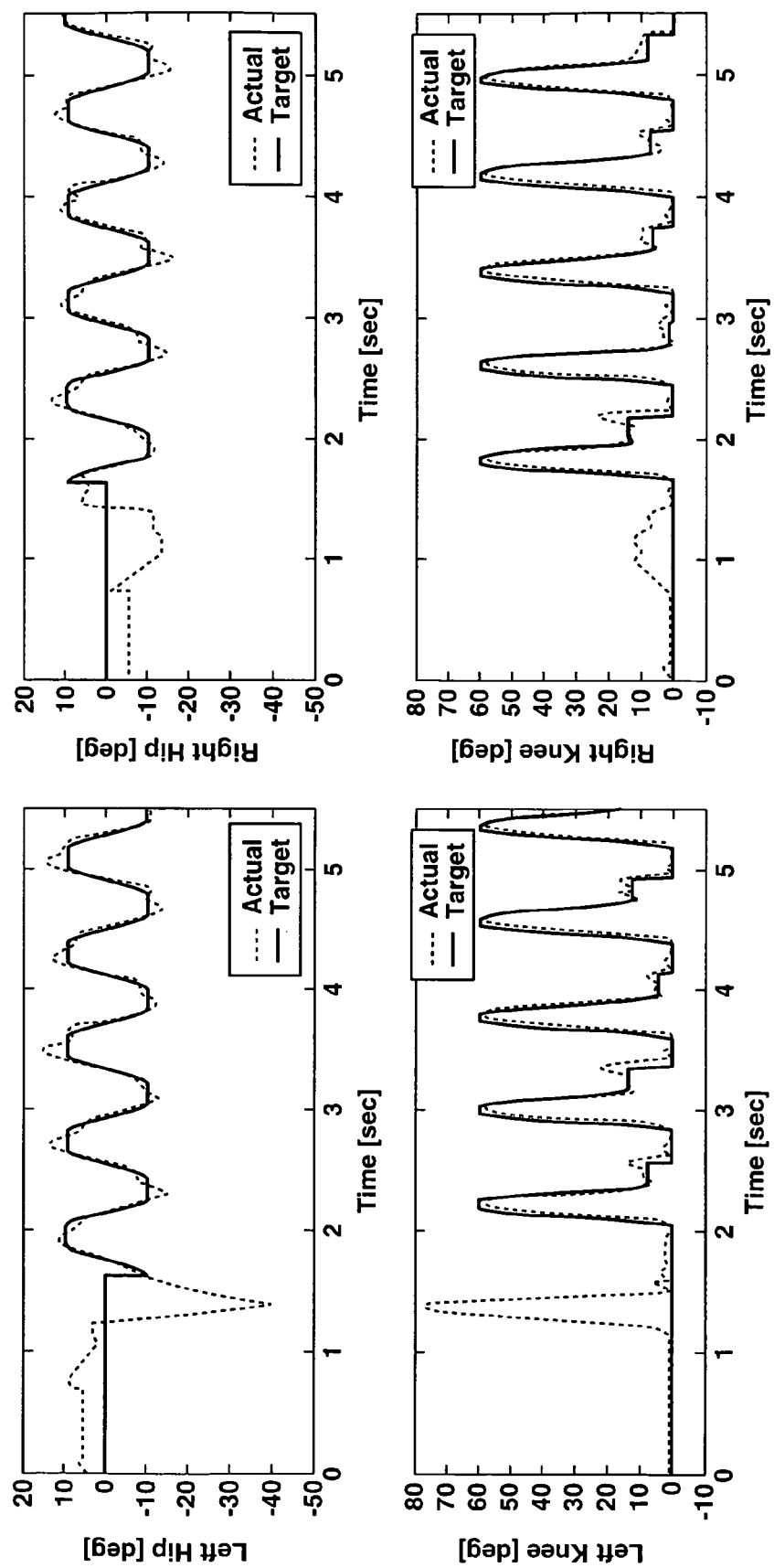
FIG. 60 shows graphs illustrating exemplary walk trajectories during a learning session (25th try)
Figure 61:
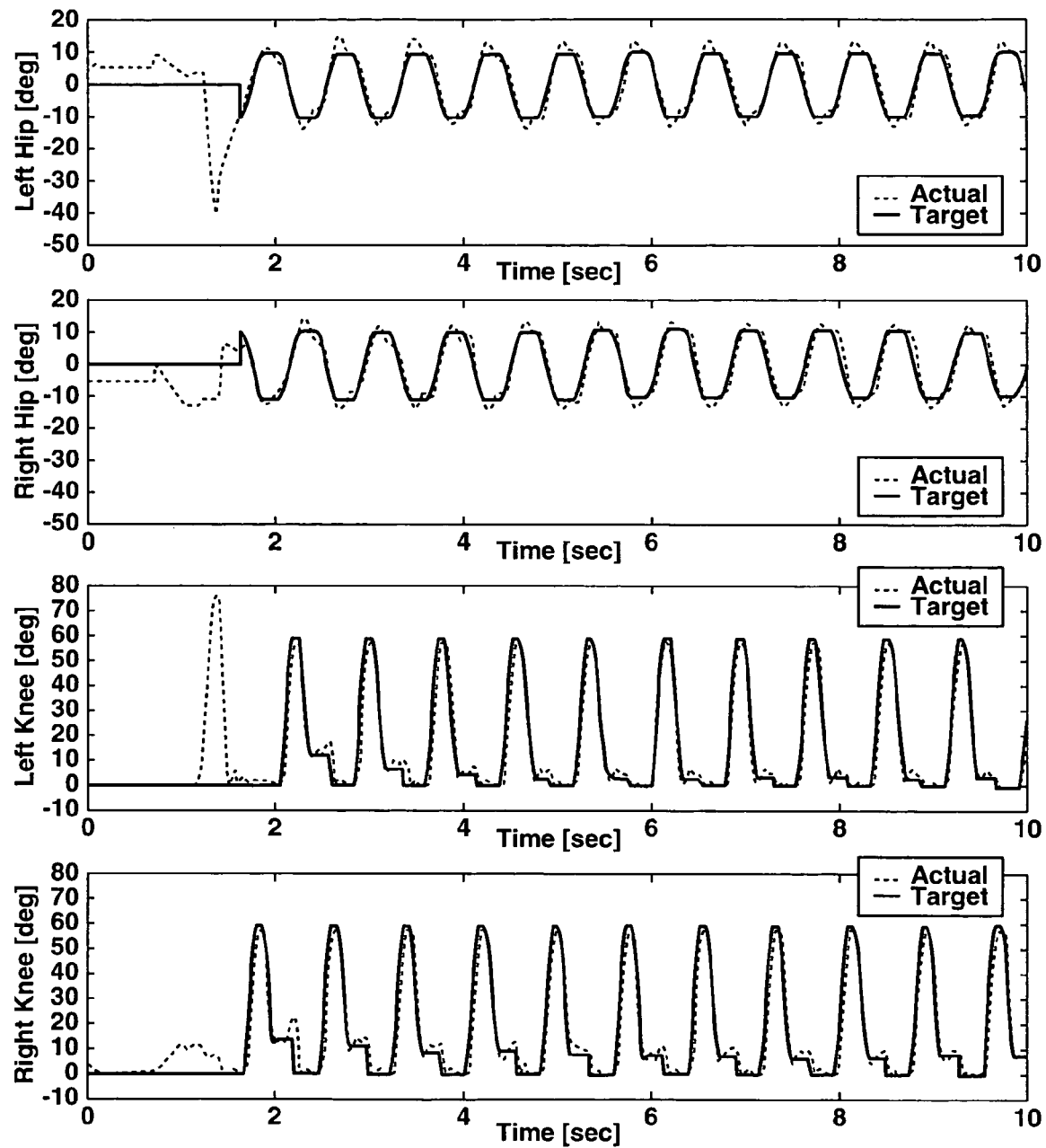
FIG. 61 shows graphs illustrating stable walk trajectories after a learning session.

FIG. 60 shows graphs illustrating exemplary walk trajectories during a learning session (25th try). The output for the target angle of the knee joint of the swing leg at the time of touch down shows dispersion because of a searching action. The target angle of each joint shows a smooth continuation because the output target attitude is interpolated by a trajectory using a minimum jerk criterion (spline of the 5th order). Such a technique is proposed by Wada et al. [33] and also by Miyamoto et al. [36]. A stable walk was acquired after about 50 tries. FIG. 61 shows graphs illustrating stable walk trajectories after a learning session. The knees were bent relatively to a large extent and subsequently extended to kick the floor for the first four steps or so in order to inject energy and prevent falling.

Figure 67:
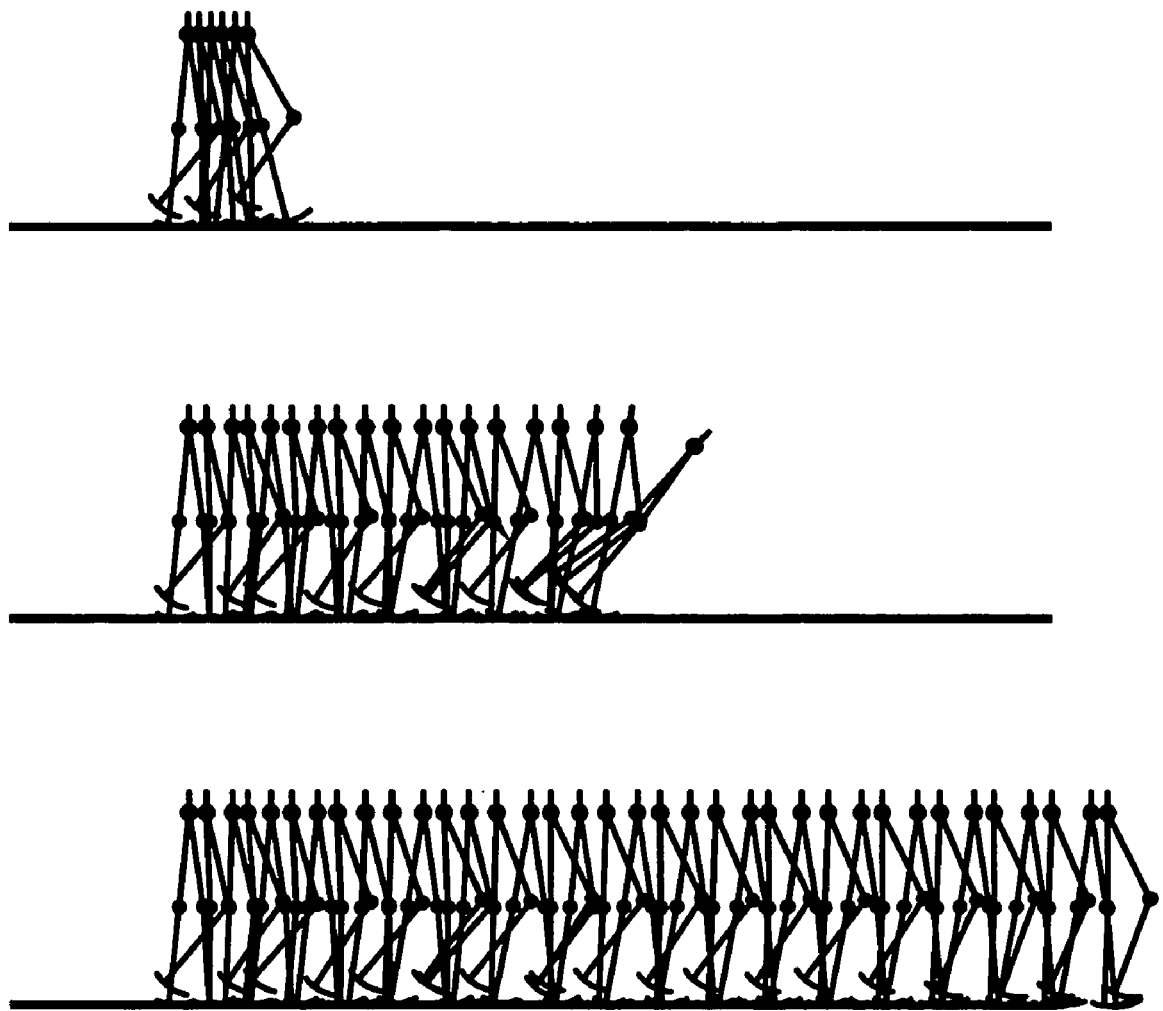
FIG. 67 shows the walk trajectory before the learning in the top row and the walk trajectory after 30 tries in the middle row.
Figure 68:
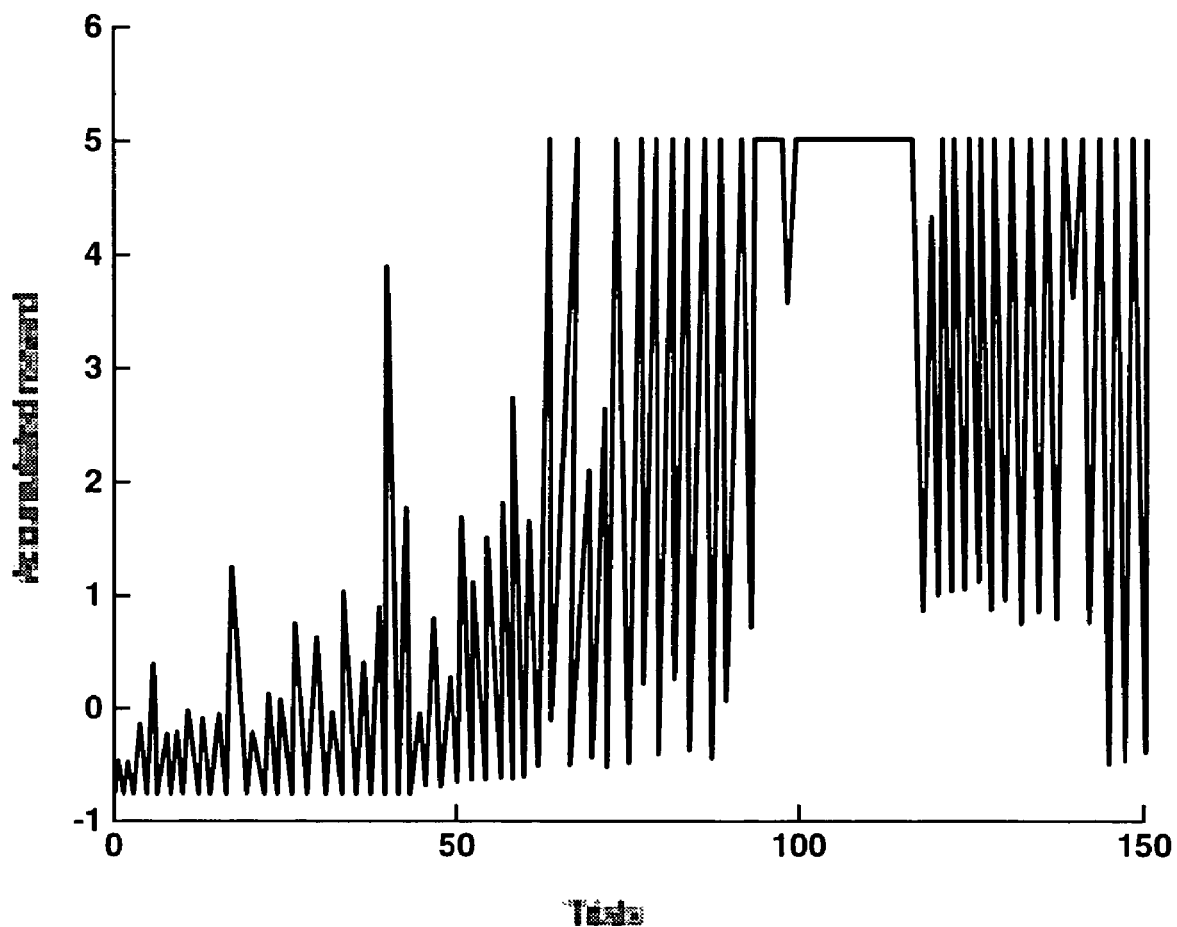
FIG. 68 shows the accumulated reward at each try.

FIG. 67 shows the walk trajectory before the learning in the top row and the walk trajectory after 30 tries in the middle row. FIG. 68 shows the accumulated reward at each try. Acquisition of walk is defined as success in walking 50 steps. As a result of five experiments, a walking motion was acquired after 80 tries in average. FIG. 67 shows the acquired walk trajectory in the lower row.

Figure 69:
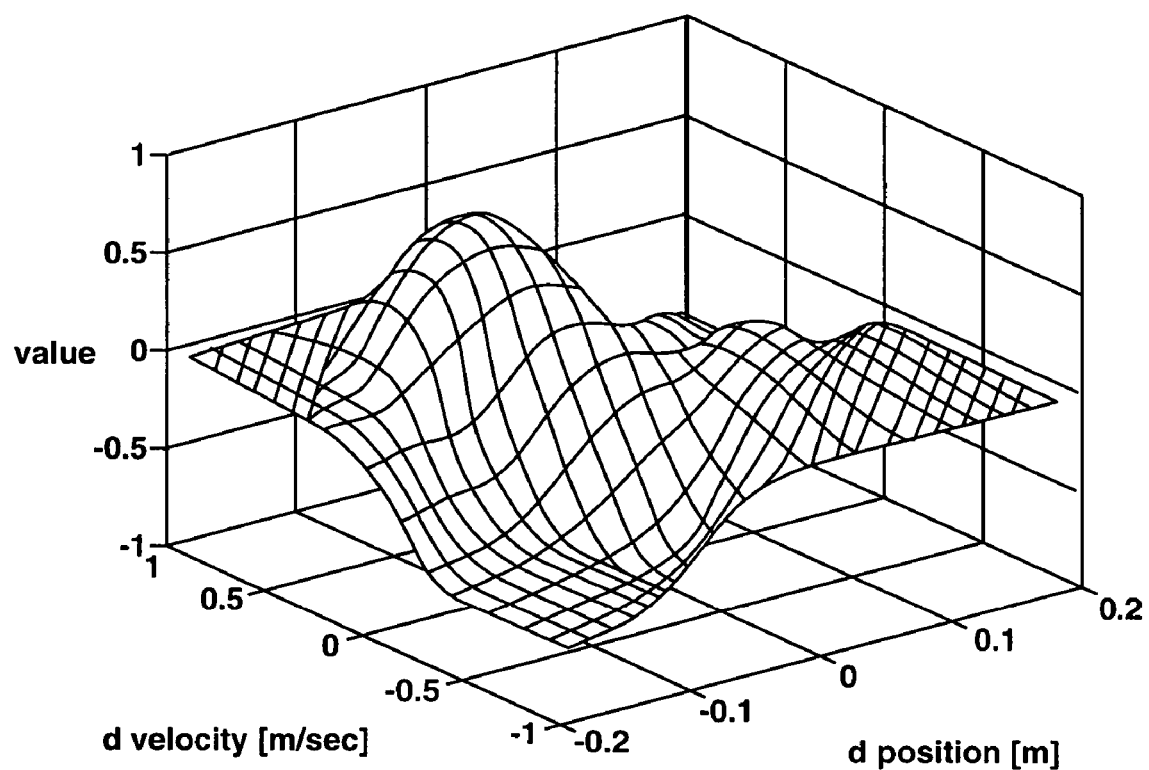
FIG. 69 shows the value function acquired by simulation.

FIG. 69 shows the value function acquired by simulation. From FIG. 69, it is possible to draw the following qualitative conclusion. (d, d)=(−0.2, −1.0) or the support leg is located forward and the hip joint shows a backward velocity so that the robot is apt to fall backward. At this time, the value function shows a small value. When (d, d)=(0.0, 0.5) or the support leg is on the line perpendicular to the hip joint and shows a forward velocity, the value function shows a large value. In other words, when the robot is moving forward, the value function shows a large value. From above, it will be understood that a qualitatively reasonable value function is acquired.

Figure 70:
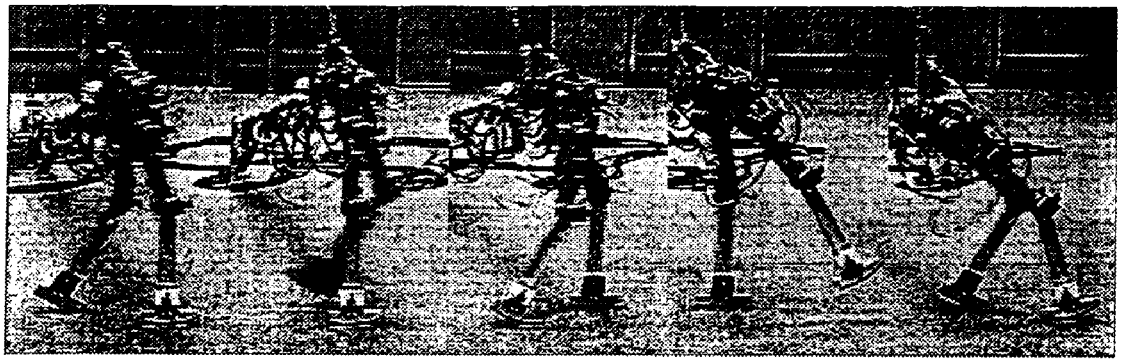
FIG. 70 shows a walking motion of the robot before learning.
Figure 71:
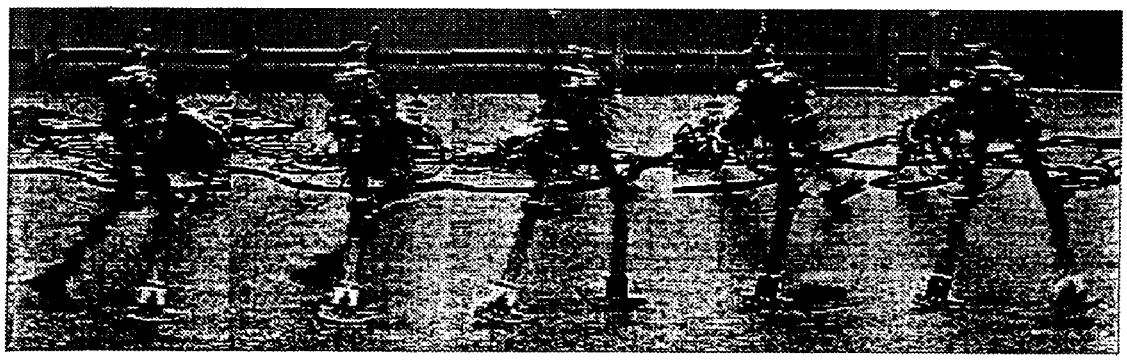
FIG. 71 shows a walking motion after learning.
Figure 72:
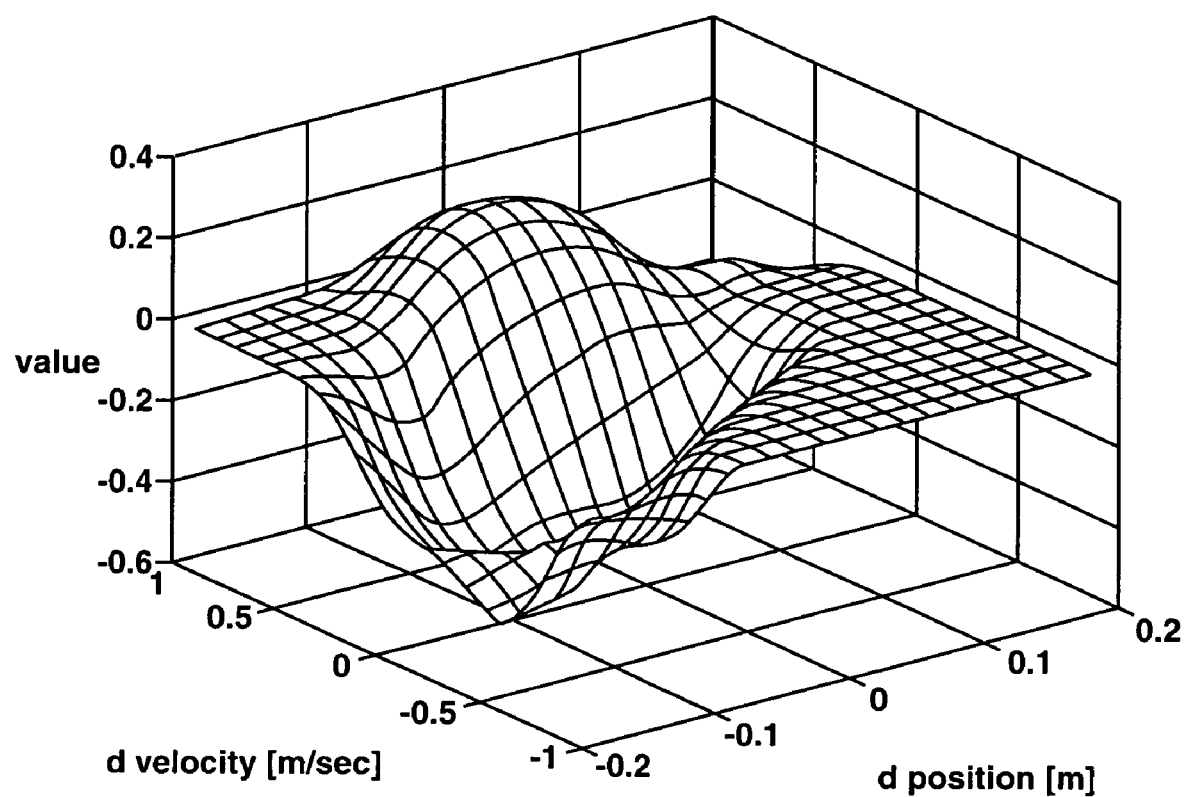
FIG. 72 shows the value function acquired as a result of the experiments using a real hardware.

The proposed technique was applied to a real hardware. FIG. 70 shows a walking motion of the robot before learning. It will be seen that the robot fell within few steps. FIG. 71 shows a walling motion after learning. After about 50 tries, the robot could acquire a steady walk motion. Normally, in a multi-degree freedom system learning such as walk, hundreds to tens of thousands tries are required before the learning of a real hardware converges and hence it is practically impossible to verify the learning of a real hardware. To the contrary, with the above described technique, the learning of the robot converged after about as small as 50 tries, which is a practical number for a real hardware. Thus, the effectiveness of the technique is proved. FIG. 72 shows the value function acquired as a result of the experiments using a real hardware. It will be seen that the profile of the function resembles that of the result of the simulation shown in FIG. 69.

For the purpose of verifying the adaptability of the robot to changes in the environment, the robot was driven to walk in an environment where a slope is found by using the controller acquired as a result of the learning. The robot was tested by modifying the slope stepwise, increasing the gradient by 0.1 degrees each time. It was found that the robot can walk stably on an uphill with a gradient of not greater than 0.6 degrees and on a downhill with a gradient not greater than 0.2 degrees. The period of the walk was made equal to T=0.79 [sec] (ω=8.0 [rad/sec]). The results are substantially same as those obtained by using a real hardware as described in B-4-2.

B-3-4-2. Application of Walk Period Estimation Method

The potential of application to changes in the environment was tested as described in the immediately preceding section. The robot can hardly adapt itself to uphill with a large gradient presumably because it cannot generate an ankle torque. The robot cannot adapt itself to downhill either presumably because the defined walk period does not match the dynamics for downhill. However, the learning method of this embodiment uses the phase as condition for transition, it is possible to use the walk period estimation method described in detail in B-3-3. Therefore, an adaptability experiment was conducted by simulation, using the walk period estimation method. A downhill of 1.5 degrees was selected for the environment. Then, the robot succeeded in walking stably at the eighth try after repeated failings in the preceding seven tries.

B-3-4-3. Analysis of Acquired Behavior Rule

The stability of the discrete dynamics produced by the behavior rule that is acquired in the poincare cross sections respectively at phase Φ=π/2, Φ=3π/2 as shown in FIG. 58 will be verified in this section. The Jacobean eigen-values of the discrete dynamics at the respective poincare cross sections are used for the verification method [37, 38]. It can be said that the period trajectory is stable if each of the eigen-values λi is |λi(J)|<1. Since continuous functions are used to express a dynamics model and a behavior rule for the technique of this embodiment, it is possible to analytically obtain Jacobean matrix J as expressed by the formula below.

$$J = \frac{df}{dx} = \frac{\partial f}{\partial x} + \frac{\partial f}{\partial u}\frac{\partial u(x)}{\partial x}$$ [formula 49]

Figure 62:
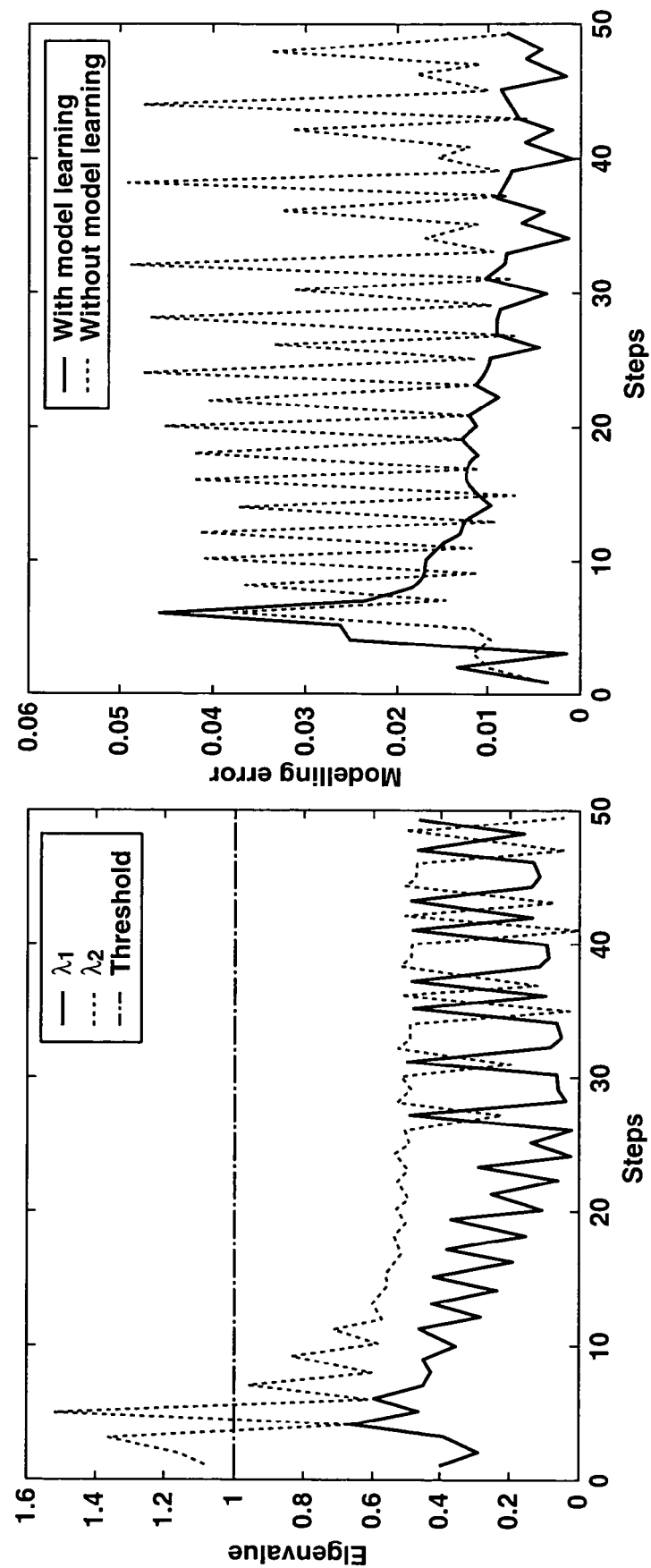
FIG. 62 shows graphs illustrating changes of specific values when a robot is made to walk by 50 steps in a simulation.

However, note that, only a rough expression is used to say that a searching behavior is taken in learning and the dynamics takes only the input state x in FIG. 59 into consideration as state. Thus, the accuracy of approximation of the dynamics can be low near the stable walk trajectory. Therefore, the robot was driven to walk 50 steps by simulation and the model was updated only during the stable walk. FIG. 62 shows the obtained changes in the eigen-values. It will be seen that the eigen-value of the Jacobean matrix becomes less than 1 as the model error decreases. At this time, the behavior rule was not updated. In other words, it was confirmed that the learnt behavior rule can generate a stable walk period from the computation of the eigen-values.

Figure 73:
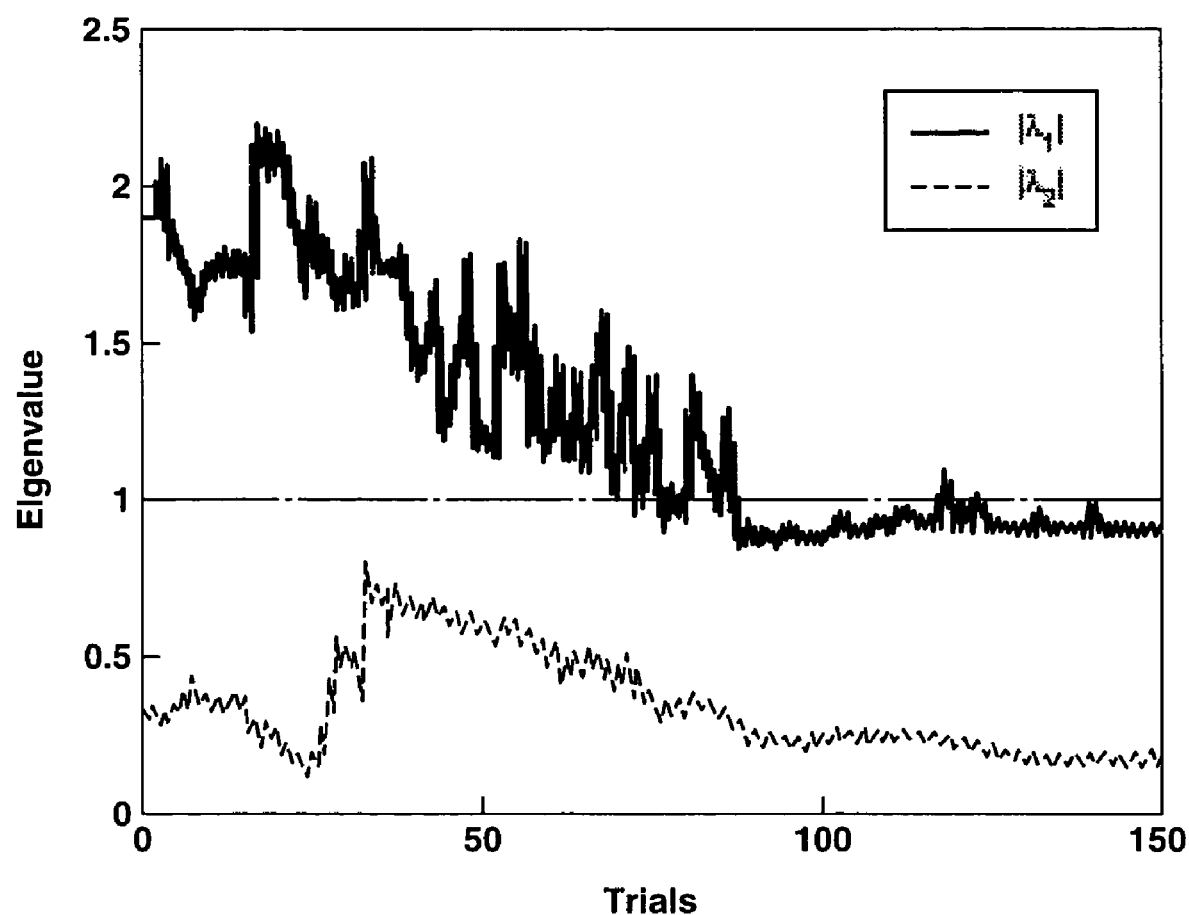
FIG. 73 shows averaged eigen-value of Jacobian matrix at each trial.

Stability of the controller obtained by the experiment using a real hardware was examined as in the case of using a simulation. The average of the eigen-values in each try was determined by using the formula 49 and shown in FIG. 73. It will be seen from FIG. 73 that the eigen-values decreases to ultimately become less than 1 as the learning proceeds. Thus, it was confirmed that the behavior rule learnt by the real hardware in the experiment could generate a stable walk period by computing the eigen-values.

[Addendum]

The present invention is described above in detail by referring to specific embodiments. However, it may be clear to those skilled in the art that the present invention is not limited to the described embodiments, which may be modified and altered without departing from the scope of the present invention.

The present invention is not limited to products referred to as "robots". In other words, the present invention is applicable to mobile machines and other general devices that show motions resembling those of man by utilizing electric or magnetic effects if such products belong to industries other than the robot industry such as toys.

In short, the present invention is described here only by way of embodiments and the present invention is by no means limited to the description of the letter of specification. The present invention is defined only by the appended claims.

REFERENCE DOCUMENTS

1: Avis H. Cohen, "Control principle for locomotion—looking toward biology" (AMAM 2003)
2: Matsuoka, K., "Sustained oscillations generated by mutually inhibiting neurons with adaption" (Biological Cybernetics, 52, pp. 345-353 (1985))
3: Matthew M. Williamson, "Neural Control of Rhythmic Arm Movements" (Neural Networks, Vol. 1, Issues 7-8, pp. 1379-1394 (1998))
4: Kotosaka, S. Schaal, "Synchronized Robot Drumming by Neural Oscillator" (Journal Robotics Society of Japan, Vol. 19, No. 1, pp. 116-123 (2001))
5: Miyakoshi, Taga, Kuniyoshi, "A Self Turning Mechanism for the Parameters of a Neural Oscillator" (Proceedings of Robotics Symposia, pp. 301-306 (2000))
6: G. Taga, Y. Yamaguchi, Hi Shimizu, "Self-organized control of bipedal locomotion by neural oscillators in unpredictable environment, Biological Cybernetics, Vol. 65, pp. 147-159 (1991))

7: G. Taga, "A model of the neuro-musculo-skeletal system for human locomotion I" (Emergence of basis gait, Biological Cybernetics, Vol. 73, pp. 97-111 (1995))

8: G. Taga, "A model of the neuro-musculo-skeletal system for human locomotion 11" (Real-time Adaptability under various constraints" (Biological Cybernetics, vol. 73, pp. 113-121 (1995))

9: Hase, Yamazaki, "Generation of Pseudo-Real Bipedal Motions Using Neural Oscillators and a Genetic Algorithm" (Transactions of the Society of Instrument and Control Engineers, Vol.33, No. 5, pp. 448454 (1997))

10: Hase, Yamazaki, "Autonomous Acquisition of a Neural Structure for Generating Bipedal Walking Motions" "Journal of the Japanese Society of Mechanical Engineers (Series C), Vol. 64, No. 625, pp. 3541-3547 (1998)

11: M. Sato, Y. Nakamura, S. Ishii, "Reinforcement Learning for Biped Locomotion" (ICANN (2002))

12: Fukuoka, Kimura, "Biologically Inspired Adaptive Dynamic Walking of a Quadruped Robot on Irregular Terrain—Adjustment based on Somatic Sensation and Vestibular Sensation—" (Journal of Robotics Society of Japan, Vol. 19, No. 4, pp. 510-517 (2001))

13: H. Kimura, Y. Fukuoka, T. Miura, "Dynamics Based Integration of Motion Adaptation for a Quadruped Robot" (AMA2003)

14: Miyakoshi, Yamamoto, Taga, Kuniyoshi, "Bipedal Walking Simulation of a Compass-like Report" (Proceedings of the 18$^{th}$ Annual Conference of the Robotics Society of Japan, Vol. 3, pp. 1107-1108 (2000))

15: G. Taga, "A Model of Integratin of Posture and Locomotion" (Proceedings of International Symposium on Computer Simulation in Biomechanics (1997))

16: Miyakoshi, Taga, Kuniyoshi, Nagakubo, "Three-Dimensional Bipedal Stepping Motion Using Neural Oscillators—Towards Humanoid Motion in the Real World" (Journal of Robotics Society of Japan Vol. 18, No. 1, pp. 87-93 (2000))

17: T. McGeer, "Passive Dynamic Walking" (IJRR, pp. 62-82 (1990))

18: Pratt, Jerry, "Exploiting Inherent Robustness and Natural Dynamics in the Control of Bipedal Walking Robots (Ph. D. Thesis, Computer Science Department, Massachusetts Institute of Technology, Cambridge, Mass. (2000))

19: Hase, K., Yamazaki, N., "Computational evolution of human bipedal walking by a neuro-musculo-skeletal model" (Artificial Life and Robotics, Vol. 3, pp. 133-138, 1999)

20: Taga, G., "Nonlinear dynamics of the human motor control—real-time and anticipatory adaptation of locomotion and development of movements" (In Proceedings of the International Symposium on Adaptive Motion of Animals and Machines, 2000)

21: Miyakoshi, S., Yamakita, M., Furuta, K., "Juggling control using neural oscillators" (In proceedings of the IEEE/RSJ International Conference on Intelligent Robots and Systems, pp. 1186-1193, 1994)

22: Ijspeert, A., Nakanishi, J., Schaal. S., "Learning attractor landscapes for learning motor primitives" (In Neural Information Processing Systems (NIPS 2002), 2002)

23: Schaal, S., Atkeson, C. G., "Constructive incremental learning from only local information" (Neural Computation, Vol. 10, No. 8, pp. 2047-2084, 1998)

24: Mitsuo Kawato, "An Engineering Research on Rhythmic Phenomena of Living Bodies" (Journal of Medical Electronics and Biological Engineering, Vol. 19, No. 3, pp. 171-178, 1981)

25: http://www.sdfast.com

26: Yoshihiro Ehara, Sumiko Yamamoto, "Introduction to Body Dynamics—an Analysis of Starting Walk and Walking" (Ishiyaku Publishers, 2002)

27: Strogatz, S. H., "Nonlinear dynamics and chaos: with applications to physics" (Addison-Wesley, 1994)

28: Dempster, W. T., Gaughran, G. R. L., "Properties of body segments based on size and weight" (American Journal of Anatomy, Vol. 120, pp. 33-54, 1965)

29: M. H. Raibert, "Legged Robots That Balance" (The MIT Press, Cambridge, Mass., 1986)

30: Dai Yanagihara "Motion Learning and Cerebellum" (Science of Physical Training, Vol. 46, No. 6, pp. 455-463, 1996)

31: Mitsuo Kawato "Computation Theory of Brain" (Sangyo Tosho, 1996)

32: Y. Fukuoka, H. Kimura, "Adaptive Dynamic Walking of a Quadruped Robot on Irregular Terrain based on Biological Concepts" "Int. Journal of Robotics Research, Vol. 22, No. 2, pp. 187-202, 2003)

33: Y. Wada, M. Kawato, "A theory for cursive handwriting based on the minimization principle" (Biological Cybernetics, Vol. 73, pp. 3-15, 1995)

34: R. S. Sutton, A. G. Barto, "Reinforcement Learning: An Introduction" "The MIT Press, Cambridge, Mass., 1998)

35: K. Doya, "Reinforcement Learning in Continuous Time and Space" (Neural Computation, Vol. 12, No. 1, pp. 219-245, 2000)

36: H. Miyamoto, S. Schaal, F. Gandolfo, H. Gomi, Y. Koike, R. Osu, E. Nakano, Y. Wada, M. Kawato, "A Kendama Learning Robot Based on Bi-directional Theory" "Neural Networks, Vol. 9, pp. 1281-1302, 1996)

37: M. Garcia, A. Chatteijee, A. Ruina, M. J. Colemang, "The simplest walking model; stability, complexity and scaling" (ASME Journal of Biomechanical Engineering, Vol.120, No. 2, pp. 281-288, 1998)

38: R. Q. Van der Linde, "Passive bipedal walking with phasic muscle contraction" (Biological Cybernetics, Vol. 82, pp. 227-237, 1999)

What is claimed is:

1. A robot having a plurality of movable sections, the robot comprising:

phase signal generating means for generating a phase signal relating to a periodic motion of at least part of the movable sections;

control means for generating a control signal for the movable sections according to the phase signal;

drive means for driving the movable sections according to the control signal;

state quantity detecting means for detecting the state quantities of the movable sections driven by the drive means; and estimation means for estimating the phase or the angular frequency of the periodic motion of the movable sections according to the state quantities;

the phase signal generating means being adapted to update the phase signal according to the phase or the angular frequency estimated by the estimation means, wherein the control means includes a plurality of controllers having different control rules and selects an appropriate controller according to the phase signal and the selected controller generates a control signal for the movable sections according to the phase signal; wherein the robot includes movable sections regarded as doing a periodic motion and those not regarded as doing a periodic motion, the robot further comprising second control means for generating a control signal according to a control rule for the movable sections not regarded as doing a periodic motion; and coordinating means for coordinating the control quantities from the control means and the second control means in order to realize a coordinated motion for the entire robot.

2. The robot according to claim 1, wherein the movable sections have one or more than one joints and the state quantity detecting means detects the angle and the angular velocity of the joint or each of the joints as state quantity, while the estimation means estimates the phase or the angular frequency relating to the periodic motion of the joint or each of the joints according to the angle and the angular velocity of the joint or each of the joints.

3. The robot according to claim 1, wherein the robot has a plurality of movable legs as the movable sections and the state quantity detecting means detects the floor reaction force received by each of the soles of the movable legs as state quantity, while the estimation means estimates the phase or the angular frequency of the periodic motion of each of the movable sections according to the reaction force of the floor received by the sole of each of the movable legs.

4. The robot according to claim 1, wherein the robot has a plurality of movable legs as the movable sections and the state quantity detecting means detects the friction force received by each of the soles of the movable legs from the floor in the moving direction or in a direction perpendicular to the moving direction as state quantity, while the estimation means estimates the phase or the angular frequency of the periodic motion of each of the movable sections according to the friction force received by the sole of each of the movable legs from the floor.

5. The robot according to claim 1, wherein the robot has a trunk section and the state quantity detecting means detects the gradient of the trunk section as state quantity, while the estimation means estimates the phase or the angular frequency of the periodic motion of each of the movable sections according to the gradient of the trunk section.

6. The robot according to claim 1, wherein the state quantity detecting means detects the acceleration of the robot or each of the movable sections as state quantity and the estimation means estimates the phase or the angular frequency of the periodic motion of each of the movable sections according to the acceleration.

7. The robot according to claim 1, wherein the estimation means resets the phase relating to the periodic motion of the joint or each of the joints in response to the occurrence of a predetermined event.

8. The robot according to claim 1, wherein the estimation means learns a training signal relating to the state quantity detected by the state quantity detecting means and the frequency of each of the movable sections and estimates the phase or the angular frequency according to the learnt training signal.

9. The robot according to claim 1, wherein the estimation means is constituted by a neural network adapted to output the phase or the angular frequency relating to the periodic motion of each of the movable sections according to the state quantity detected by the state quantity detecting means.

10. The robot according to claim 1, wherein the robot includes a plurality of movable sections regarded as doing a periodic motion and the control means provides each of the movable sections regarded as doing a periodic motion with a controller, the robot further comprising coordinating means for coordinating the control quantities from the controllers of the movable sections in order to realize a coordinated motion for the entire robot.

11. An attitude control method of a robot having a plurality of movable sections, the method comprising:

a phase signal generating step of generating a phase signal relating to a periodic motion of at least part of the movable sections;

a control step of generating a control signal for the movable sections according to the phase signal;

a drive step of driving the movable sections according to the control signal;

a state quantity detecting step of detecting the state quantities of the movable sections driven in the drive step; and an estimation step of estimating the phase or the angular frequency of the periodic motion of the movable sections according to the state quantities;

the phase signal generating step being adapted to update the phase signal according to the phase or the angular frequency estimated in the estimation step, wherein the control step including a plurality of control sub-based on different control rules, selects an appropriate control sub-step according to the phase signal and generates a control signal for the movable sections according to the phase signal from the selected control sub-step; wherein the robot includes movable sections regarded as doing a periodic motion and those not regarded as doing a periodic motion, the robot further comprising a second control step of generating a control signal according to a control rule for the movable sections not regarded as doing a periodic motion; and a coordinating step of for coordinating the control quantities from the control step and the second control step in order to realize a coordinated motion for the entire robot.

12. The method according to claim 11, wherein the movable sections have one or more than one joints and the state quantity detecting step is adapted to detect the angle and the angular velocity of the joint or each of the joints as state quantity, while the estimation step is adapted to estimate the phase or the angular frequency relating to the periodic motion of the joint or each of the joints according to the angle and the angular velocity of the joint or each of joints.

13. The method according to claim 11, wherein the robot has a plurality of movable legs as the movable sections and the state quantity detecting step is adapted to detect the floor reaction force received by each of the soles of the movable legs as state quantity, while the estimation step is adapted to estimate the phase or the angular frequency of the periodic motion of each of the movable sections according to the reaction force of the floor received by the sole of each of the movable legs.

14. The method according to claim 11, wherein the robot has a plurality of movable legs as the movable sections and the state quantity detecting step is adapted to detect the friction force received by each of the soles of the movable legs from the floor in the moving direction or in a direction perpendicular to the moving direction as state quantity, while the estimation step is adapted to estimate the phase or the angular frequency of the periodic motion of each of the movable sections according to the friction force received by the sole of each of the movable legs from the floor.

15. The method according to claim 11, wherein the robot has a trunk section and the state quantity detecting step is adapted to detect the gradient of the trunk section as state quantity, while the estimation step is adapted to estimate the phase or the angular frequency of the periodic motion of each of the movable sections according to the gradient of the trunk section.

16. The method according to claim 11, wherein the state quantity detecting step is adapted to detect the acceleration of the robot or each of the movable sections as state quantity and the estimation step is adapted to estimate the phase or the angular frequency of the periodic motion of each of the movable sections according to the acceleration.

17. The method according to claim 11, wherein the estimation step is adapted to reset the phase relating to the periodic motion of the joint or each of the joints in response to the occurrence of a predetermined event.

18. The method according to claim 11, wherein the estimation step is adapted to learn a training signal relating to the state quantity detected in the state quantity detecting step and the period of each of the movable sections and estimate the phase or the angular frequency according to the learnt training signal.

19. The method according to claim 11, wherein the estimation step is realized by a neural network adapted to output the phase or the angular frequency relating to the periodic motion of each of the movable sections according to the state quantity detected in the state quantity detecting step.

20. The method according to claim 11, wherein
the robot includes a plurality of movable sections regarded as doing a periodic motion and the control step includes control sub-steps that correspond to respective movable sections regarded as doing a periodic motion,
the method further comprising a coordinating step of coordinating the control quantities from the control sub-steps for the respective movable sections in order to realize a coordinated motion for the entire robot.

* * * * *